US005873489A

United States Patent [19]
Ide et al.

[11] Patent Number: 5,873,489
[45] Date of Patent: Feb. 23, 1999

[54] COMMODITIES STORING APPARATUS OF VENDING MACHINE

[75] Inventors: Yoshiaki Ide, Kusatsu; Yoshiyuki Nakamura, Shiga; Ken Suwabe, Kusatsu; Yoshiyuki Baba, Hikone, all of Japan

[73] Assignee: Matsushita Refrigeration Company, Osaka, Japan

[21] Appl. No.: 836,248

[22] PCT Filed: Aug. 23, 1996

[86] PCT No.: PCT/JP96/02353

§ 371 Date: Apr. 25, 1997

§ 102(e) Date: Apr. 25, 1997

[87] PCT Pub. No.: WO97/08666

PCT Pub. Date: Mar. 6, 1997

[30] Foreign Application Priority Data

| | | | |
|---|---|---|---|
| Aug. 25, 1995 | [JP] | Japan | 7-217262 |
| Nov. 6, 1995 | [JP] | Japan | 7-286954 |
| Jan. 29, 1996 | [JP] | Japan | 8-012542 |
| Jan. 29, 1996 | [JP] | Japan | 8-012543 |
| May 7, 1996 | [JP] | Japan | 8-112506 |

[51] Int. Cl.[6] .......... B65G 59/00
[52] U.S. Cl. .......... 221/279; 211/59.3
[58] Field of Search .......... 221/6, 2, 3, 7, 221/17, 18, 124, 129, 226, 279, 271; 211/59.3, 51, 59.2

[56] References Cited

U.S. PATENT DOCUMENTS

| | | | |
|---|---|---|---|
| 3,237,745 | 3/1966 | Gerhart et al. | 194/10 |
| 4,565,725 | 1/1986 | Spamer et al. | 428/167 |
| 4,901,869 | 2/1990 | Hawkinson et al. | 211/59.3 |
| 4,907,707 | 3/1990 | Crum | 211/59.3 |
| 5,069,349 | 12/1991 | Wear et al. | 211/59.3 |
| 5,638,963 | 6/1997 | Finnelly et al. | 211/59.3 |

FOREIGN PATENT DOCUMENTS

| | | |
|---|---|---|
| 49-14196 | 2/1974 | Japan . |
| 56-35094 | 4/1981 | Japan . |
| 2-31016 | 2/1990 | Japan . |
| 2-191413 | 7/1990 | Japan . |
| 6-38735 | 2/1994 | Japan . |
| 7-20681 | 1/1995 | Japan . |

*Primary Examiner*—Kenneth Noland
*Attorney, Agent, or Firm*—Wenderoth, Lind & Ponack, L.L.P.

[57] ABSTRACT

A first commodities receiving plate (9, 62) is provided for holding commodities (4) stored on a pair of neighboring commodities storing paths. An operation member (17, 70) interlocked with a pivotal motion of the first commodities receiving plate (9, 62) is fixed to a driving shaft (13, 67) for pivoting the first commodities receiving plate (9, 62). A second commodities receiving plate (20, 73) is disposed on the sliding surface side of each of the commodities storing paths and on the rear side of the first commodities receiving plate (20, 73), with one side of the second commodities receiving plate (20, 73) supported by a shaft. When the second commodities receiving plate (20, 73) is caused to pivot and the other side thereof is moved upward, the first commodity is fed out to a commodities feed-out port while the second commodity is prevented from moving to the commodities feed-out port. The first commodities receiving plate (9, 62) and the second commodities receiving plate (20, 73) open and close the associated commodities storing path by the pivotal motion thereof.

31 Claims, 33 Drawing Sheets

COMMODITIES STORING APPARATUS OF VENDING MACHINE

TECHNICAL FIELD

The present invention relates to a commodities storing apparatus of a vending machine comprising a plurality of vertically arranged commodities storing shelves.

BACKGROUND ART

This kind of commodities storing apparatus of a vending machine generally has a large number of vertically arranged commodities storing shelves and is positioned close to a commodity passage so that commodities placed horizontally on each commodities storing shelf may roll along a commodities storing path. (see Japanese Patent Publication No. 53-11479.) A commodities transport device is disposed at the front of the commodities storing path and has an arm for locking the front commodity on the commodities storing shelf.

An example of a conventional commodities storing apparatus of a vending machine having the above-described construction will be described below.

In the body of the vending machine, there is provided a plurality of vertically arranged commodities storing shelves each having commodities storing paths. A commodities transport device is provided at a commodities feed-out port of each commodities storing path of the commodities storing shelf. In the commodities storing apparatus, a first locking claw projects from the lower end of a commodities placing surface, the lower portion of which is inclined to prevent the drop of commodities. In supplying or selling the commodities, the first locking claw is moved downward from the commodities placing surface to drop the leading commodity due to its own weight.

At this time, simultaneously with the retreat of the first locking claw, a second locking claw is projected at a position rearward from the first locking claw to prevent successive drop of the commodities placed rearward of the leading one. In the vending machine accommodating a commodities take-out device having the above-described construction, the user's hand is put into a commodities take-out port positioned on the lower side of the machine body to take out the commodity fed out thereto.

According to Japanese Utility Model Publication No. 55-52548, the commodities take-out device having a construction similar to the above-described one is provided at the rear end of each commodities placing shelf. Upon actuation of the commodities take-out device, a commodity is sent out from the rear end of the commodities placing shelf and falls through a commodities falling path positioned on the rear side of the machine. The commodity is eventually sent to a commodities take-out port defined in a front lower portion of the machine body through a frontwardly inclined guide path formed at the lower portion of the machine body.

According to Japanese Patent Publication No. 6-28555, a first stopper of the commodities feed-out device is positioned at the front of the commodities placing shelf sloping down to the front. The vertical surface of the body of the first stopper which contacts a first commodity is pivotal at its lower end. A second stopper for preventing other commodities from moving forward is provided in the space between the first commodity and the second commodity. When the first stopper body pivots, the above space is widened to allow the commodity to be taken out.

According to Japanese Patent Publication No. 63-361007, the commodities storing apparatus comprises an L-shaped movable plate slidably mounted on a rear portion of the sliding surface of a commodities path and a spiral spring is rotatably mounted rearward of the movable plate. The spiral spring is pulled along a groove of the sliding surface of the commodities path, and one end of the spiral spring is fixed to the exit of the commodities storing path so as to move commodities by sliding the commodities on the sliding surface.

In the commodities storing apparatus having the above-described construction, however, looking at samples displayed in the vending machine, a user presses a selection button to buy a commodity. Therefore, the samples are required to have the same appearance in shape and color as the commodities. It is also necessary to prepare the same number of samples as the number of kinds of the commodities. Further, it takes much time and labor to make the samples and hence it is costly to manufacture the vending machine.

The commodities feed-out device is provided for each commodities storing path. When the vending machine has a plurality of commodities storing shelves in both the longitudinal and widthwise directions of the vending machine, the vending machine becomes large and cannot efficiently accommodate a large number of commodities. Generally, paper containers or the like are fed out by a conveyor feeding mechanism which is driven by a driving motor. In this construction, many component parts are required, resulting in a complex construction. Thus, the productivity of the vending machine having such a construction is low and hence the vending machine is costly.

SUMMARY OF THE INVENTION

The present invention has been developed in view of the above-described problems inherent in the conventional art. It is accordingly an object of the present invention to provide a commodities storing apparatus of a vending machine which allows a user to know commodities being sold by the vending machine with no samples and to readily select an intended commodity, and which is thin and compact but capable of storing a large amount of commodities.

It is another object of the present invention to provide a commodities storing apparatus of a vending machine which ensures movement of commodities in the commodities storing apparatus without using a driving motor and allows commodities of various shapes to be sold with a reduced pressing force in moving the commodities.

In order to achieve the above-described objects, the commodities storing apparatus of a vending machine according to the present invention comprises a plurality of vertically arranged commodities storing shelves each having a plurality of commodities storing path. The said commodities storing shelves are pulled in storing commodities on the commodities storing paths. First: first commodities receiving plates are each provided at exits of two of the commodities storing paths for holding the commodities stored thereon. Driving shafts each pivot one of the first commodities receiving plates. Operation members are each fixed to one of the driving shafts and interlocked with a pivotal motion of one of the first commodities receiving plates. Second commodities receiving plates are each provided on a sliding surface side of each commodities storing path and positioned rearward of one of the first commodities receiving plates. Each of the second commodities receiving plates pivot to feed out a first commodity to a commodities feed-out port and prevent a second commodity from moving to the commodities feed-out port. Each of the first commodities receiving plates and each of the second commodities receiving plates open and close the associated commodities storing path.

In the above construction, the second commodities receiving plate provided on the sliding surface of the commodities storing path is pivoted by interlocking the operation member with the driving shaft which drives the first commodities receiving plate holding commodities stored on the two commodities storing paths. Therefore, the commodities feed-out mechanism can be made thin and compact. Because the second commodities receiving plate is positioned rearward of the first commodities receiving plate, a first commodity can be fed to the feed-out side, whereas a second commodity can be prevented from being moved to the feed-out port. The same is true for commodities having different configurations, for example, cans, bottles, packs and the like. Thus, these commodities can be also accommodated in the commodities storing shelves. In addition, because it is unnecessary to regulate the width of the commodities storing path and also unnecessary to adjust the position of the second commodities receiving plate, it is easy to use the commodities storing apparatus.

Further, an elastic member having an urging force directed from a rear side of the commodities storing path toward the commodities feed-out port and a feed-out pressing plate holding the elastic member thereon to move the commodities are provided on the commodities storing path. Also, a character portion indicating sellout of the commodities is provided on the feed-out pressing plate on a feed-out side thereof. Thus, when commodities have been sold out, the character indicating sellout is displayed at the feed-out port, resulting in an easy-to-use vending machine.

Because each of the first commodities receiving plates is made of a transparent material, users can recognize the kind of commodities stored in the vending machine, thus preventing erroneous buying.

A commodities storing apparatus of a vending machine may comprise a plurality of vertically arranged commodities storing shelves each having a plurality of commodities storing paths. The commodities storing shelves are pulled in storing commodities on the commodities storing paths. First commodities receiving plates are each provided on the commodities storing shelf for holding a first commodity. Second commodities receiving plates each prevent movement of a second commodity. Commodities feed-out devices each having an operation member and a driving shaft both for pivoting the first commodities receiving plates and the second commodities receiving plates to open and close the associated commodities storing path. Connection members are each rotatable and positioned at a rear of each commodities storing path and fixed to the driving shaft. Driving motors are each removable from the connection member. By this construction, when the commodities storing shelf is pulled forward to store commodities on the commodities storing paths, the commodities feed-out device is disconnected from the driving motor, whereas when the commodities storing shelf is accommodated in the vending machine, the commodities feed-out device is connected with the driving motor. Accordingly, no wires for driving are required and, hence, wires are not caught in the vending machine.

Alternatively, a commodities storing apparatus of a vending machine may comprise a plurality of vertically arranged commodities storing shelves each having a plurality of commodities storing paths. The commodities storing shelves are pulled in storing commodities on the commodities storing paths. Commodities feed-out devices each comprise a first commodities receiving plate and a second commodities receiving plate to open and close the associated commodities storing path. Feed-out pressing plates move the commodities. Detection operation rods are each operated by being pressed by the feed-out pressing plate. Commodities detection switches are each of which is separated from the detection operation rod when the commodities storing shelf is pulled forward to store commodities on the commodities storing paths, a commodities detection switch being connected with the detection operation rod when the commodities storing shelf is pressed rearward to be accommodated in the vending machine. Accordingly, it is unnecessary to install a commodity lever for detecting commodities on the commodities storing path. Further, because the detection operation rod is operated by being pressed by the feed-out pressing plate, the operational force of the detection operation rod works without being affected by the weight of the commodities. Thus, although the commodity lever is not provided, the commodities can be reliably detected.

In storing commodities on the commodities storing shelf, it can be pulled out from the vending machine. Because a commodities detection switch, a position detection switch for detecting an angle of the shaft of the driving motor, and the driving motor are incorporated into one unit, the positional relationship among the commodities detection switch, the position detection switch and the driving motor is accurately maintained. This construction is reliable in detecting and feeding out commodities as compared with the case in which they are separate from each other or the case in which they are installed on the commodities storing shelf. Further, because wires of a switching portion are accommodated in a case accommodating the driving motor, no wiring work is required in the commodities storing shelves. Thus, the vending machine can be assembled easily and hence manufactured at a low cost.

Alternatively, a commodities storing apparatus of a vending machine comprises first commodities receiving plates each positioned at a commodities feed-out port located at a front end of a gutter-shaped commodities storing path for holding commodities stored on the commodities storing. Operation members are each interlocked with the operation of one of the first commodities receiving plate. Second commodities receiving plates are each provided on a sliding surface side of each commodities storing path and positioned rearward of one of the first commodities receiving plates. Each of the second commodities receiving plates pivot to feed out a first commodity to a commodities feed-out port and preventing a second commodity from moving to the commodities feed-out port. In this case, the commodities storing apparatus also comprises movable plates each provided on the sliding surface of each commodities storing path such that each movable plate is slidable on the sliding surface from a rear end thereof to the commodities feed-out port, thus preventing the commodities from falling down when the commodities are being moved. Belt-shaped spiral elastic members are each connected with the movable plate and slides to move commodities placed thereon. Runway members are each mounted in the commodities storing path, wherein the spiral elastic member slides on an upper surface of the runway member of each commodities storing path and is bent in a U-shape shape at the commodities feed-out port of the commodities storing path. The spiral elastic member being returned back and rotatably fixed to a rear end of the commodities storing path. By the above-described construction, commodities can be placed on the belt-shaped spiral elastic member and, hence, the sliding resistance can be made substantially constant irrespective of the kind of commodities.

A belt-shaped bendable movable member which can be pulled with commodities placed thereon may be connected with the spiral elastic member which urges the movable member. Further, the width of the belt-shaped bendable movable member may be equal to or larger than that of the elastic member.

Furthermore, a sellout detection portion may be provided so as to be removable from the corresponding commodities storing shelf, while a sellout operation portion is installed on the elastic member and is positioned on a lower surface of the runway member. When the movable plate is located at the front end of each commodities storing path, the sellout operation portion actuates the sellout detection portion owing to a movement of the elastic member.

A locking portion may be provided to lock the movable plate to a stopper portion when the movable plate has been moved to the rear end of each commodities storing path. The spiral elastic member is slidably connected with the movable plate to pull the movable plate and rotatably supported at a location rearward of the movable plate. In this case, a rotation control member is provided to regulate the rotation speed of a shaft of the movable plate unlocked from the locking portion when the shaft rotates at a high speed. The rotation control member does not regulate the rotation speed of the shaft of each movable plate unlocked from the locking portion when the shaft rotates at a low speed.

A material having a high sliding property is effectively fixed to the runway member to thereby make smooth the sliding movement of the movable plate and the spiral elastic member.

Also, the commodities storing apparatus may be of a construction in which two gutter-shaped commodities storing paths defined in the commodities storing shelf are formed into a configuration of a figure “W” by molding, while the sellout detection portion and the driving motor for driving the commodities receiving plates are removable from the commodities storing shelf.

Alternatively, the commodities storing apparatus comprises first commodities receiving plates each positioned at a commodities feed-out port in front of a front end of gutter-shaped commodities storing paths for holding commodities stored on the commodities storing paths, the first commodities receiving plate having an inclined surface formed entirely or partially on a peripheral portion thereof. The inclined surface inclines in a direction from a front surface of the first commodities receiving plate toward a rear surface thereof holding the commodities. Second commodities receiving plates are each provided on a sliding surface side of each commodities storing path and positioned rearward of one of the first commodities receiving plates. Each of the second commodities receiving plates pivots to feed out a first commodity to a commodities feed-out port and prevent a second commodity from moving to the commodities feed-out port. Driving shafts are each connected to the first commodities receiving plate for pivoting the first commodities receiving plate.

This construction prevents the first commodities receiving plate from interfering with commodities positioned at the front end of the commodities storing path located downstairs when the first commodities receiving plate pivots in unison with the rotation of the driving shaft, thus allowing the vertical span of the commodities storing shelves to be equal to that of the commodities to increase the storing efficiency.

The first commodities receiving plate positioned at the commodities feed-out port in front of the front end of the gutter-shaped commodities storing paths for holding the commodities is transparent and has projecting ribs formed thereon to prevent the commodities from contacting the entire surface thereof. This construction reduces the frictional resistance of the first commodities receiving plate to commodities during the pivotal motion of the first commodities receiving plate, thus reducing the force to be applied to the driving shaft. In addition, owing to this construction, the commodities contact the first commodities receiving plate in a smaller area, thus avoiding damage thereof.

Again alternatively, the commodities storing apparatus comprises first commodities receiving plates each positioned at a commodities feed-out port in front of a front end of a gutter-shaped commodities storing path for holding commodities stored on the commodities storing paths. Operation members are each interlocked with a pivotal motion of the first commodities receiving plate. Second commodities receiving plates each prevents a second commodity from being moved to the commodities feed-out port. Movable plates are each provided on a sliding surface of the commodities storing path such that the movable plate is slidable on the sliding surface from a rear end thereof to the commodities feed-out port. Belt-shaped sliding members each have a rotary member rotating at the commodities feed-out port and are pulled with commodities placed thereon. The sliding member is connected with the movable plate, with one end of the sliding member held by the rotary member by bending the sliding member in a U-shape at the rotary member. Rotary drums each have the other end of the sliding member wound thereon. Spiral elastic members are each connected with the rotary drum and positioned in proximity to the rotary drum. By this construction, the commodities do not slide on the sliding surface, but the sliding member slides thereon to move the commodities. Thus, the frictional resistance between the sliding member and the sliding surface can be made small and constant.

In addition, it is unnecessary to connect the sliding member and the elastic member with each other. When the sliding member moves, the elastic member becomes spiral and hence does not collide with the runway member. Therefore, an increase in the movement resistance of the sliding member to the runway member can be avoided. In addition, the frictional resistance between the sliding member and the runway member can be made constant irrespective of the kind of commodities, because the spring force of the spiral elastic member is small and constant. Further, because the sliding member is wound around the rotary drum, the sliding member can be moved smoothly by the urging force of the elastic member, with a small load being applied thereto. Therefore, even commodities contained in paper packs and having a great frictional resistance can be reliably moved, and the movable plate can be easily operated in storing commodities on the commodities storing paths. Further, the elastic member can be positioned at the rear end of the commodities storing path, thus preventing operators from being injured. In addition, the commodities storing apparatus can be made thin, compact, and inexpensive.

Also alternatively, the commodities storing apparatus may comprise first commodities receiving plates positioned at a commodities feed-out port in front of a front end of a commodities storing path for holding commodities stored on the gutter-shaped commodities storing path. Movable plates are each provided on a sliding surface of the commodities storing path such that the movable plate is slidable on the sliding surface from a rear end thereof to the commodities feed-out port. Belt-shaped sliding members are each connected with the movable plate and pulled with commodities placed thereon by being urged toward a feed-out side.

Second commodities receiving plates each provided on the sliding surface and comprise a regulation portion, positioned at one end thereof, for preventing movement of a second commodity to a commodities feed-out port and a stopper portion which is positioned at the other end thereof and pivotally supported on a shaft. The stopper portion contacts the sliding member by pivotal motion of the second commodities receiving plate, wherein the movement of the sliding member is locked by the pivotal motion of the second commodities receiving plate. This construction prevents two commodities from being moved to the feed-out side even though the stopper portion of the second commodities receiving plate does not work due to deformation of commodities or even when flexible commodities are stored on the commodities storing paths. Further, in a stand-by state, the second commodities receiving plate returns to the original position and the sliding member is unlocked. Thus, commodities can be reliably moved to the feed-out side.

Alternatively, the commodities storing apparatus comprises second commodities receiving plates each provided on a sliding surface and comprising a regulation portion, positioned at one end thereof, for preventing a movement of a second commodity to a commodities feed-out port and a stopper portion which is positioned at the other end thereof and pivotally supported on a shaft. The stopper portion contacts a sliding member by pivotal motion of the second commodities receiving plate. Blocking members, each provided at a lower portion of a front end of each gutter-shaped commodities storing case, for reduce the degree of sliding property of the sliding member, wherein the movement of the sliding member is positively locked between the stopper portion and the blocking member by the pivotal motion of each second commodities receiving plate.

The commodities storing apparatus may comprise commodities storing shelves which can be pulled forward. Sellout detection portions each can be removed from the corresponding commodities storing shelf. Movable plates are each provided on a sliding surface of each commodities storing path such that each movable plate is slidable on the sliding surface from a rear end thereof to a commodities feed-out port of the commodities storing path. Belt-shaped sliding members are each connected with one of the movable plates and can be pulled with commodities placed thereon by being urged toward a feed-out side. Operation holes are each formed in the sliding member; and sellout operation members each pivotally supported on a shaft and having a pressing strip which contacts the sellout detection portion at a rear portion of the commodities storing path and an operation pressing strip which is inserted into the operation hole. The sellout detection portion is operated when the operation pressing strip is inserted into the operation hole, with the movable plate located at the commodities feed-out port. Thus, sellout of commodities can be detected easily and reliably. Hence the commodities storing apparatus can be manufactured at a low cost.

Also alternatively, the commodities storing apparatus comprises movable plates each provided on a sliding surface of each commodities storing path such that each movable plate is slidable on the sliding surface from a rear end thereof to a commodities feed-out port of each commodities storing path. Sliding members each connected with the movable plate. Rotary drums each have the sliding member spirally wound thereon portions are each circumferentially formed on the rotary drum. Pivotal stopper members each comprise a locking strip which engages with the tooth portions to prevent rotation of the rotary drum and a stopper strip which is integral with the locking strip and engages the locking strip with the tooth portions when the commodities storing shelf is pulled forward and disengages the locking strip from the tooth portions when the commodities storing shelf is pressed rearward. By this construction, in storing commodities on the commodities storing paths, the movable plate can be stopped at a desired position without moving it to the rear end of the commodities storing path. That is, even when a small number of commodities are stored on the commodities storing path, it is not necessary to move the movable plate to the rear end of the commodities storing path. Therefore, the commodities storing apparatus is easy and convenient to handle.

When a material having a superior sliding-contact property is removably mounted on the runway member, on which the movable plate slides, by means of a plurality of locking claws, assembly can be performed merely by inserting such the material, thus simplifying assembling work.

Because the runway member for sliding the movable plate inclines from a certain position thereof to the rear end thereof, a small force suffices to move commodities to the feed-out port. Thus, the sliding member can be made compact and thin. Furthermore, this advantage can be obtained by utilizing the commodities feed-out space above the commodities storing shelf. The height of the rear end of the inclined sliding path member is set to be lower than that of the second commodities receiving plate when second commodities receiving plate has become highest as a result of the pivotal motion thereof. Therefore, even commodities accommodated at the rear end of the commodities storing shelf can be prevented from being caught at the bottom surface of the commodities storing shelf upstairs. Thus, it does not occur that the commodities cannot be moved to the feed-out port and that the commodities storing shelf cannot be pulled out from the vending machine.

The commodities storing apparatus may have commodities storing shelves mounted therein, a commodities transport path vertically provided in front of the commodities storing shelves, gutter-shaped commodities storing cases constituting the commodities storing shelves, commodities feed-out devices, and commodities storing paths formed inside each of the commodities storing cases. Each of the commodities feed-out devices comprises: first commodities receiving plates each provided at a front end of the commodities storing path to open and close the front end of the commodities storing path; second commodities receiving plates each provided on a bottom surface of the commodities storing path to open and close the commodities storing path; operation members each interlocked with the first commodities receiving plate and contacting the second commodities receiving plates to drive the second commodities receiving plate; movable plates each slidable on the bottom surface of the commodities storing path; rotary drums each rotatably provided at a rear end of the commodities storing path; belt-shaped sliding members each having one end fixed to a lower portion of the movable plate and the other end fixed to the rotary drum, the sliding member being bent in the form of a figure "U" at a front portion of the commodities storing path; first spring-installing drums each positioned at a rear end of the commodities storing path and being coaxial and integral with the rotary drum; second spring-installing drums each juxtaposed with the first spring-installing drum; and spiral elastic members each provided between the first spring-installing drum and the second spring-installing drum and urging the sliding member in a direction in which the sliding member is wound around the rotary drum. A curved portion is formed on the second commodities receiving plate at a position thereof corresponding to an upper end thereof, when the second commodities receiving plate projects above the commodities storing path.

According to the above-described construction, a gap can be secured between the front end of the second commodities receiving plate and a commodity to be sold in the next sale and between the front end of the second commodities receiving plate and the movable plate. Therefore, it does not an article attached to the bottom of the commodities or to the rear surface thereof is not caught between the second commodities receiving plate and the commodity to be sold in the next sale or the movable plate. Thus, it does not occur that the commodities cannot be fed out.

When a relief portion is formed on the second commodities receiving plate by recessing a portion of the second commodities receiving plate on a side thereof confronting the commodities, a gap is secured between the second commodities receiving plate and the commodity to be sold in the next sale and between the second commodities receiving plate and the movable plate.

When a pair of relief portions are provided, the gap between the second commodities receiving plate and the commodity to be sold in the next sale and the gap between the second commodities receiving plate and the movable plate can be increased to maintain the function of preventing commodities from being fed out in a stand-by state. In addition, even though an article is attached to an opposite side of commodities, it does not occur that the article attached to the bottom or the rear surface of the commodities is caught between the second commodities receiving plate and the commodity to be sold in the next sale or the gap between the second commodities receiving plate and the movable plate without replacing the second commodities receiving plate with another one.

A second pressing strip may be provided, with one end thereof fixed to a side surface of the movable plate and the other end thereof positioned at a front portion of the movable plate such that a front end of the second pressing strip contacts a part of the second commodities receiving plate other than the relief portions, when the movable plate has reached the front end of the commodities storing path. By this construction, a gap can be securely formed between the second commodities receiving plate and the movable plate by pressing the movable plate rearward along the commodities storing path through the second pressing strip. Thus, it does not occur that an article attached to the bottom or rear surface of commodities is caught between the second commodities receiving plate and the movable plate.

In a commodities storing apparatus of a vending machine having commodities storing shelves mounted therein, a commodities transport path is vertically provided in front of the commodities storing shelves, gutter-shaped commodities storing cases constitute the commodities storing shelves, commodities feed-out devices are provided, and commodities storing paths are formed inside each of the commodities storing cases. Each of the commodities feed-out devices comprise first commodities receiving plates each provided at a front end of the commodities storing path to open and close the front end of the commodities storing path. Second commodities receiving plates are each provided on a bottom surface of the commodities storing path to open and close the commodities storing path. Operation members are each interlocked with the first commodities receiving plate and contacting the second commodities receiving plates to drive the second commodities receiving plate. Movable plates are each slidable on the bottom surface of the commodities storing path. Rotary drums are each rotatably provided at a rear end of the commodities storing path. Belt-shaped sliding members each have one end fixed to a lower portion of the movable plate and the other end fixed to the rotary drum, the sliding member being bent in the form of a figure "U" at a front portion of the commodities storing path. First spring-installing drums are each positioned at a rear end of the commodities storing path and coaxial and integral with the rotary drum. Second spring-installing drums are each juxtaposed with the first spring-installing drum. Spiral elastic members are each provided between the first spring-installing drum and the second spring-installing drum and urge the sliding member in a direction in which the sliding member is wound around the rotary drum. The second commodities receiving plate has a projection formed on a side opposite to a side thereof contacting the commodities. This construction prevents commodities from sliding down from the second commodities receiving plate, with the commodities standing. Thus, it does not occur that the commodities cannot be fed out from the feed-out port.

Alternatively, in a commodities storing apparatus of a vending machine having commodities storing shelves mounted therein. A commodities transport path is vertically provided in front of the commodities storing shelves. Gutter-shaped commodities storing cases constite the commodities storing shelves, commodities feed-out devices are provided, and commodities storing paths are formed inside each of the commodities storing cases. Each of the commodities feed-out devices comprises first commodities receiving plates each provided at a front end of the commodities storing path to open and close the front end of the commodities storing path. Second commodities receiving plates are each provided on a bottom surface of the commodities storing path to open and close the commodities storing path. Operation members are each interlocked with the first commodities receiving plate and contacting the second commodities receiving plates to drive the second commodities receiving plate. Movable plates are each slidable on the bottom surface of the commodities storing path. Rotary drums are each rotatably provided at a rear end of the commodities storing path. Belt-shaped sliding members each have one end fixed to a lower portion of the movable plate and the other end fixed to the rotary drum, the sliding member being bent in the form of a figure "U" at a front portion of the commodities storing path. First spring-installing drums are each positioned at a rear end of the commodities storing path and coaxial and integral with the rotary drum. Second spring-installing drums are each juxtaposed with the first spring-installing drum. Spiral elastic members are each provided between the first spring-installing drum and the second spring-installing drum and urge the sliding member in a direction in which the sliding member is wound around the rotary drum. The movable plate has a first pressing strip projecting from a lower portion of a front surface thereof. By this construction, even though a force due to inclining the movable plate rearward exists, the reaction force of the pressing force due to the first pressing strip offsets the force of inclining the movable plate rearward. Thus, the movable plate can be prevented from inclining rearward and, hence, a reduction in the pressing force of the movable plate can be prevented. Hence, unreliable feed-out of the commodities can be prevented.

Commodities stored on the commodities storing path can consist of a body and a straw or the like attached to a rear surface of the body such that a front end of the first pressing strip contacts the rear surface of the body. This construction prevents the first pressing strip from contacting a straw or the like attached to commodities and prevents reduction in the pressing force of the movable plate from being reduced. Hence, unreliable feed-out of the commodities can be prevented.

A second pressing strip may be provided at a front portion of the movable plate, with one end thereof fixed to a side surface of the movable plate and the other end thereof positioned alongside the first pressing strip, wherein a gap is formed between the second commodities receiving plate and the first pressing strip when a front end of the second pressing strip contacts the second commodities receiving plate as a result of the arrival of the movable plate at the front end of the commodities storing path. In this construction, a gap can be securely formed between the second commodities receiving plate and the movable plate. Thus, an article attached to the bottom or rear surface of commodities is not caught between the second commodities receiving plate and the movable plate. Further, a reduction in the pressing force of the movable plate can be prevented. Thus, it does not occur that the commodities cannot be fed out from the feed-out port.

Also alternatively, in a commodities storing apparatus of a vending machine having commodities storing shelves mounted therein, a commodities transport path is vertically provided in front of the commodities storing shelves. Gutter-shaped commodity storing cases constituting the commodities storing shelves, and commodities feed-out devices are provided. Commodities storing paths are formed inside each of the commodities storing cases. Each of the commodities feed-out devices comprises first commodities receiving plates each provided at a front end of the commodities storing path to open and close the front end of the commodities storing path. Second commodities receiving plates are each provided on a bottom surface of the commodities storing path to open and close the commodities storing path. Operation members are each interlocked with the first commodities receiving plate and contact the second commodities receiving plates to drive the second commodities receiving plate. Driving motors each drive the first commodities receiving plate and the operation member. Movable plates are each slidable on the bottom surface of the commodities storing path; rotary drums are each rotatably provided at a rear end of the commodities storing path. Belt-shaped sliding members each have one end fixed to a lower portion of the movable plate and the other end fixed to the rotary drum, the sliding member being bent in the form of a figure “U” at a front portion of the commodities storing path. First spring-installing drums are each positioned at a rear end of the commodities storing path and coaxial and integral with the rotary drum. Second spring-installing drums are each juxtaposed with the first spring-installing drum. Spiral elastic members are each provided between the first spring-installing drum and the second spring-installing drum and urge the sliding member in a direction in which the sliding member is wound around the rotary drum. Sellout detection portions each detect that there is one commodity left on the commodities storing path and that all commodities have been sold out. Last sale storage means stores data indicating that the last commodity is sold in a next sale. Motor driving means for drive the driving motor. Motor control means outputs a driving signal to the motor driving means when a commodity is sold and receives a last sale detection signal from the sellout detection portion. The motor control means outputs a signal to the last sale storage means, wherein in selling commodities, the motor control means reads data stored in the last sale storage means, outputs a signal to the motor driving means only when the last commodity is sold, and drives the first commodities receiving plate and the operation member so as to perform a commodities feed-out operation twice successively. According to this construction, a gap can be securely formed between the second commodities receiving plate and the movable plate. Thus, it does not occur that an article attached to the bottom or rear surface of commodities depicts caught between the second commodities receiving plate and the movable plate. The state in which a reduction in the number of the commodities from two to one is detected. Because the detection range is wide, the detection of sellout can be accurately accomplished by a simple construction.

Before a first commodities feed-out operation terminates completely, a second commodities feed-out operation starts. By so doing, it takes a short period of time to feed out the last commodity placed on the commodities storing path. Further, even though the upper portion of the commodities falls down into the movement locus of the first commodities receiving plate, it does not occur that the commodities cannot be fed out from the feed-out port.

BRIEF DESCRIPTION OF THE DRAWINGS

FIG. 7 (*b*) is a side view showing main portions of the operation member, of the commodities storing apparatus shown in FIG. 3, in the stand-by position;

FIG. 8 (*b*) depicts a main portion side view showing the state in which the operation member of the commodities storing apparatus shown in FIG. 3 has pivoted clockwise;

FIG. 9 (*b*) depicts a main portion side view showing a state in which the operation member of the commodities storing apparatus shown in FIG. 3 has pivoted counterclockwise;

FIG. 13 (*b*) is a side view showing in detail the stand-by position of the commodities storing apparatus shown in FIG. 11;

FIG. 14 (*b*) is a side view showing a state in which the operation member of the commodities storing apparatus shown in FIG. 11 has pivoted clockwise;

FIG. 15 (*b*) is a side view showing the state in which the operation member of the commodities storing apparatus shown in FIG. 11 has pivoted counterclockwise;

FIG. 27 (*b*) is a side view showing in detail the stand-by position of the commodities storing apparatus shown in FIG. 23;

FIG. 28 (*b*) is a side view showing the state in which the operation member of the commodities storing apparatus shown in FIG. 23 has pivoted clockwise;

FIG. 29 (*b*) is a side view showing the state in which the operation member of the commodities storing apparatus shown in FIG. 23 has pivoted counterclockwise;

FIG. 32 (*b*) is a perspective view showing the sellout detection portion of the commodities storing apparatus shown in FIG. 23 when commodities have sold out;

FIG. 37 (*b*) is a side view showing in detail the stand-by position of the commodities storing apparatus shown in FIG. 33;

FIG. 38 (*b*) is a side view showing the state in which the operation member of the commodities storing apparatus shown in FIG. 33 has pivoted clockwise;

FIG. 39 (*b*) is a side view showing the state in which the operation member of the commodities storing apparatus shown in FIG. 33 has pivoted counterclockwise;

FIG. 42 (*b*) is a perspective view showing the sellout detection portion of the commodities storing apparatus shown in FIG. 33 when commodities have sold out;

DETAILED DESCRIPTION OF THE PREFERRED EMBODIMENT

The embodiments of the present invention will be described below with reference to drawings.

Figure 1:
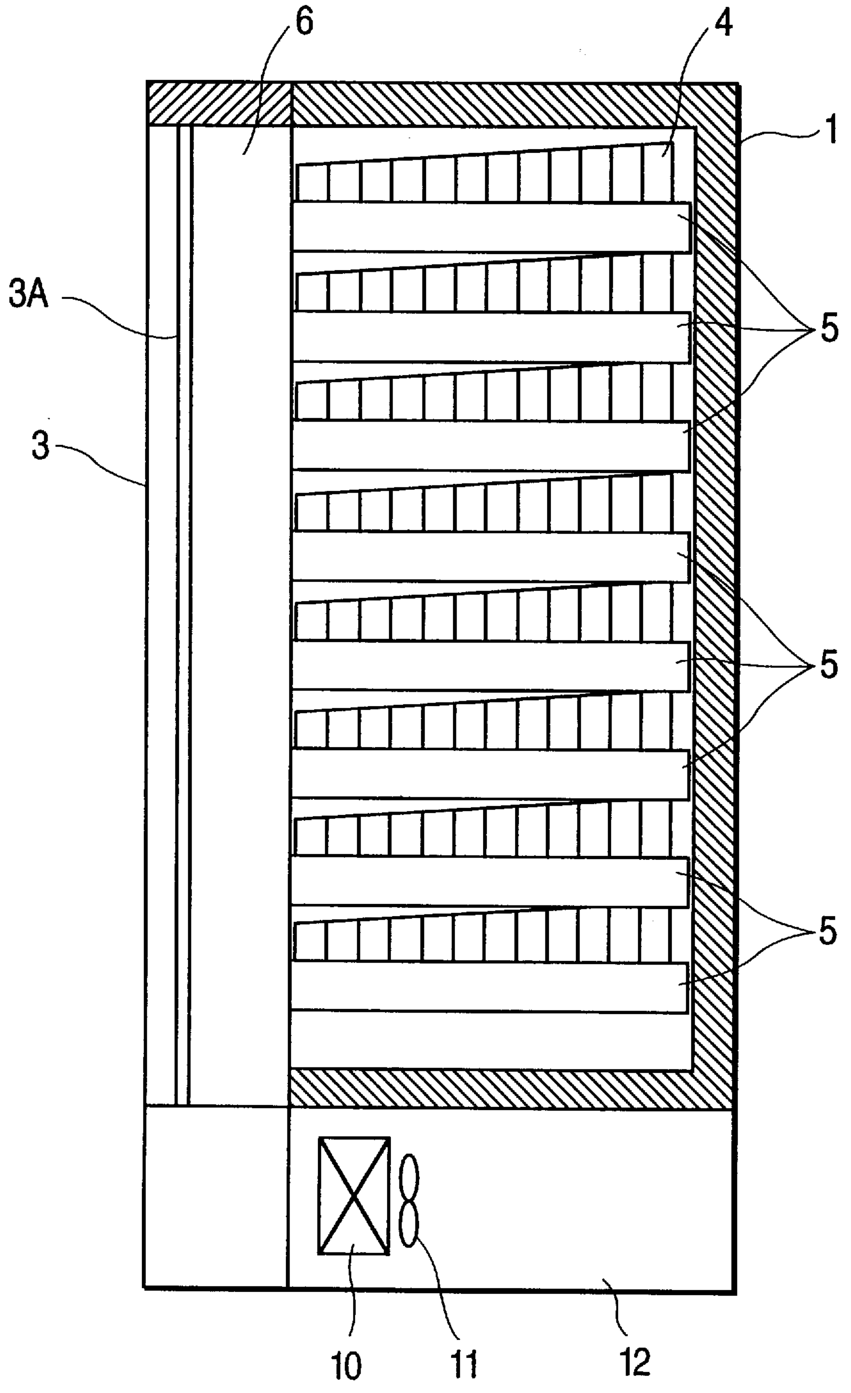
FIG. 1 is a vertical sectional view showing a commodities storing apparatus of a vending machine according to the present invention.
Figure 2:
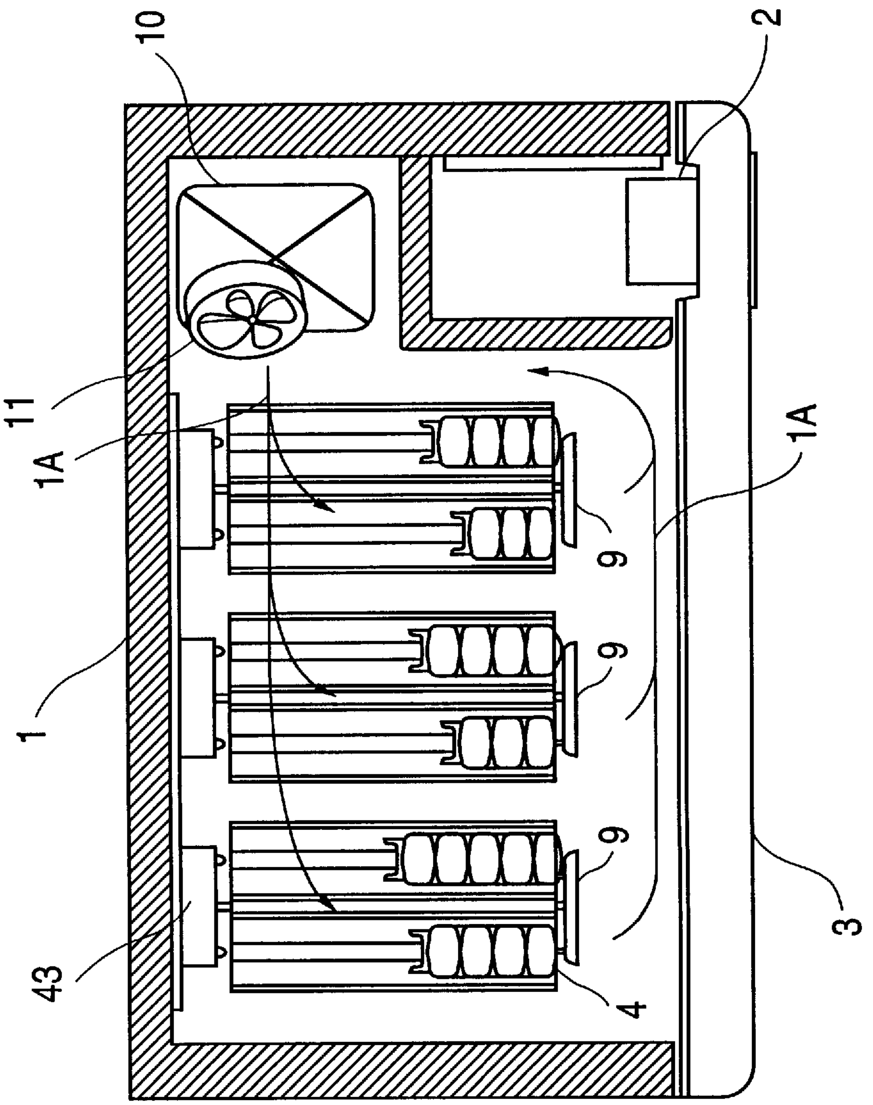
FIG. 2 is a transverse sectional view showing the commodities storing apparatus shown in FIG. 1.
Figure 3:
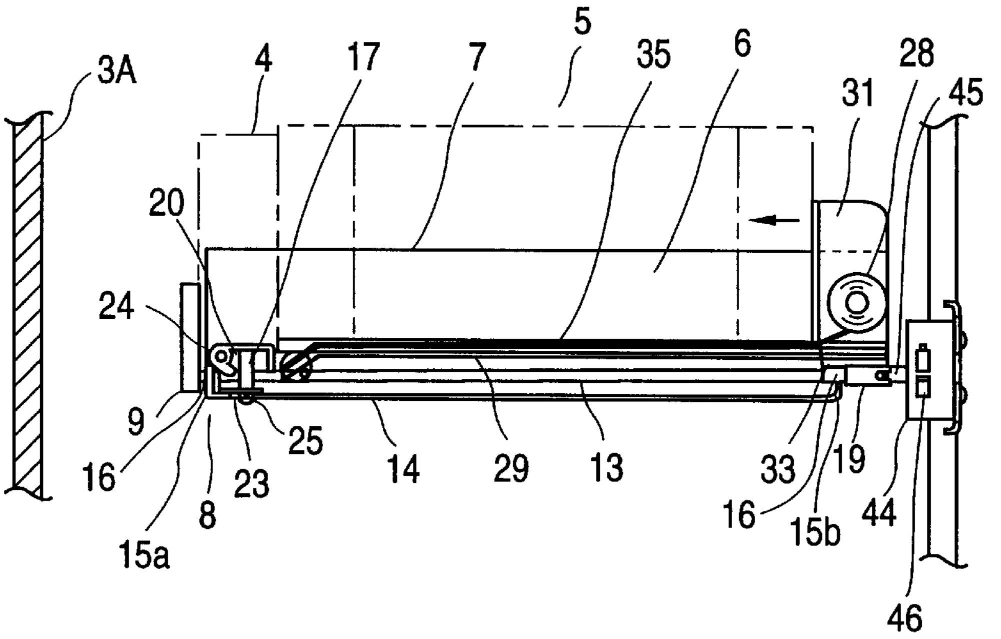
FIG. 3 is a sectional view showing a commodities storing apparatus of a vending machine according to a first embodiment of the present invention.
Figure 4:
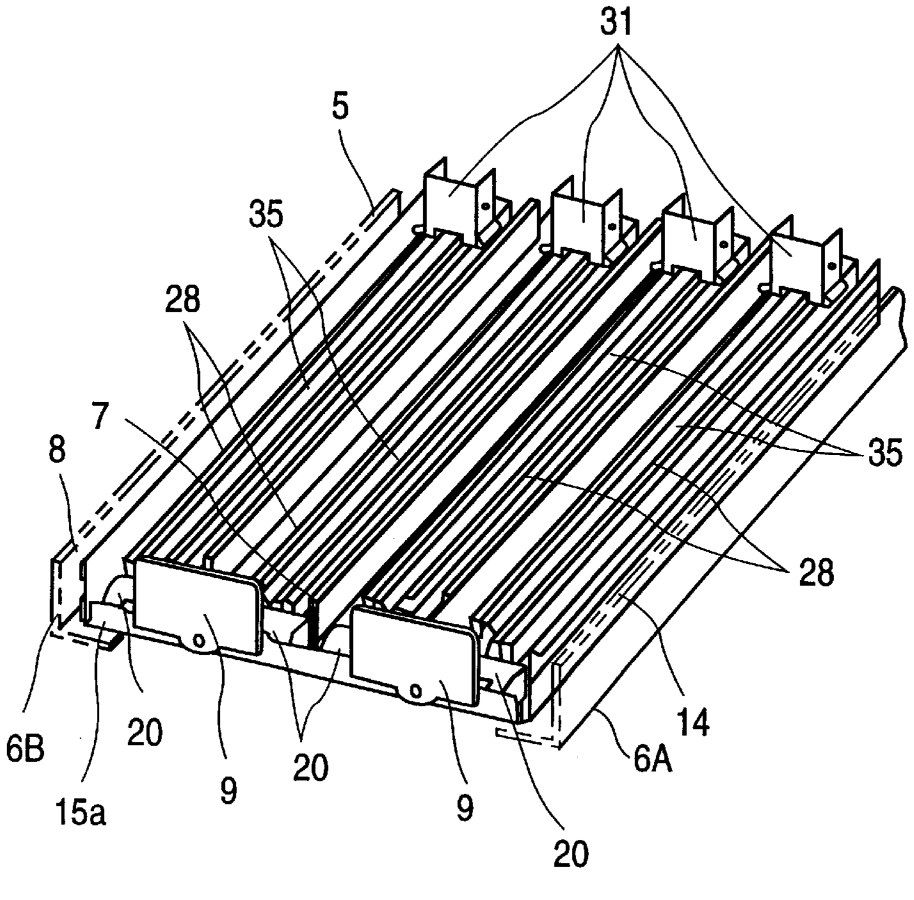
FIG. 4 is a perspective view showing the commodities storing apparatus shown in FIG. 3.
Figure 5:
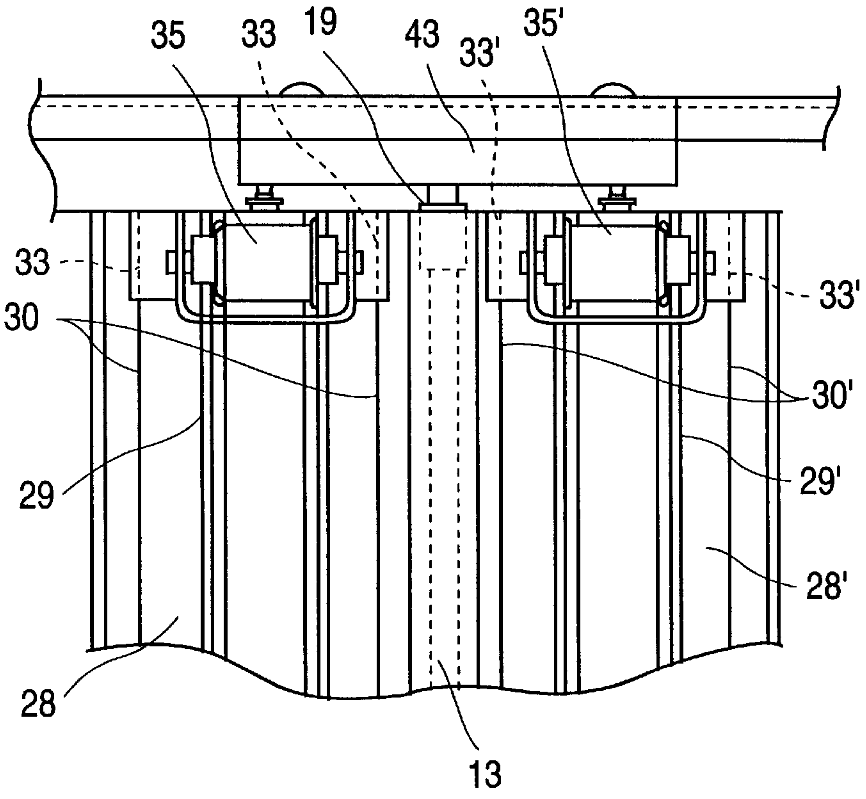
FIG. 5 is a plan view showing main portions of the commodities storing apparatus shown in FIG. 3.
Figure 6:
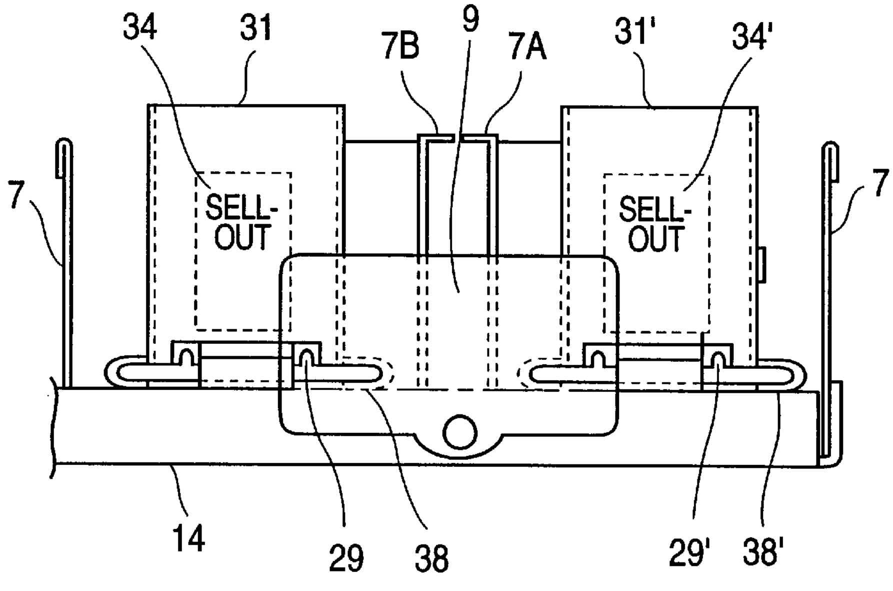
FIG. 6 is an enlarged front view showing a first commodities receiving plate of the commodities storing apparatus shown in FIG. 3.
Figure 7A:
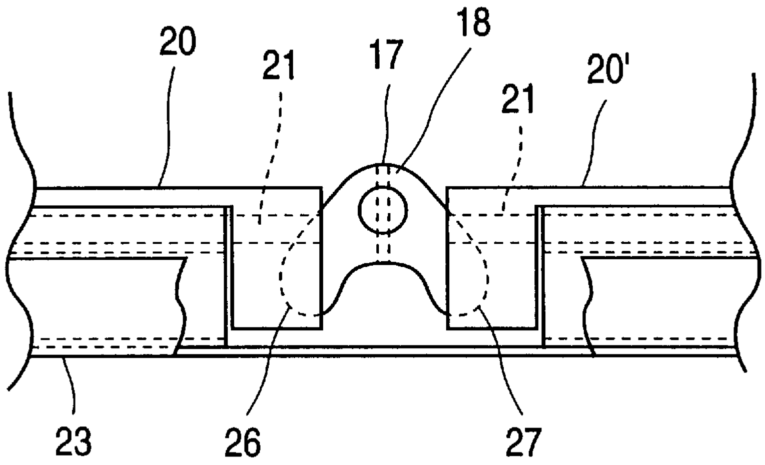
FIG. 7 (*a*) is a front view showing main portions of an operation member, of the commodities storing apparatus shown in FIG. 3, in a stand-by position.
Figure 7B:
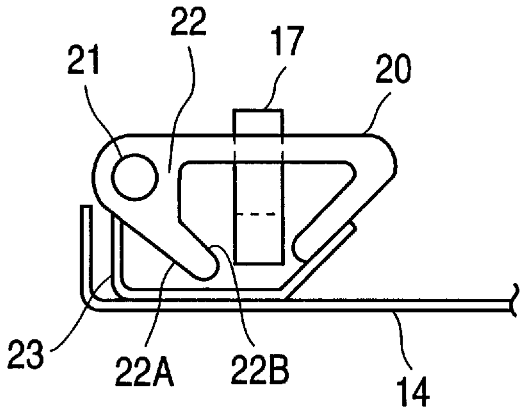
Figure 8A:
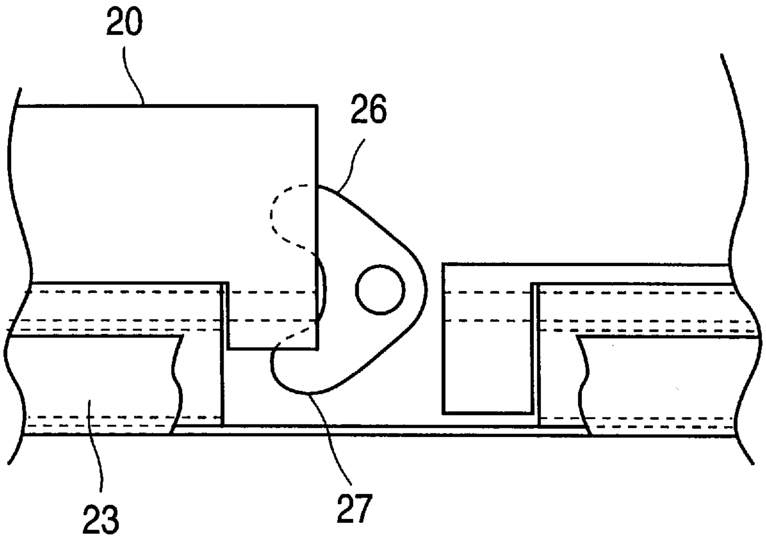
FIG. 8 (*a*) depicts a main portion front view showing a state in which the operation member of the commodities storing apparatus shown in FIG. 3 has pivoted clockwise.
Figure 8B:
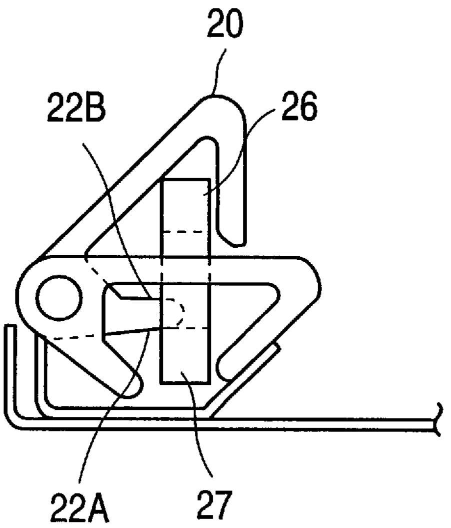

As shown in FIGS. 1 and 2, a vending machine having a commodities storing apparatus according to the present invention comprises a generally box-shaped body 1 and a coin mechanism 2 provided on one side of the front surface of the body 1. A front door 3 having a transparent glass 3A is pivotally mounted on the front surface of the body 1 so that the inside of the body 1 can be seen through the front surface of the body 1. The front door 3 can be opened by pivoting it. The body 1, surrounded with heat insulation walls, accommodates a plurality of vertically arranged commodities storing shelves 5 on each of which commodities 4, such as drinks, are to be placed, with the longer side thereof vertically.

A machinery chamber 12 accommodating an evaporator 10 and a circulation fan 11 is provided at the bottom of the body 1. Operation of the circulation fan 11 causes air inside the body 1 to flow along a circulation path 1A from the upper side of the body 1 to the lower side thereof and to pass through the evaporator 10.

The evaporator 10 together with a compressor, a condenser and a capillary tube, all of which are not shown, constitute a refrigerating apparatus. In summer, the commodities 4 placed on the commodities storing shelves 5 are cooled by air which is cooled through the evaporator 10 and circulated inside the body 1. In winter, air circulating inside the body 1 is heated by a heater provided along the circulation path 1A to warm the commodities 4 placed on the commodities storing shelves 5.

First Embodiment

The commodities storing apparatus 8 according to the present invention comprises commodities storing shelves 5 and driving motors 44.

As shown in FIGS. 3 through 10, between side rails 6A and 6B erected on both sides of each commodities storing shelf 5, there are provided a plurality of commodities storing paths defined by U-shaped commodities storing plates 7 which partition the space between the side rails 6A and 6B into a plurality of equal intervals in correspondence to the width of the commodities 4.

In the commodities storing shelf 5, the height of the front side (left-hand side in the figures) thereof is lower than that of the rear side thereof. That is, the commodities storing shelf 5 declines toward the front side thereof. The commodities storing apparatus 8 has two first commodities receiving plates at a front portion of each commodities storing shelf 5 to prevent the commodities 4 placed on the commodities storing shelf 5 from rolling forward and dropping therefrom.

Each commodities storing shelf of the commodities storing apparatus 8 has two commodities storing paths, and each transparent first commodities receiving plate 9 is provided in front of the exits of the two commodities storing paths to hold the commodities 4 placed thereon. The commodities 4 are stored on the commodities storing paths, with the leading commodity 4 in contact with the rear surface of each of the first commodities receiving plates 9 and with a plurality of commodities 4 arranged rearward of the leading commodity 4. The commodities storing shelf 5 can be pulled forward along the side rails 6A and 6B when the commodities 4 are stored on the commodities storing paths.

Each of the first commodities receiving plate 9 is made of a plate-like transparent member and has protruding ribs formed thereon on the side of the commodities storing paths to prevent the commodities 4 from contacting it entirely. Each of the first commodities receiving plates 9 is formed by molding so as to close about ⅓ of the area of each commodities transport path 6 and is positioned in front of the exits of the commodities storing paths defined by the two commodities storing plates 7.

The first commodities receiving plate 9 is connected at its lower end of a central portion thereof to a driving shaft 13 extending in a direction generally perpendicular to the first commodities receiving plate 9. The driving shaft 13 extends over the length of the associated commodities storing path and is supported, for rotation thereof, by a through-hole 16 defined in each of L-shaped flanges 15*a* and 15*b* positioned at the front and rear of a base 14 of the commodities storing shelf. An operation member 17 located rearward of the first commodities receiving plate 9 and having the configuration of a generally inverted U-shaped cam is fixed to the driving shaft 13 at the commodities feed-out port side thereof by means of an elastic pin 18 inserted through the operation member 17 and the driving shaft 13. A connection member 19 having a U-shaped cut-out is mounted on the driving shaft 13 at the rear end thereof with a pin.

A second commodities receiving plate 20 is disposed on the feed-out side of each commodities transport path formed on the base 14 and is positioned rearward of the first commodities receiving plate 9. The second commodities receiving plate 20 is pivotally mounted on a shaft 24 and has a through-hole 21 extending therethrough and a generally inverted U-shaped claw portion 22 projecting at one end thereof. The second commodities receiving plate 20 has the other end provided with a small radius. The second commodities receiving plate 20 is rotatably mounted, via the shaft 24, on a curled L-shaped supporting plate 23 fixed on the commodities sliding surface of each of the two adjacent commodities storing paths by screws 25.

When the two neighboring second commodities receiving plates 20 are in a horizontal state, they are proximate to an A-claw 26 and a B-claw 27 of the operation member 17 having the configuration of an inverted U-shaped cam. When the driving shaft 13 rotates clockwise (FIGS. 8(*a*) and 8(*b*)), the operation member 17 pivots clockwise, with the A-claw 26 formed on the operation member 17 in contact with the left-hand second commodities receiving plate 20. When the operation member 17 has pivoted in a small amount, the B-claw 27 formed on the operation member 17 contacts a lower claw 22A of a generally U-shaped claw portion 22 of the left-hand second commodities receiving plate 20. Thereafter, the operation member 17 keeps pivoting clockwise, thus reaching an uppermost position.

When the operation member 17 has pivoted to the uppermost position, a position detection switch 46 installed in a case accommodating the driving motor 44 is turned on. At this time, the operation member 17 starts to rotate counterclockwise, with the A-claw 26 in contact with an upper claw 22B of the generally U-shaped claw portion 22 of the left-hand second commodities receiving plate 20, thus pressing the left-hand second commodities receiving plate 20 downward. When the left-hand second commodities receiving plate 20 has become horizontal, the operation member 17 having the configuration of an inverted U-shaped cam moves away from the left-hand second commodities receiving plate 20. In this state, the position detection switch 46 is turned on to stop the driving motor 44.

Figure 9A:
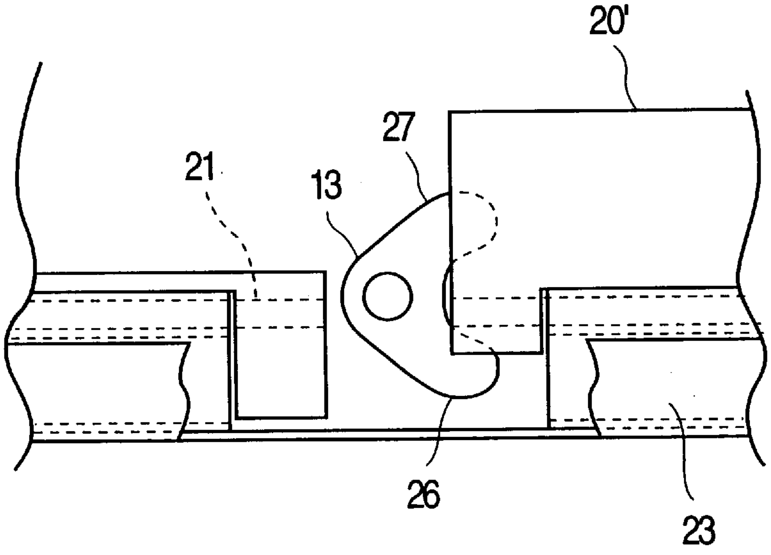
FIG. 9 (*a*) depicts a main portion front view showing a state in which the operation member of the commodities storing apparatus shown in FIG. 3 has pivoted counterclockwise.
Figure 9B:
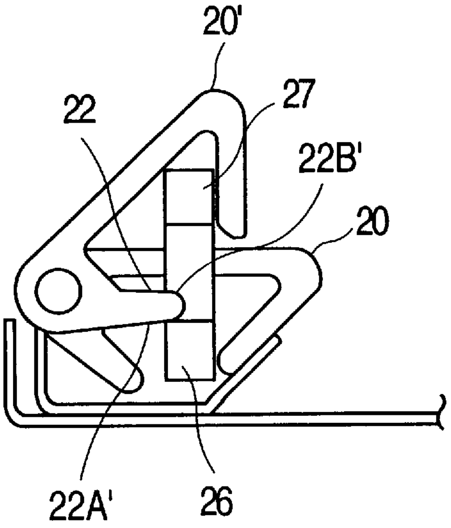
Figure 10:
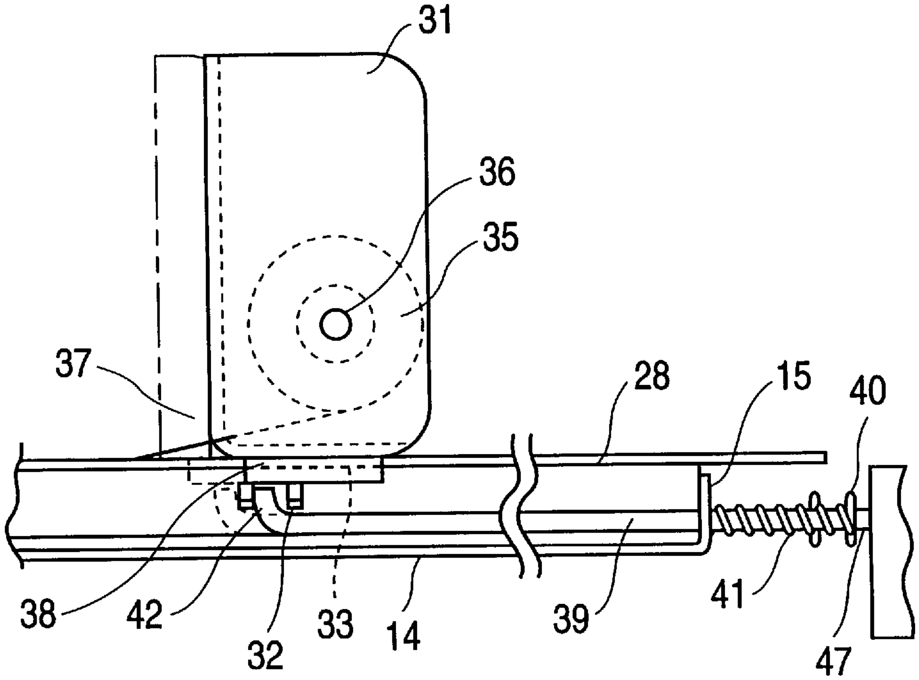
FIG. 10 depicts a main portion side view showing a commodities detection switch of the commodities storing apparatus shown in FIG. 3.

On the other hand, when the driving shaft 13 rotates counterclockwise (FIGS. 9(*a*) and 9(*b*)), the operation member 17 pivots counterclockwise, with the B-claw 27 formed thereon in contact with the right-hand second commodities receiving plate 20' (in the description which will be made below, (') is attached to a right-hand member as necessary.)

When the operation member 17 has pivoted a small amount, the A-claw 26 formed on the operation member 17 contacts a lower claw 22A' of a generally U-shaped claw portion 22' of the right-hand second commodities receiving plate 20'. Thereafter, the operation member 17 keeps pivoting counterclockwise, thus reaching the uppermost position.

When the operation member 17 has pivoted to the uppermost position, the position detection switch 46 installed in the case accommodating the driving motor 44 is turned on. At this time, the operation member 17 starts to rotate clockwise, with the B-claw 27 in contact with an upper claw 22B' of the generally U-shaped claw portion 22' of the right-hand second commodities receiving plate 20', thus pressing the right-hand second commodities receiving plate 20' downward. When the right-hand second commodities receiving plate 20' has become horizontal, the operation member 17 having the configuration of an inverted U-shaped cam moves away from the right-hand second commodities receiving plate 20'. In this state, the position detection switch 46 is turned on to stop the driving motor 44.

A generally rail-shaped runway member 28 constituting the bottom of each commodities storing path is fixed to the base 14 with screws. On the upper surface of the runway member 28, a plurality of projecting ribs 29, which reduce the contact resistance between the runway member 28 and the commodities, are formed over the entire length of the runway member 28. That is, the ribs 29 serve as the sliding surface on which the commodities slide. An L-shaped feed-out pressing plate 31 is mounted on the sliding surface so as to be slidable along respective sides 30 thereof in the commodities feed-out direction. The feed-out pressing plate 31 has claws 32 and generally U-shaped grooves 33 both formed at its lower portion on respective sides thereof with the respective sides 30 of the sliding surface loosely inserted into the associated grooves 33.

A display 34 indicating "sellout" is written on the front surface of the L-shaped feed-out pressing plate 31. A spiral elastic member 35 is disposed on the rear side of the L-shaped feed-out pressing plate 31 and is rotatably supported on a shaft 36. One end of the spiral elastic member 35 is inserted through a lower rectangular hole 37 of the L-shaped feed-out pressing plate 31 so that the elastic member 35 extends over the whole length of the runway member 28, with the other end thereof fixed to the base 14 with screws at a location behind the second commodities receiving plate 20. The elastic member 35 is positioned lower than the imaginary surface formed by connecting with each other the ribs 29 formed on the runway member 28.

An inverted U-shaped groove 38 is formed at an intermediate portion of the generally rail-shaped runway member 28. An L-shaped detection operation rod 39 is installed below the runway member 28. A locking washer 40 is fixed to the detection operation rod 39 at one end thereof. A compression spring 41 is mounted on the detection operation rod 39 such that the compression spring 41 is positioned in front of the locking washer 40. The detection operation rod 39 is inserted through a hole of the L-shaped bent flange 15*b* of the base 14. The detection operation rod 39 has an L-shaped bent locking strip 42 fixed to the other end thereof and is constantly urged rearward.

When the L-shaped feed-out pressing plate 31 has moved to the position of the second commodities receiving plate 20 as a result of its movement to the front end of the runway member 28, the claw 32 formed at each of both lower ends of the feed-out pressing plate 31 is brought into contact with the L-shaped bent locking strip 42 of the detection operation rod 39 and presses it, thus moving the detection operation rod 39.

One position detection switch 46 is provided for two commodities storing paths 6 and is turned on when a driving motor shaft 45 of the driving motor 44 rotates 90°. The position detection switch 46 is installed on a motor-fixing plate 43 mounted on a rear part of the commodities storing shelf 5. The position detection switch 46 is removably connected with the connection member 19 of the driving shaft 13 having the U-shaped cut-out formed thereon. Further, a commodities detection switch 47 is provided in contact with the detection operation rod 39 installed on each commodities storing path.

When the commodities storing shelf 5 is pulled forward along the side rails 6A and 6B and the commodities are then stored thereon, the connection member 19 is connected with the driving motor shaft 45, and the detection operation rod 39 engages the commodities detection switch 47 so that a locking mechanism (not shown) prevents the movement of the commodities storing shelf 5. The locking mechanism prevents the commodities storing shelf 5 from dropping out of the body 1 when the commodities storing shelf 5 is pulled forward.

The operation of the commodities storing apparatus of the vending machine having the above-described construction is described below with reference to FIGS. 3 through 10.

At a stand-by time, the commodities 4 are stored on the commodities storing paths, with the first commodity 4 being pressed against the first commodities receiving plate 9 and with a plurality of subsequent commodities 4 being pressed by the L-shaped feed-out pressing plate 31.

When a signal indicating the sale of a commodity on the left-hand commodities path is inputted to the driving motor 44, the driving motor 44 rotates clockwise. When the driving shaft 13 rotate clockwise, the transparent first commodities receiving plate 9 fixed to the driving shaft 13 and the operation member 17 fixed thereto pivot clockwise. Therefore, the left-hand second commodities receiving plate 20 in the horizontal state pivots clockwise, with the A-claw 26 formed on the operation member 17 having the configuration of an inverted U-shaped cam in contact with the left-hand second receiving plate 20. When the operation member 17 has pivoted in a small amount, the B-claw 27 formed on the operation member 17 contacts the lower claw 22A of the generally inverted U-shaped claw portion 22 of the left-hand second commodities receiving plate 20. With further clockwise rotation of the operation member 17, the first commodity is moved upward.

When the first commodity has moved to the uppermost position, the first commodities receiving plate 9 pivots outside the right-hand commodities storing plate 7A, thus moving to the commodities transport path, while the second commodity moves toward the commodities feed-out port but is prevented from moving and held by the left-hand second commodities receiving plate 20 because the left-hand second commodities receiving plate 20 projects above the sliding surface. When the driving motor shaft 45 has rotated 90°, the position detection switch 46 is turned on to rotate the driving motor 44 counterclockwise. As a result, the left-hand second commodities receiving plate 20 becomes horizontal, and the driving motor 44 stops. At this time, the second commodity is moved toward the commodities feed-out port by the L-shaped feed-out pressing plate 31 which is urged by the spiral elastic member 35. The second commodity is prevented from dropping to the commodities transport path by the first commodities receiving plate 9 and stopped thereby because the first commodities receiving plate 9 has returned to the standby position by its pivotal motion.

When a signal indicating the sale of a commodity on the right-hand commodities path is inputted to the driving motor 44, the driving motor 44 rotates counterclockwise, thus rotating the driving shaft 13 counterclockwise. As a result, the transparent first commodities receiving plate 9 fixed to the driving shaft 13 and the operation member 17 fixed thereto pivot counterclockwise. Therefore, the right-hand second commodities receiving plate 20 in the horizontal state pivots counterclockwise, with the B-claw 27 formed on the operation member 17 having the configuration of an inverted U-shaped cam in contact with the right-hand second commodities receiving plate 20'. When the operation member 17 has pivoted a small amount, the B-claw 27 formed on the operation member 17 contacts the lower claw 22A' of the inverted U-shaped claw portion 22' of the right-hand second commodities receiving plate 20'. With further counterclockwise rotation of the operation member 17, the first commodity is moved upward.

When the first commodity has moved to the uppermost position, the first commodities receiving plate 9 pivots outside the left-hand commodities storing plate 7B, thus moving to the commodities transport path. The second commodity moves toward the commodities feed-out port but is prevented from moving and held by the right-hand second commodities receiving plate 20' because the right-hand second commodities receiving plate 20' projects above the sliding surface. When the driving motor shaft 45 has rotated 90°, a position detection switch 46' is turned on to rotate the driving motor 44 counterclockwise. As a result, the right-hand second commodities receiving plate 20' becomes horizontal, and the driving motor 44 stops. At this time, the second commodity is moved toward the commodities feed-out port by the L-shaped feed-out pressing plate 31' which is urged by the spiral elastic member 35. The second commodity is prevented from dropping to the commodities transport path by the first commodities receiving plate 9 and stopped thereby because the first commodities receiving plate 9 has returned to the stand-by position by pivotal motion.

When the commodities stored on the commodities storing paths have been sold out, the L-shaped feed-out pressing plate 31 mounted on the generally rail-shaped runway member 28 moves toward the commodities feed-out port. As a result, the claw 32 of the feed-out pressing plate 31 contacts the L-shaped bent locking strip 42 of the L-shaped detection operation rod 39, thus pressing it, with the result that the detection operation rod 39 disengages from the commodities detection switch 47. Thus, the commodities cannot be sold.

The construction of the commodities storing apparatus 8 having the commodities storing shelves 5 is simple. Further, the first commodities receiving plates 9 are transparent. Thus, the commodities stored on the commodities storing shelves 5 can be reliably checked. Further, the commodities can be securely moved to the commodities transport path upon pivotal movement of the second commodities receiving plates 20.

Only one driving motor 44 suffices for the two commodities storing paths. Further, because each of the commodities storing shelves 5 is not provided with wiring, it can be pulled without worrying about the vibrations or shocks generated. Therefore, the commodities storing apparatus of the vending machine according to the present invention can be reliably used.

As described above, in the commodities storing apparatus of the vending machine of the present invention, the transparent first commodities receiving plate pivots to the left-hand commodities storing path or the right-hand commodities storing path. Further, the second commodities receiving plate provided on the sliding surface side of each commodities storing path pivots, thus projecting upward from the sliding surface of the commodities storing path due to the pivotal motion of the operation member fixed to the driving shaft and having the configuration of an inverted U-shaped cam. Therefore, the commodities storing apparatus is allowed to be thin and have a simple construction. Further, commodities can be stored on the commodities storing paths with the longer side thereof vertical and can be fed out therefrom. Also, the commodities in the vending machine can be seen from the outside as in the case of a showcase. Accordingly, samples of the commodities are not required, thus providing an inexpensive vending machine.

Furthermore, the second commodities receiving plate provided on the sliding surface of the commodities feed-out port presses out the first commodity and blocks movement of the second commodity. Therefore, the commodities storing apparatus of the vending machine of the present invention eliminates the need for performing a commodities path-adjusting operation even though commodities have different sizes.

In addition, the force transmission and driving portion and the driving motor can be made compact, and only one set of them is required for two commodities storing paths, making it possible to considerably reduce the space which the commodities storing apparatus occupies in the vending machine. Hence, the commodities storing apparatus is capable of storing many commodities.

Moreover, because the position detection switch, the commodities detection switch, and the compact driving motor are apart from the commodities storing apparatus, wires are not installed on the commodities storing apparatus. Accordingly, there is no possibility that the wires are caught by or contact with some parts of the commodities storing apparatus when the commodities storing shelf is pulled forward to store commodities on the commodities storing paths. Further, it is unnecessary to secure places for complicated wiring. Hence, the commodities storing apparatus is capable of storing commodities efficiently and reliably.

Second Embodiment

Figure 11:
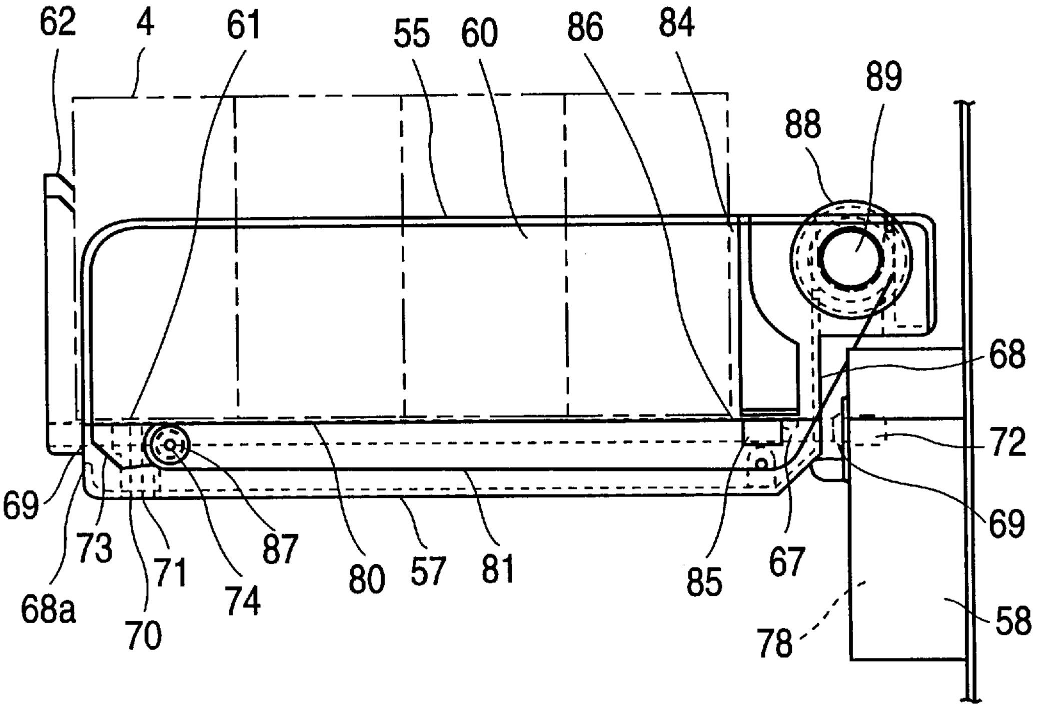
FIG. 11 depicts a main portion sectional side view showing a commodities storing apparatus of a vending machine according to a second embodiment of the present invention.
Figure 12:
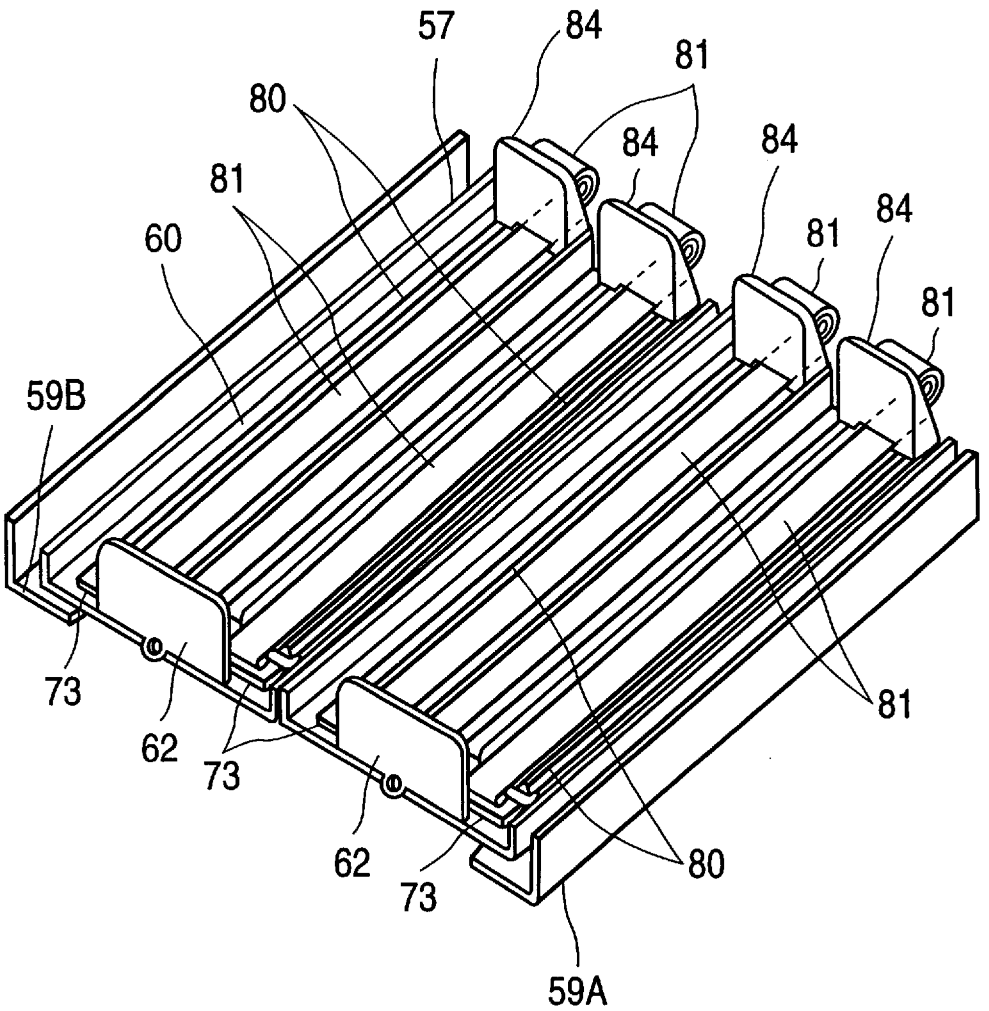
FIG. 12 is a perspective view showing the commodities storing apparatus shown in FIG. 11.
Figure 13A:
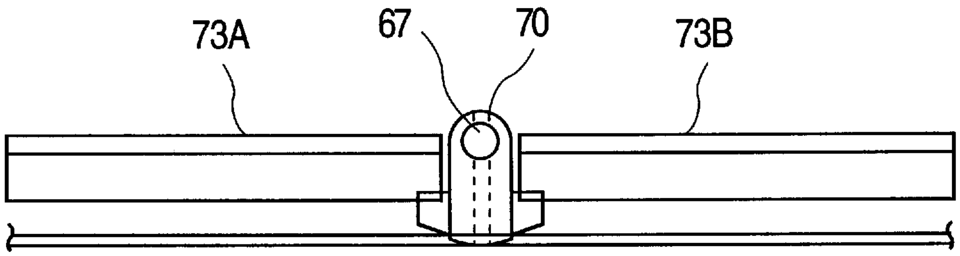
FIG. 13 (*a*) is a front view showing in detail a stand-by position of the commodities storing apparatus shown in FIG. 11.
Figure 13B:
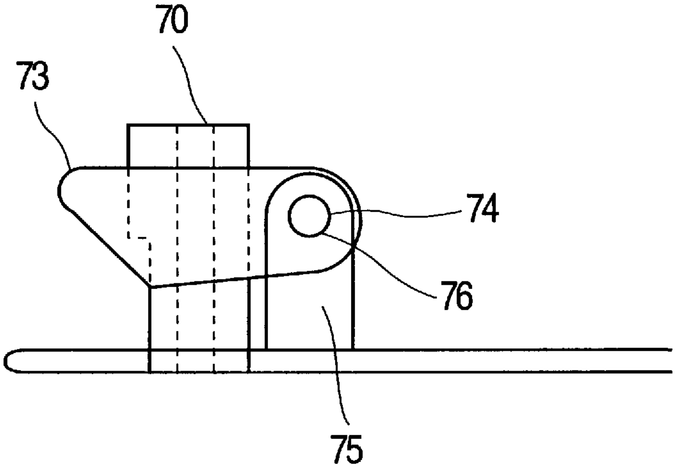

As shown in FIGS. 11 through 13, a commodities storing apparatus 55 comprises a plurality of commodities storing shelves 57 and a plurality of driving motors 58. Between side rails 59A and 59B erected on both sides of the commodities storing shelf 57, there is provided a plurality of gutter-shaped commodities storing paths 60 which partition the space between the side rails 59A and 59B into a plurality of equal intervals in correspondence to the width of the commodities 4.

Each commodities storing shelf 57 has a commodities feed-out device 61 for preventing commodities 4 from rolling forward and being dropped and two adjacent W-shaped commodities storing paths 60 formed by molding. In the commodities feed-out device 61, a transparent first commodities receiving plate 62 for holding the commodities 4 placed on the two commodities storing paths 60 is installed in front of the commodities feed-out port of the two commodities storing paths 60. The commodities 4 are stored on each of the commodities storing paths 60, with the leading commodity 4 in contact with the rear surface of the first commodities receiving plate 62 and a plurality of commodities 4 placed rearward thereof. The commodities storing shelf 57 can be pulled forward along the side rails 59A and 59B in storing the commodities 4 on the commodities storing paths 60.

The commodities feed-out device 61 is positioned at the commodities feed-out port of each of the commodities storing paths 60. The transparent first commodities receiving plate 62 is positioned at the center of the front end of the two gutter-shaped commodities storing paths 60. The transparent first commodities receiving plate 62 is formed by molding to close about ⅓ of the area of each commodities storing path 60. The transparent first commodities receiving plate 62 has projecting ribs formed on the commodities storing path side thereof to prevent the commodities 4 from contacting it entirely. The first commodities receiving plate 62 is connected at the lower end of a central portion thereof to a driving shaft 67 extending in a direction generally perpendicular to the first commodities receiving plate 62. The driving shaft 67 extends over the length of the associated commodities storing path 60 and is supported, for rotation thereof, by a through-hole 69 defined in each of flanges **68*a* and 68*b* positioned at the front and rear of the commodities storing shelf. An operation member 70 located rearward of the first commodities receiving plate 62 and having the configuration of a generally inverted T-shaped cam is fixed to the driving shaft 67 on the commodities feed-out port side thereof by means of an elastic pin 71 inserted through the operation member 70 and the driving shaft 67. The driving shaft 67 has a connection portion 72** flatly formed at the rear end thereof by partial pressure molding.

A second commodities receiving plate 73 (as occasion demands, a left-hand one is denoted as 73A, while a right-hand one is denoted as 73B) is located rearward of the first commodities receiving plate 62 of the commodities feed-out device 61 and is pivotally mounted on a shaft 76 inserted through a through-hole 74. The second commodities receiving plate 73 has one inclined end. The second commodities receiving plate 73 is installed on a commodities sliding surface side of each of the left and right commodities storing paths 60. The second commodities receiving plate 73 is supported pivotally by means of the shaft 76 inserted through the through hole 74 of the second commodities receiving plate 73 and through a hole of a supporting plate 75 positioned at the commodities feed-out port of each of the two gutter-shaped commodities storing paths 60.

Figure 14A:
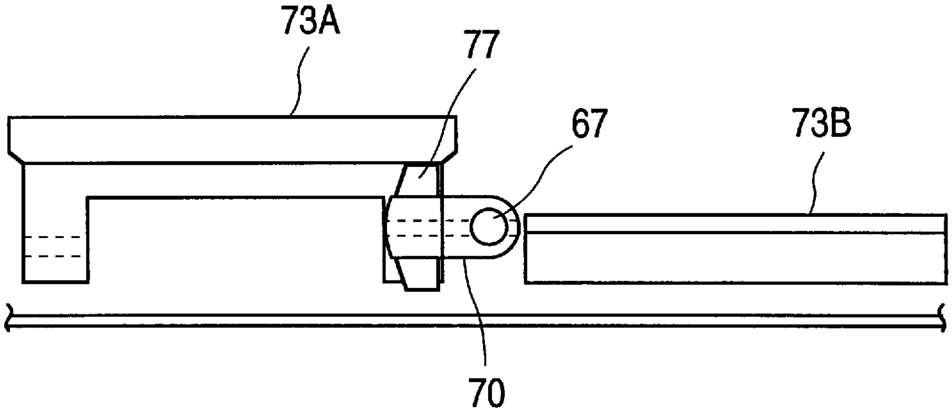
FIG. 14 (*a*) is a front view showing a state in which an operation member of the commodities storing apparatus shown in FIG. 11 has pivoted clockwise.
Figure 14B:
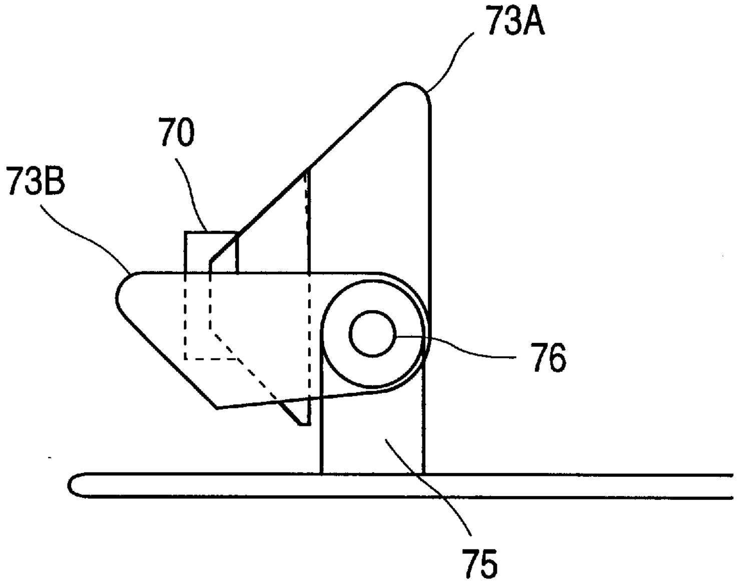
Figure 15A:
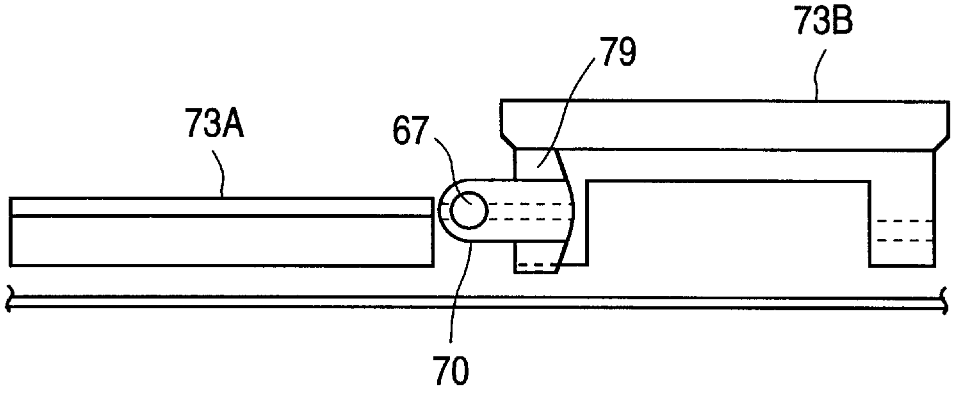
FIG. 15 (*a*) is a front view showing a state in which the operation member of the commodities storing apparatus shown in FIG. 11 has pivoted counterclockwise.
Figure 15B:
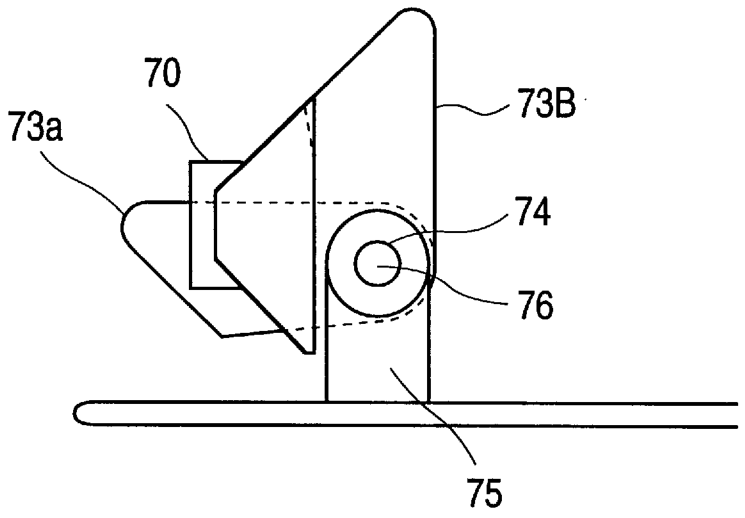

Referring to FIGS. 13 through 15, when the second commodities receiving plates 73 are horizontal, they are proximate to the operation member 70 having the configuration of a generally inverted T-shaped cam. When the driving shaft 67 rotates clockwise, the operation member 70 pivots clockwise, with an A-claw portion 77 formed on the operation member 70 in contact with the left-hand second commodities receiving plate 73A, thus becoming vertical. When the operation member 70 is located at this position, a position detection switch 78 mounted in a casing accommodating the driving motor 58 is turned on. When the operation member 70 at this position starts to rotate counterclockwise and is in a stand-by state, the second commodities receiving plate 73A becomes horizontal. In this state, the position detection switch 78 is turned on and the driving motor 58 stops.

When the driving shaft 67 rotates counterclockwise, the operation member 70 pivots counterclockwise, with a B-claw portion 79 formed on the operation member 70 in contact with the left-hand second commodities receiving plate 73B, thus becoming vertical. When the operation member 70 is at this position, the position detection switch 78 mounted in the casing accommodating the driving motor 58 is turned on. When the operation member 70 at this position starts to rotate clockwise and is at the stand-by state, the second commodities receiving plate 73B becomes horizontal. In this state, the position detection switch 78 is turned on and the driving motor 58 stops.

Figure 16:
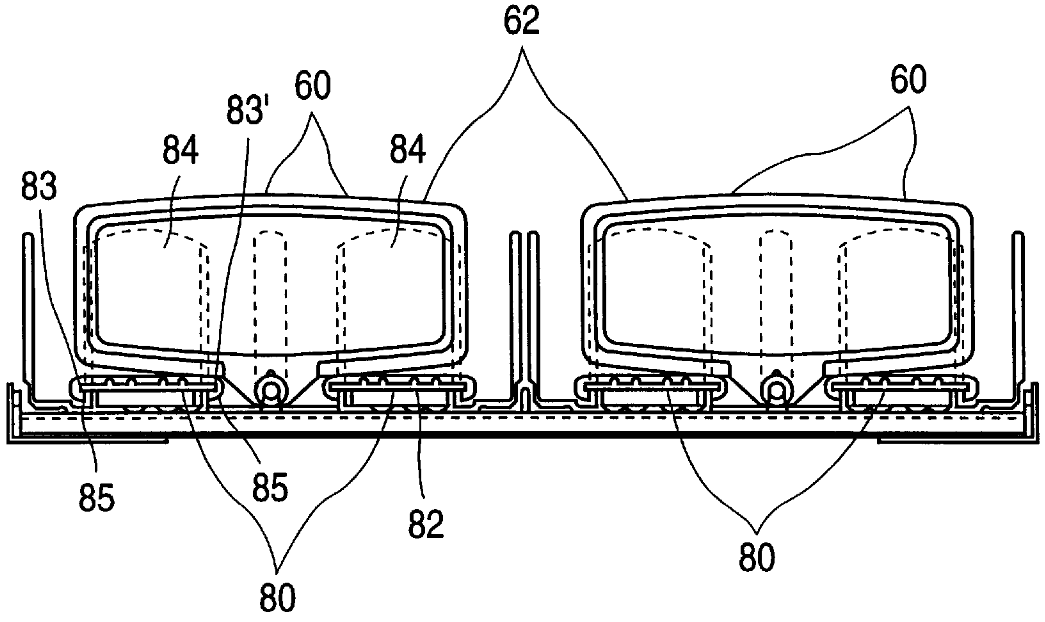
FIG. 16 is an enlarged front view showing a first commodities receiving plate of the commodities storing apparatus shown in FIG. 11.
Figure 17:
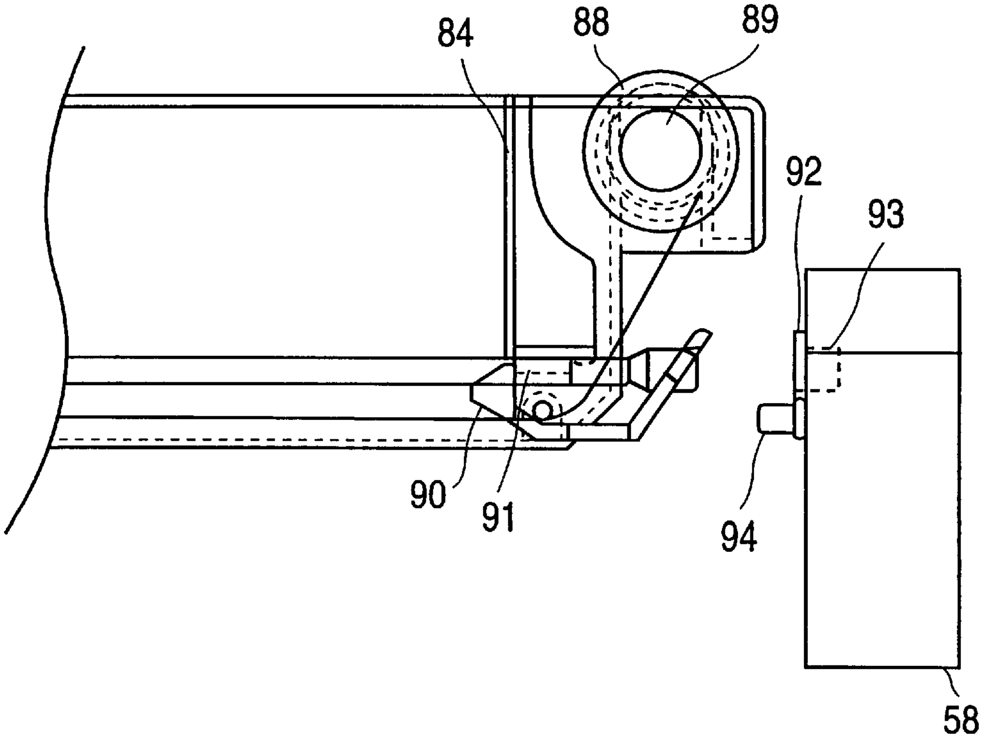
FIG. 17 depicts a main portion sectional side view showing a stopper portion of the commodities storing apparatus shown in FIG. 11.
Figure 18:
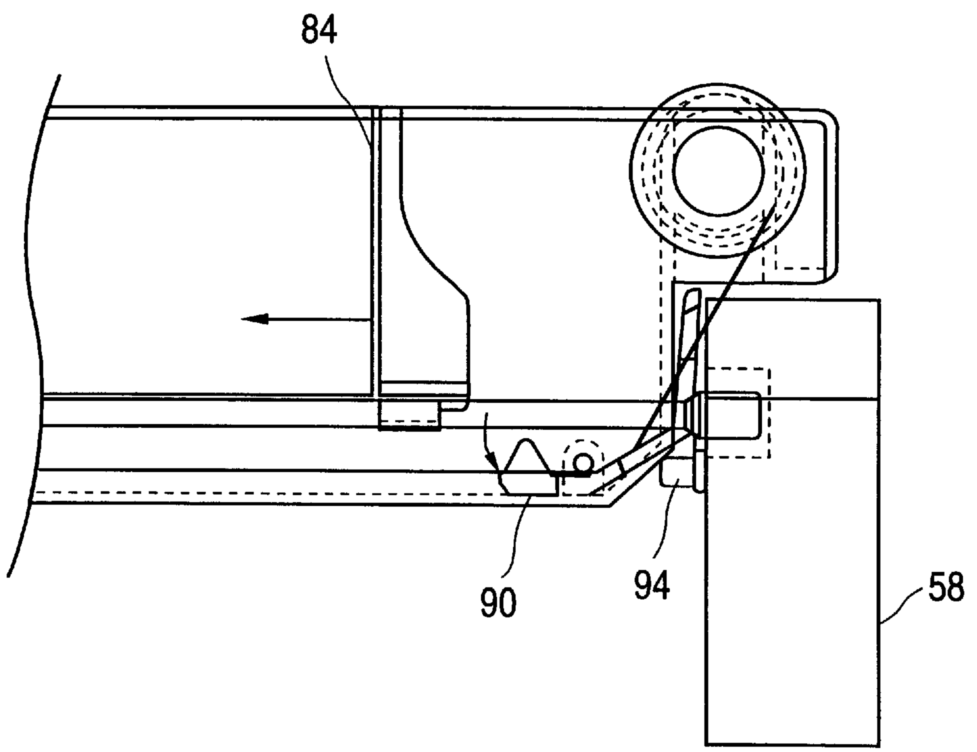
FIG. 18 depicts a main portion sectional side view showing a stopper portion of the commodities storing apparatus shown in FIG. 11.

Referring to FIGS. 16 through 18, a generally rail-shaped runway member 80 is positioned on the bottom of each commodities storing path 60, with one end of the runway member 80 fixed to the commodities feed-out device 61. On the upper surface of the runway member 80, there is formed longitudinally over the length of the runway member 80 a plurality of projecting ribs 82 which reduce the contact resistance between the runway member 80 and a spiral sliding member 81. That is, the ribs 82 serve as the sliding surface on which the spiral sliding member 81 slides. An L-shaped movable plate 84 slidable in the commodities feed-out direction is mounted on the sliding surface at both ends 83 and 83' thereof. In order to allow sliding contact between the movable plate 84 and the spiral sliding member 81 to be favorable, it is effective to form the runway member 80 of a material having a high sliding property.

The movable plate 84 has a U-shaped claw 85 formed on each side of the lower portion thereof so that respective sides 83 and 83' of the sliding surface are loosely inserted into associated U-shaped claws 85. The belt-shaped spiral sliding member 81 for moving the commodities 4 placed on the sliding surface is installed on the lower surface of the L-shaped movable plate 84. The spiral sliding member 81 is inserted through a lower rectangular hole 86 of the L-shaped movable plate 84 and is wound around a rotary member 87 such as a cylindrical roller, the shaft of which is rotatably supported at a cut-out portion of the second commodities receiving plate 73. The sliding member 81 is held in contact with the rotary member 87 so as to form a figure of "U" at the cut-out portion. The spiral sliding member 81 has a length covering the entire length of the runway member 80 so that the spiral sliding member 81 can slide on the upper surface of the rib 82 formed on the runway member 80. One end of the spiral sliding member 81 is wound around a shaft 89 of a rotation control member 88 positioned at an upper portion of the rear end of the commodities storing path 60. When the movable plate 84 slidable on the runway member 80 has moved to the rear end of the commodities storing path 60, the movable plate 84 can be automatically fixed to a stopper 90 of a locking portion 91. When the movable plate 84 is returned back to the stopper 90 to store the commodities on the commodities storing path 60, the movable plate 84 can be automatically fixed to the stopper 90 of the locking portion 91. On the other hand, when the commodities storing shelf 57 is pressed rearward along the side rails 59A and 59B, the movable plate 84 is automatically released from the stopper 90 of the locking portion 91. When the movable plate 84 is released from the locking portion 91, the rotation control member 88 regulates the rotation speed of the shaft when the shaft rotates at a high speed, while it does not regulate the rotation speed thereof when the shaft rotates at a low speed.

Figure 19:
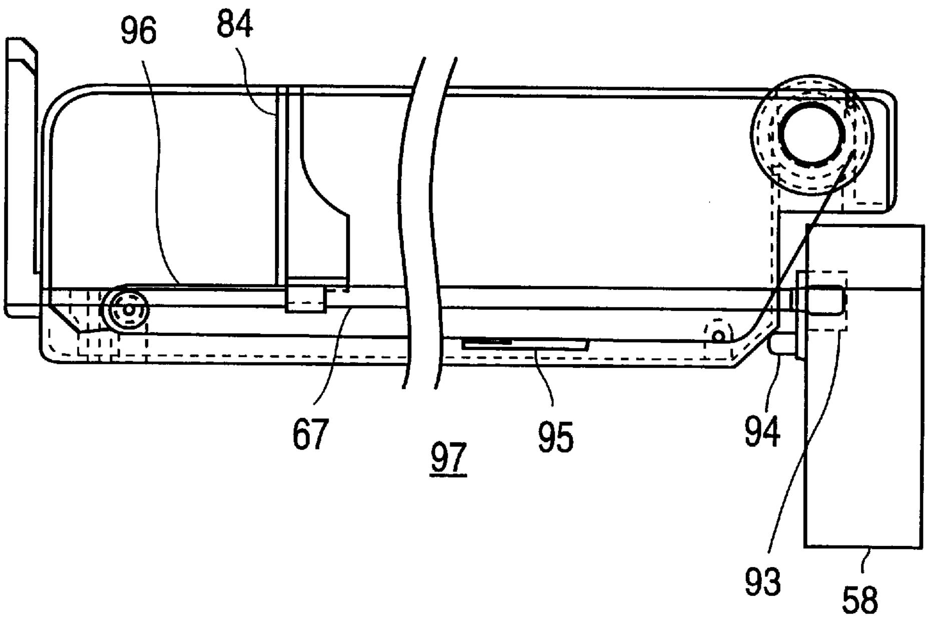
FIG. 19 depicts a main portion sectional side view showing a sellout detection portion of the commodities storing apparatus shown in FIG. 11.
Figure 20:
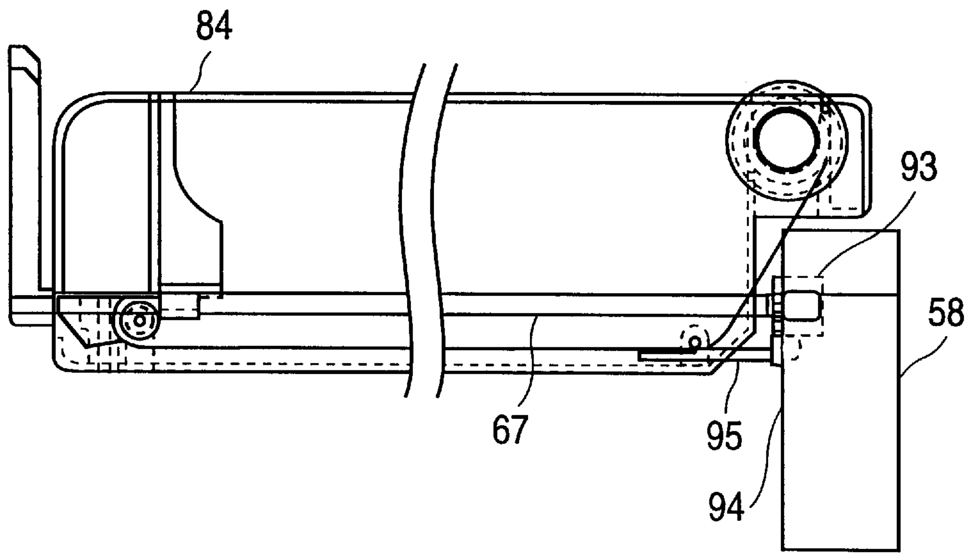
FIG. 20 depicts a main portion sectional side view showing a sellout detection portion of the commodities storing apparatus shown in FIG. 11.

Referring to FIGS. 19 and 20, for two adjacent commodities storing paths 60, there is provided one position detection switch 78 which is turned on when a driving motor shaft 92 of the driving motor 58 provided at the rear of the commodities storing shelf 57 rotates 90°. The rotatable connection portion 72 of the driving shaft 67 is removably mounted in a groove 93 formed on the driving motor shaft 92. Each driving motor 58 is provided with a sellout detection portion 94 for detecting whether or not the commodities placed on each commodities storing path 60 have been sold out.

When the commodities storing shelf 57 has been pulled forward along the side rails 59A and 59B to store the commodities 4 on the commodities storing paths 60 and then is pressed to the rear of the commodities storing shelf 57, the connection portion 72 is connected with the driving motor shaft 92. Consequently, the commodities storing shelf 57 is prevented from moving.

The sellout detection portion 94, which is separate from the commodities storing shelf 57, is operably connected with the movable plate 84 slidably mounted on the sliding surface of the commodities storing path 60. There is provided a sellout operation member 95 fixed to the spiral sliding member 81 positioned below the runway member 80. The sliding member 81 extends to the rear end of the commodities storing path 60 and is bent on the underside of the commodities feed-out port of the commodities storing path 60. When the movable plate 84 has come to the front end of the commodities storing path 60, the sellout operation member 95 moves to the rear end thereof due to the movement of the spiral sliding member 81, thus pressing the sellout detection portion 94.

A belt-shaped bendable movable member 96 may be connected with the sliding member 81, with the movable member 96 interposed between the sliding member 81 and the movable plate 84, and the movable member 96 may be positioned above the runway member 80. A connection member 97 connecting the movable member 96 with the sliding member 81 may have the function of the sellout operation member 95.

The operation of the commodities storing apparatus having the above-described construction is described below with reference to FIGS. 11 through 15.

In a stand-by state, the commodities 4 are stored on the commodities storing paths 60, with the leading commodity 4 pressed against the first commodities receiving plate 62 and a plurality of commodities 4 located rearward of the leading commodity 4, pressed by the L-shaped movable plate 84.

When a signal indicating the sale of a commodity on the left-hand commodities path is inputted to the driving motor 58, the driving motor 58 rotate clockwise. When the driving shaft 67 rotate clockwise, the first commodities receiving plate 62 fixed to the driving shaft 67 and the operation member 70 fixed thereto pivot clockwise. Therefore, the left-hand second commodities receiving plate 73A in the horizontal state rotates clockwise, with the A-claw portion 77 formed on the operation member 70 having the configuration of an inverted T-shaped cam in contact with the left-hand second commodities receiving plate 73A. As a result, the first commodity 4 is moved upward.

When the first commodity 4 has moved to the uppermost position, the first commodities receiving plate 62 pivots outside the left-hand commodities storing path 60, thus moving to the commodities feed-out port, while the second commodity is moved toward the commodities feed-out port side but is prevented from moving forward and held by the second commodities receiving plate 73A, because the second commodities receiving plate 73A projects above the sliding surface. When the driving motor shaft 92 has rotated 90°, the position detection switch 78 is turned on, and the driving motor 58 rotates counterclockwise. Then, the second commodities receiving plate 73A becomes horizontal, and the position detection switch 78 is turned on. As a result, the driving motor 58 stops. At this time, the second commodity 4 is moved toward the commodities feed-out port by the spiral sliding member 81 but is prevented from dropping to the commodities transport path 6 and stopped by the first commodities receiving plate 62 because the first commodities receiving plate 62 has returned to the stand-by position.

When a signal indicating the sale of a commodity on the left-hand commodities path is inputted to the driving motor 58, the driving motor 58 rotates counterclockwise. Thus, the driving shaft 67 rotates counterclockwise. Consequently, the transparent first commodities receiving plate 62 fixed to the driving shaft 67 and the operation member 70 fixed thereto rotate counterclockwise. Therefore, the right-hand second commodities receiving plate 73B in the horizontal state rotates counterclockwise, with the B-claw portion 79 formed on the operation member 70 having the configuration of an inverted T-shaped cam in contact with the right-hand second commodities receiving plate 73B. As a result, the first commodity 4 is moved upward.

When the first commodity 4 has moved to the uppermost position, the first commodities receiving plate 62 pivots outside the right-hand commodities storing path 60, thus moving to the commodities transport path 6, while the second commodity is moved toward the commodities feed-out port but is prevented from moving forward and held by the right-hand second commodities receiving plate 73B because it projects above the sliding surface. When the driving motor shaft 92 has rotated 90°, the position detection switch 78 is turned on, and the driving motor 58 rotates clockwise. Then, the right-hand second commodities receiving plate 73B becomes horizontal, and the driving motor 58 stops.

When the commodities 4 on the commodities storing path 60 have been sold out, the L-shaped movable plate 84 slidable on the generally rail-shaped runway member 80 moves toward the commodities feed-out port and stops. In this state, the sellout operation member 95 fixed to the spiral sliding member 81 having a pulling force actuates the sellout detection portion 94 so as to detect that the commodities have been sold out and the driving motor 58 is not rotated.

Due to the above-described construction, the commodities storing apparatus 55 having the commodities storing shelves 57 can be made thin and simple in its construction. Accordingly, a great force is not required to move the commodities. Further, because the commodities storing case can be removed easily from the vending machine in storing commodities on upper commodities storing shelves 57, even a short person can store the commodities easily.

Moreover, because the widths of the belt-shaped bendable movable member 96 and the sliding member 81 for pulling it can be appropriately selected, even though commodities 4 having a small width are placed on the commodities storing path having a large width, the commodities 4 can be moved without dropping from the movable member 96. Thus, the commodities storing apparatus of the vending machine of the present invention can be reliably used.

As described above, in the commodities storing apparatus of the vending machine of the present invention, the transparent first commodities receiving plate pivots to the left-hand commodities storing path or to the right-hand commodities storing path. Further, the second commodities receiving plate positioned on the sliding surface side of the commodities storing path pivots, thus projecting above the sliding surface of the commodities storing path due to the pivotal motion of the operation member fixed to the driving shaft. Therefore, the commodities on the commodities storing path are moved by the movable plate and the pulling force of the spiral sliding member. Accordingly, the commodities storing apparatus can be made thin and simple in its construction.

Because the commodities are not moved by sliding them on the sliding surface, they can be smoothly moved. Thus, even for commodities having a great friction resistance, the operational force of the sliding member can be made constant.

It is unnecessary to use a great force in moving many commodities placed on the commodities storing path, and even soft commodities can be handled without deforming them.

Because each commodities storing shelf is not provided with wires for the position detection switch, the sellout detection switch, and the compact driving motor, it can be easily removed from the vending machine. Because the commodities storing case is light and can be removed easily from the vending machine in storing commodities on upper commodities storing shelves 57, even a short person can store the commodities easily.

Further, the spiral sliding member has the rotation control member. Therefore, even though the movable plate disengages from the stopper of the locking portion, the moving speed of the movable plate is slow. Thus, the commodities storing apparatus of the vending machine of the present invention can be reliably and safely used.

Figure 21:
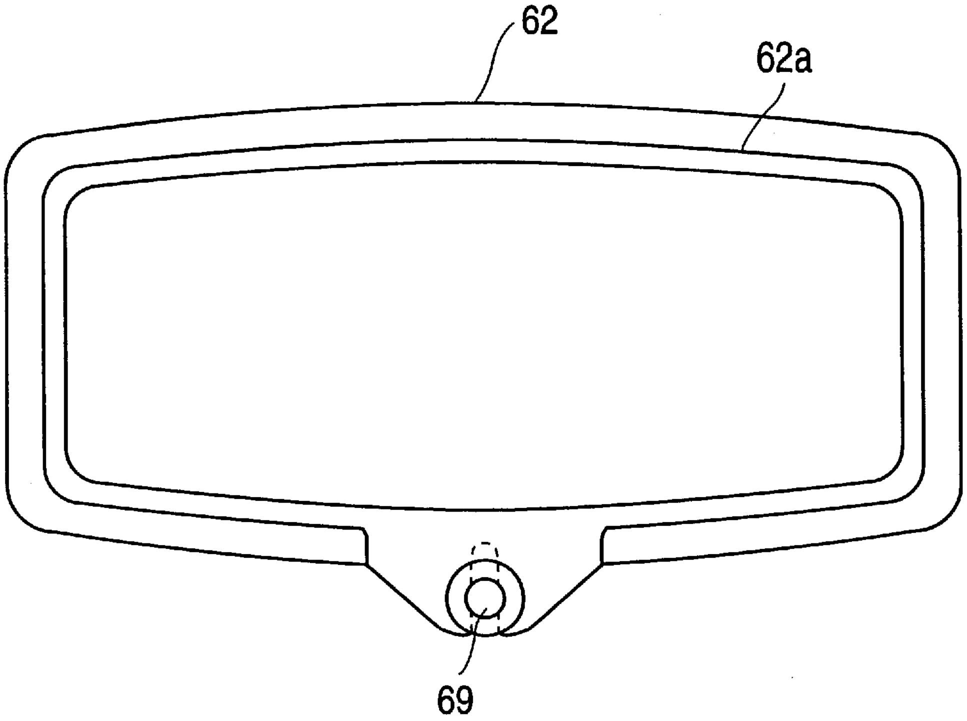
FIG. 21 is an enlarged front view showing a modification of a first commodities receiving plate of the commodities storing apparatus shown in FIG. 11.
Figure 22:
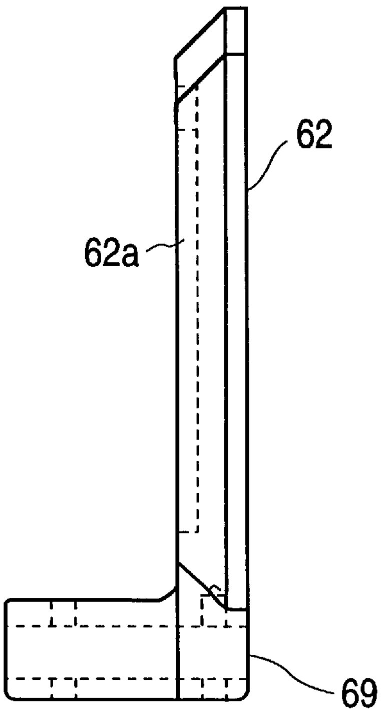
FIG. 22 is side view showing the first commodities receiving plate shown in FIG. 21.

It is very advantageous to form the first commodities receiving plate 62 into a configuration as shown in FIGS. 21 and 22.

More specifically, as shown in FIGS. 21 and 22, the rear surface of the first commodities receiving plate 62 being held in contact with the commodities 4 has an area smaller than the front surface thereof. The peripheral portion of the first commodities receiving plate 62 is inclined from the front surface towards the rear surface held in contact with the commodities. Further, a protruding rib 62*a* is formed on the commodities-holding surface of the first commodities receiving plate 62 so as to prevent the commodities 4 from contacting the entire surface thereof.

The protruding rib 62*a* is formed entirely on the peripheral portion of the first commodities receiving plate 62 on the upper, left, and right ends, and the lower end except the center thereof. Thus, the first commodities receiving plate 62 has a recessed section as a whole. Because the commodity 4 held on the first commodities receiving plate 62 is moved in contact with the rib 62*a,* the commodities 4 are not damaged, and the rib 62*a* does not adversely affect the transparent property of the first commodities receiving plate 62.

When the first commodities receiving plate 62 pivots, it does not interfere with the commodities 4 stored on the commodities storing path 60 located below. This is because almost all of the peripheral portion of the first commodities receiving plate 62 is inclined.

As described above, when the first commodities receiving plate 62 has the configuration as shown in FIGS. 21 and 22, the resistance of friction between the first commodities receiving plate 62 and the commodities 4 is small when the first commodities receiving plate 62 pivots. Thus, the commodities 4 can be prevented from being damaged or broken. Further, the surface of the first commodities receiving plate 62 is not damaged because the first commodities receiving plate 62 does not interfere with the commodities 4, and in addition the transparent property of the first commodities receiving plate 62 is not deteriorated. Furthermore, due to the reduction in the frictional resistance between the first commodities receiving plate 62 and the commodities 4, the reliability of the driving shaft can be improved. Because almost all of the peripheral portion of the first commodities receiving plate 62 is inclined in the direction from its front surface toward its rear surface holding the commodities 4, the area of the rear surface of the first commodities receiving plate 62 is smaller than the front surface thereof. Thus, when the first commodities receiving plate 62 pivots, the space in which it interferes with the commodities 4 is small. Consequently, the vertical interval between the commodities storing path and the adjacent one located on its upper or lower side is short and hence the vending machine is capable of storing commodities with high efficiency.

Third Embodiment

Because the third embodiment has a construction fundamentally similar to that of the second embodiment, only parts of the third embodiment different from those of the second embodiment will be described below for brevity's sake.

Figure 23:
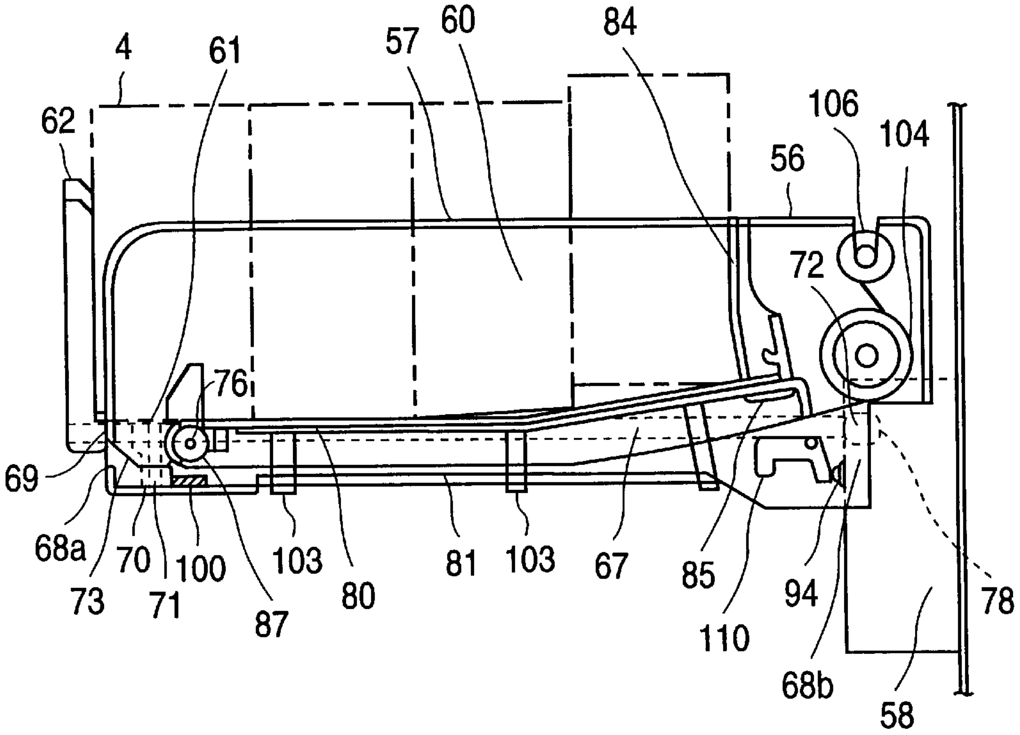
FIG. 23 depicts a main portion sectional side view showing a commodities storing apparatus of a vending machine according to a third embodiment of the present invention.
Figure 24:
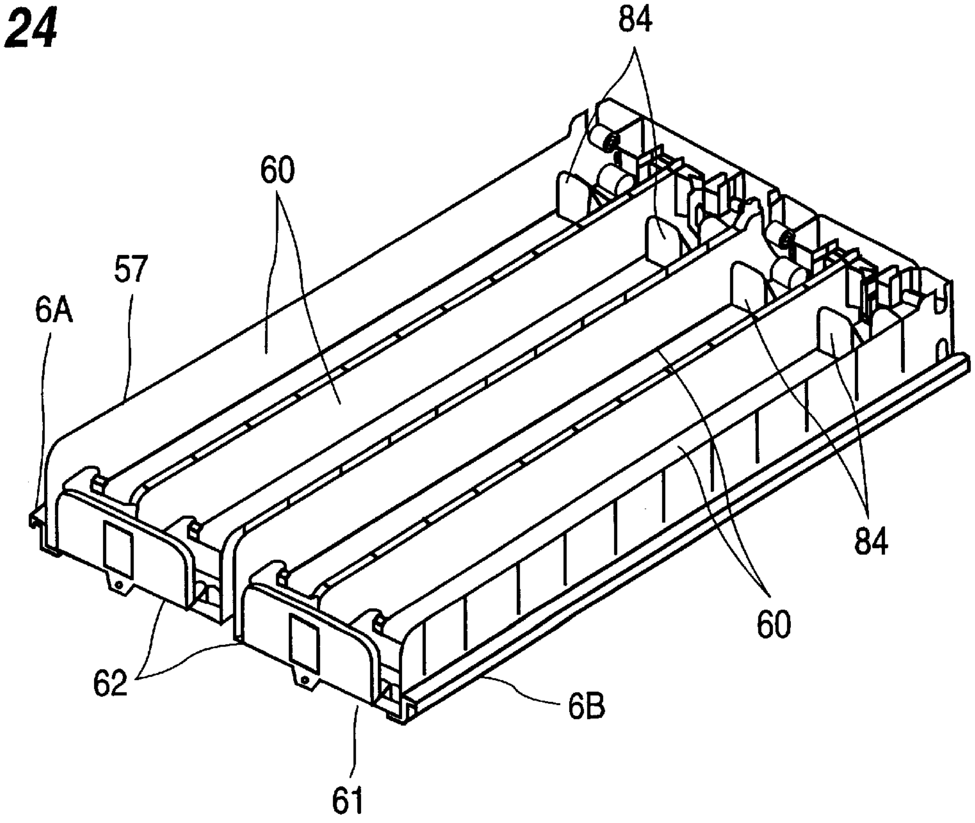
FIG. 24 is a perspective view showing the commodities storing apparatus shown in FIG. 23.
Figure 25:
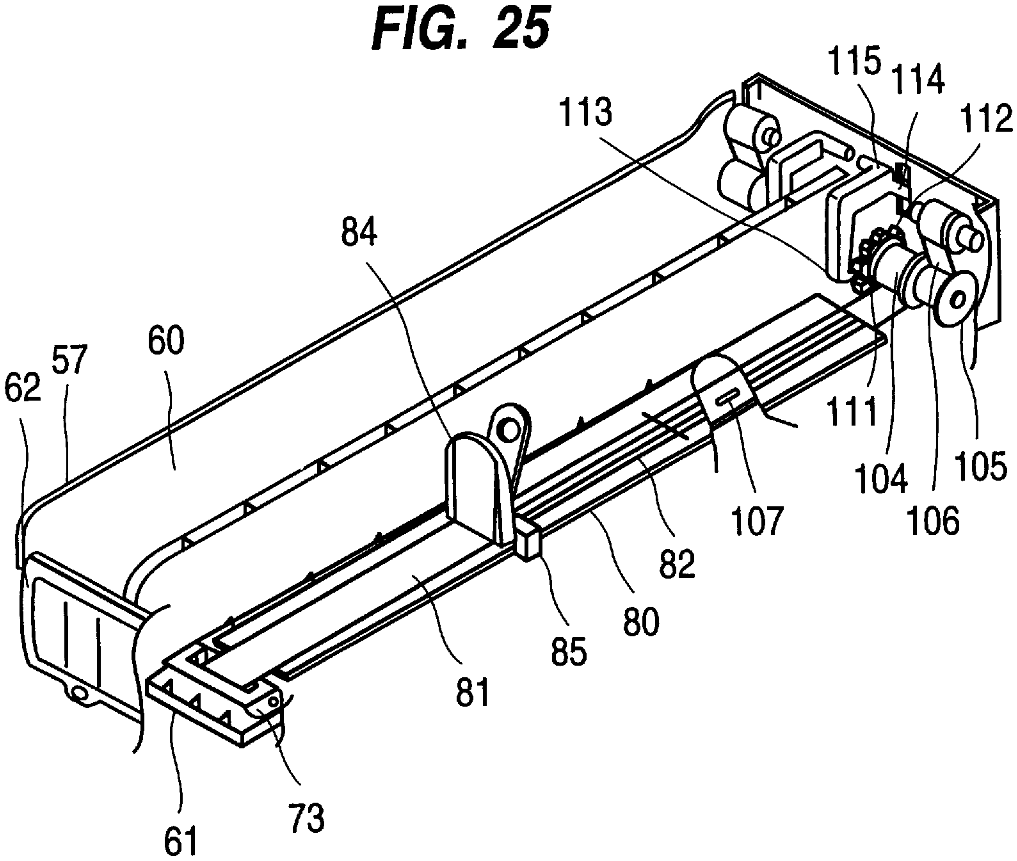
FIG. 25 is a perspective view showing a commodities storing shelf shown in FIG. 23.
Figure 26:
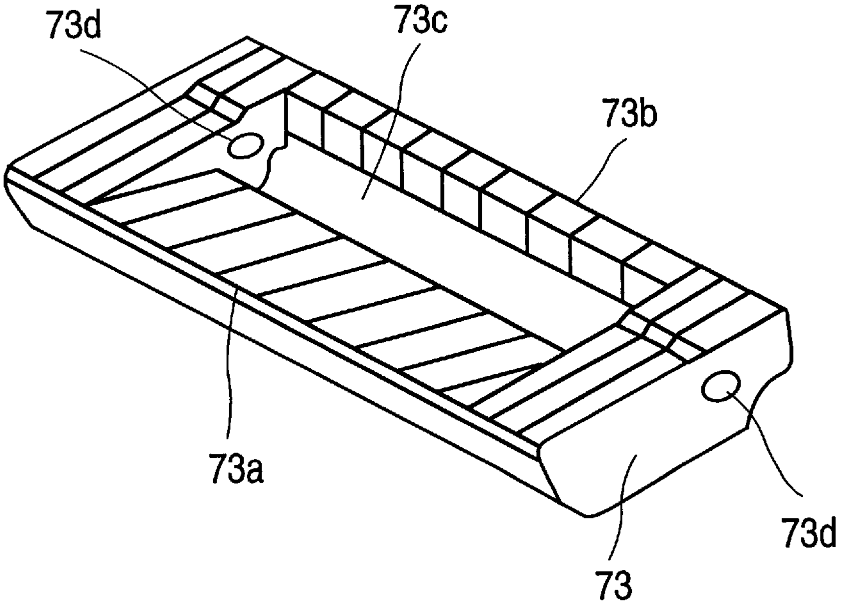
FIG. 26 is a perspective view showing a second commodities receiving plate of the commodities storing apparatus shown in FIG. 23.

As shown in FIGS. 23, 25, and 26, a second commodities receiving plate 73 is mounted on a sliding surface located rearward of a first commodities receiving plate 62. The second commodities receiving plate 73 comprises a regulation portion 73*a* for preventing the movement of a second commodity to a commodities feed-out port and a stopper portion 73*b* integral with the regulation portion 73*a* and opposed to the regulation portion 73*a* with respect to a rectangular hole 73*c*. The stopper portion 73*b* contacts a sliding member 81 by its pivotal motion. The second commodities receiving plate 73 is pivotally held by a commodities feed-out device 61 through a through-hole 73*d* formed on each side of the rectangular hole 73*c*. The second commodities receiving plate 73 and a rotary member 87 are installed on a supporting portion 75 having a hole formed thereon, by means of a shaft 76 positioned on the commodities feed-out port side of each commodities storing path 60 of a gutter-shaped commodities storing case 56. The second commodities receiving plate 73 and the rotary member 87 are positioned on the sliding surface side of each of the left-hand and right-hand commodities storing paths 60.

A blocking member 100 for reducing the sliding property of the sliding member 81 is provided at a lower portion of the front end of the commodities storing path 60 of the gutter-shaped commodities storing case 56 so that the movement of the sliding member 81 is locked between the stopper portion 73*b* and the blocking member 100 by the pivotal motion of the second commodities receiving plate 73.

Figure 27A:
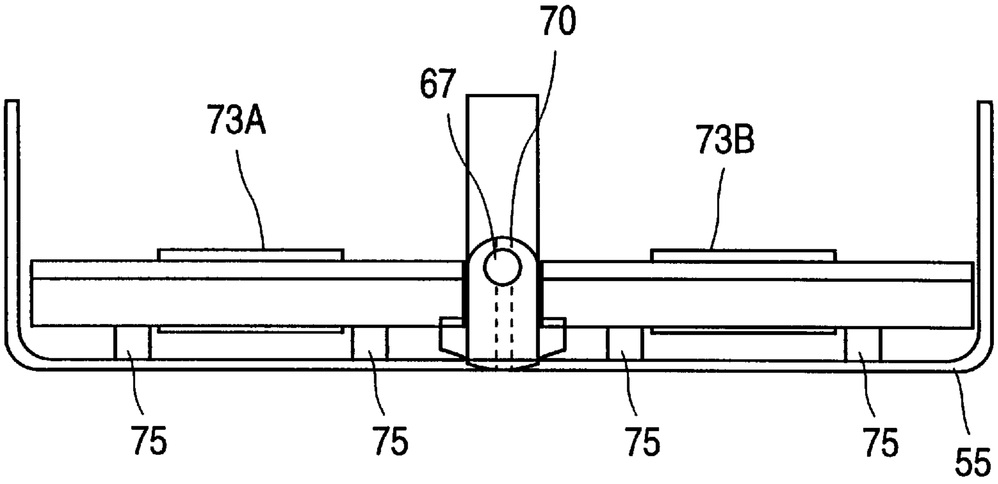
FIG. 27 (*a*) is a front view showing in detail a stand-by position of the commodities storing apparatus shown in FIG. 23.
Figure 27B:
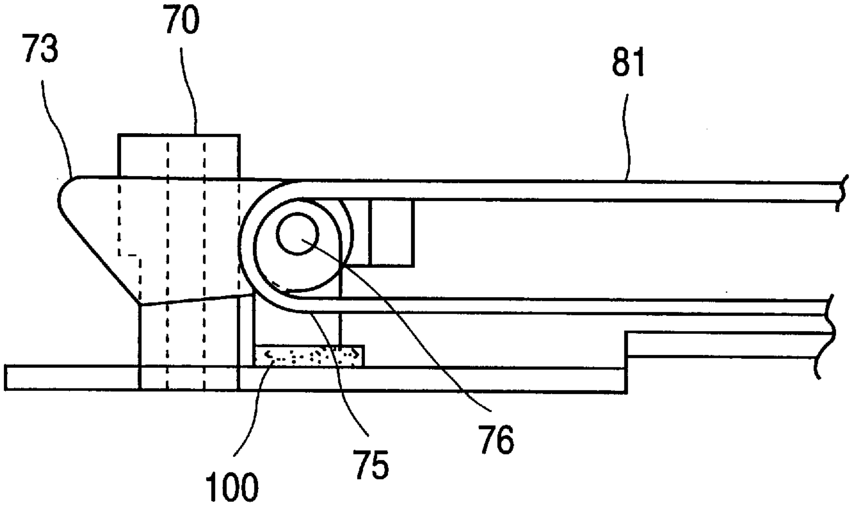
Figure 28A:
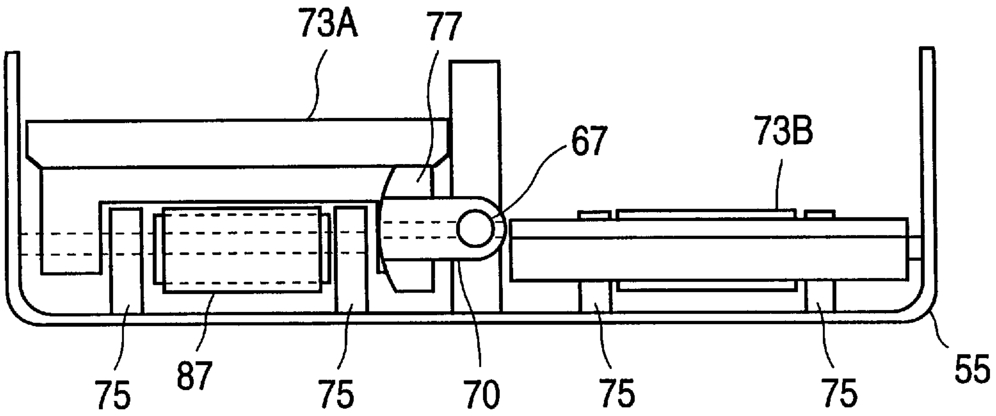
FIG. 28 (*a*) is a front view showing a state in which an operation member of the commodities storing apparatus shown in FIG. 23 has pivoted clockwise.
Figure 28B:
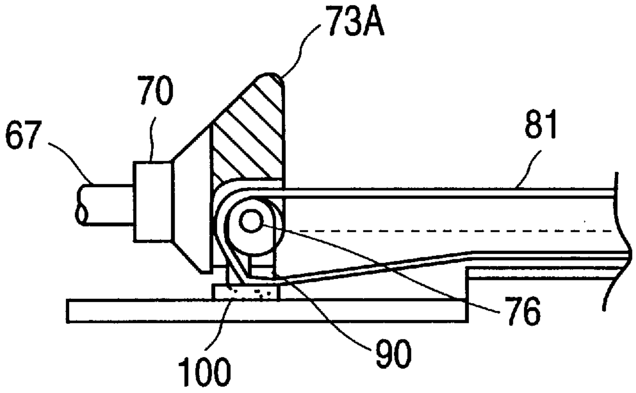
Figure 29A:
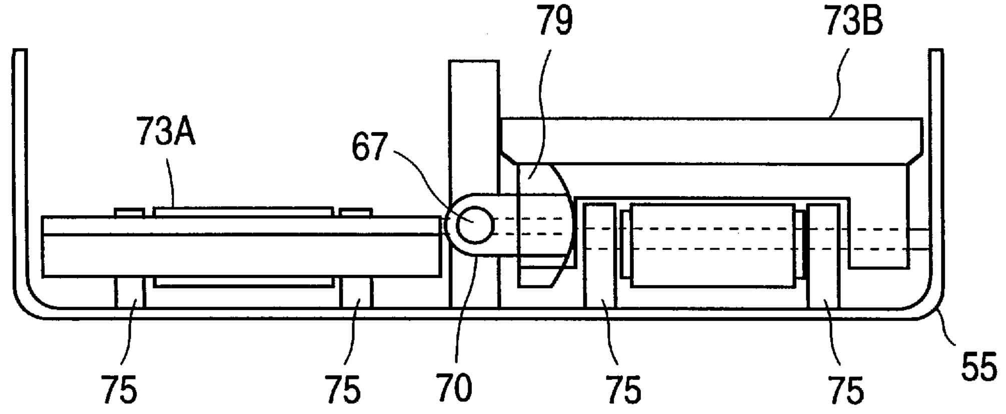
FIG. 29 (*a*) is a front view showing a state in which the operation member of the commodities storing apparatus shown in FIG. 23 has pivoted counterclockwise.
Figure 29B:
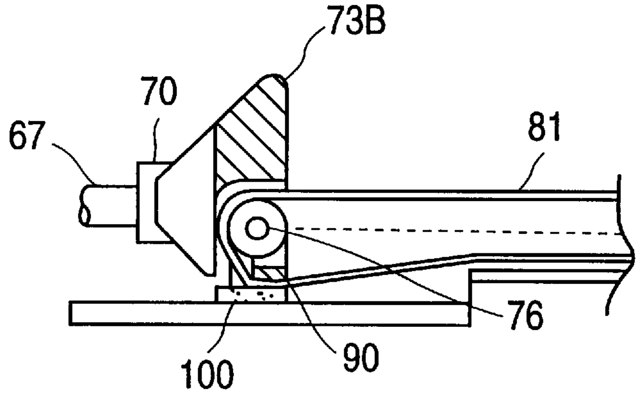
Figure 30:
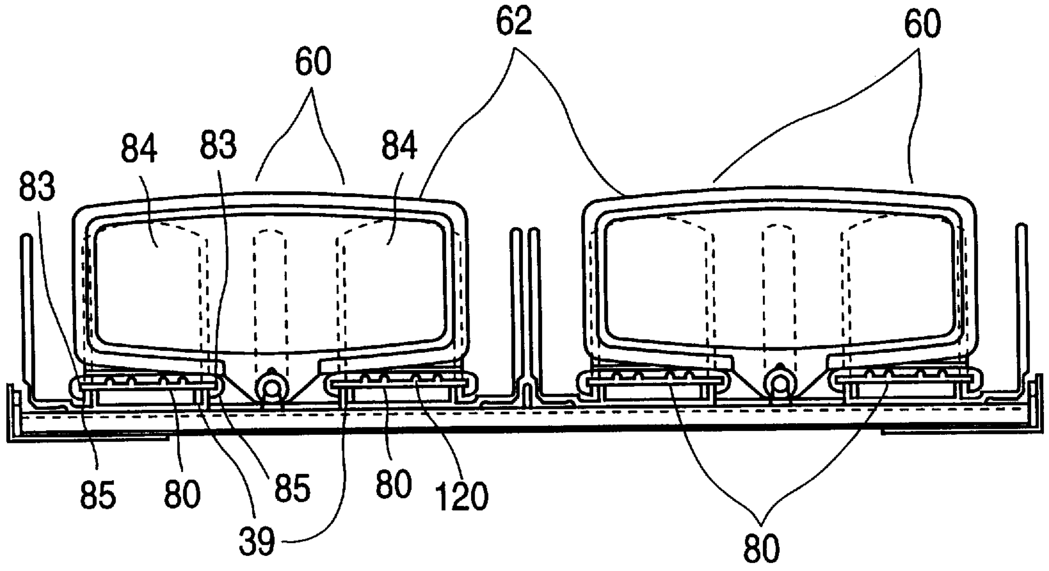
FIG. 30 is an enlarged front view showing a first commodities receiving plate of the commodities storing apparatus shown in FIG. 23.
Figure 31:
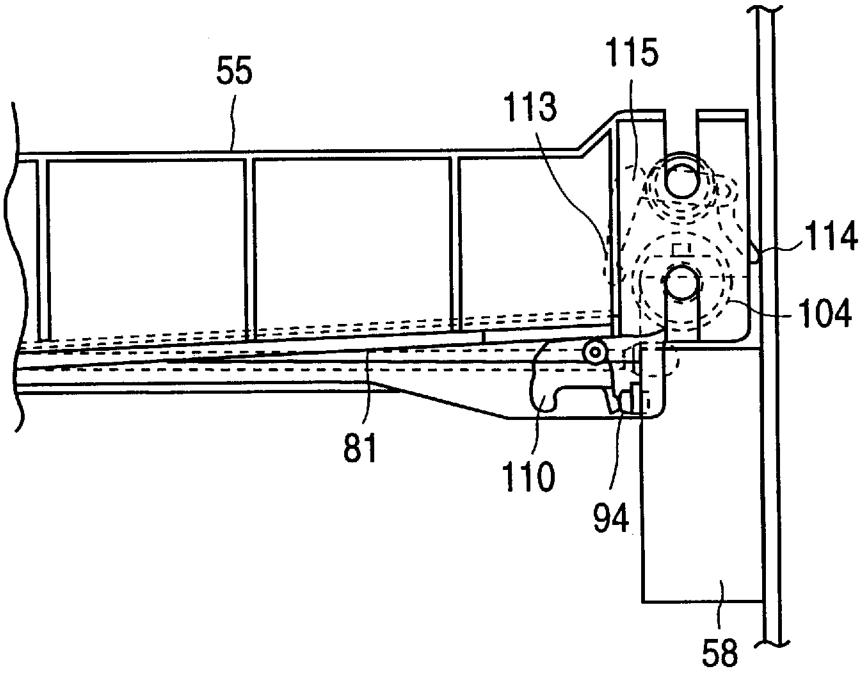
FIG. 31 depicts a main portion sectional side view showing a sellout detection portion of the commodities storing apparatus shown in FIG. 23.
Figure 32A:
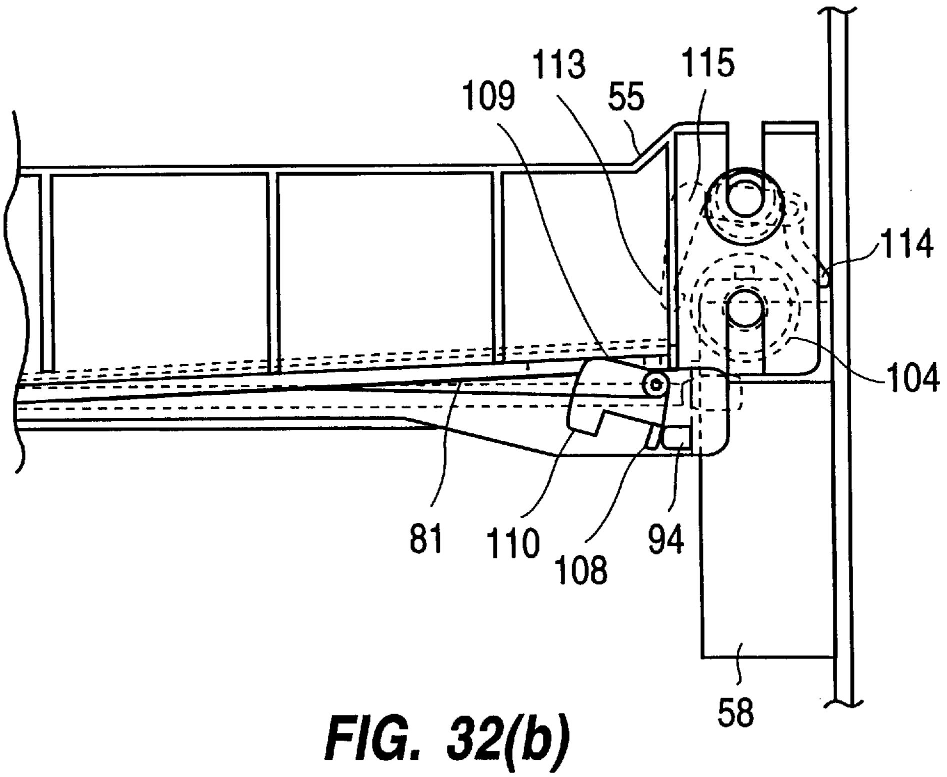
FIG. 32 (*a*) depicts a main portion sectional side view showing the sellout detection portion of the commodities storing apparatus shown in FIG. 23 when commodities have sold out.
Figure 32B:
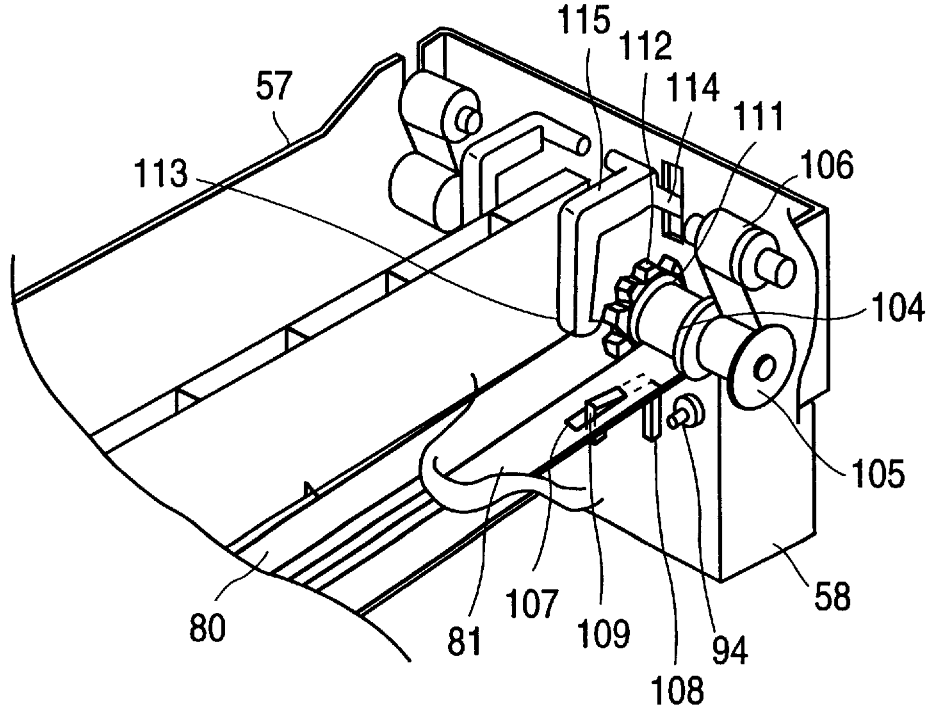

Referring to FIGS. 27 through 29, when the second commodities receiving plates 73 are horizontal, they are proximate to the operation member 70 having the configuration of a generally inverted T-shaped cam. When the driving shaft 67 rotates clockwise, the operation member 70 pivots clockwise, with an A-claw portion 77 formed on the operation member 70 in contact with the left-hand second commodities receiving plate 73A, which thus becomes vertical. When the operation member 70 is located at this position, a position detection switch 78 mounted in a casing accommodating the driving motor 58 is turned on. When the operation member 70 at this position starts to rotate counterclockwise and is in a stand-by state, the second commodities receiving plate 73A becomes horizontal. In this state, the position detection switch 78 is turned on and the driving motor 58 stops.

When the driving shaft 67 rotates counterclockwise, the operation member 70 pivots counterclockwise, with a B-claw portion 79 formed on the operation member 70 in contact with the left-hand second commodities receiving plate 73B, thus becoming vertical. When the operation member 70 is at this position, the position detection switch 78 mounted in the casing accommodating the driving motor 58 is turned on. When the operation member 70 at this position starts to rotate clockwise and is located at the stand-by position, the second commodities receiving plate 73B becomes horizontal. In this state, the position detection switch 78 is turned on and the driving motor 58 stops.

Referring to FIGS. 23, 25 and 30 through 32, a generally rail-shaped slidable runway member 80 is removably mounted on the bottom of each commodities storing path 60 of the gutter-shaped commodities storing case 56 by means of a plurality of locking claws 103. On the upper surface of the runway member 80, a plurality of projecting ribs 82, which reduce the contact resistance between the runway member 80 and the sliding member 81, are formed throughout the whole length of the runway member 80. The runway member 80 slopes upward from about a middle position to the rear end thereof such that the highest position of the runway member 80 is equal to the pivotal motion-caused highest position 73*a* of the second commodities receiving plate 73 which prevents the movement of the second commodity to the commodities feed-out port. An L-shaped movable plate 84 slidable in the commodities feed-out direction is mounted on the sliding surface of the runway member 80 at both sides 83 thereof. The movable plate 84 has a U-shaped claw 85 formed at each of both ends of the lower part thereof such that each of both sides 83 of the sliding surface is movably inserted into each U-shaped claw 85. A hole is formed on one end of the belt-shaped sliding member 81 to connect the sliding member 81 with the L-shaped movable plate 84 having the locking claws 103 formed on the lower surface thereof. The sliding member 81 is made of a polyester material knitted in a net shape, has a superior sliding property and is capable of moving the commodities placed thereon by its pulling force. One end of the sliding member 81 is curved in a "U" configuration of around the rotary member 87 at the commodities feed-out port of the commodities storing path 60, whereas the other end thereof is wound around a rotary drum 104. In order to urge the sliding member 81 along the commodities storing path 60, one end of an elastic member 106 is installed with screws on a spring-installing drum 105 coaxial with the rotary drum 104, and the other end thereof is wound on a drum smaller than the spring-installing drum 105. That is, the elastic member 106 is between the drums in an S configuration.

An operation hole 107 is formed on the belt-shaped sliding member 81 connected with the movable plate 84, which sliding member 81 is capable of moving the commodities placed thereon by its pulling force. There is provided a sellout operation member 110 comprising a pressing strip 108, which contacts a sellout detection portion 94 mounted in a casing accommodating the driving motor 58 positioned at the rear end of the commodities storing path 60, and a pivotal operation pressing strip 109 which is inserted into the operation hole 107. The pressing strip 108 is positioned at one end of the sellout operation member 110, whereas the operation pressing strip 109 is positioned at the other end thereof. When the movable plate 84 is located at the commodities feed-out port, the operation hole 107 moves to a rear position of the commodities storing path 60. As a result, the operation pressing strip 109 enters the operation hole 107, thus moving the pressing strip 108 away from the sellout detection portion 94.

The rotary drum 104 around which the sliding member 81 connected with the movable plate 84 is wound has on each side thereof a flange 111 for guiding the sliding member 81. A plurality of teeth 112 are circumferentially formed at one end of the rotary drum 104. There is provided a pivotal stopper member 115 comprising a locking strip 113, which engages with the teeth 112 to prevent the rotation of the rotary drum 104, and a stopper strip 114 which is integral with the locking strip 113 and engages the locking strip 113 with the teeth 112 when the commodities storing shelf 57 is pulled forward and disengages the locking strip 113 from the teeth 112 when the commodities storing shelf 57 is pressed rearward.

The operation of the commodities storing apparatus of the vending machine having the above-described construction is described below with reference to FIGS. 23 through 27.

In a stand-by state, the commodities 4 are stored on the commodities storing paths 60, with the leading commodity 4 pressed against the first commodities receiving plate 62 and a plurality of commodities 4 located rearward of the leading commodity 4 pressed by the L-shaped movable plate 84.

When a signal indicating the sale of a commodity on the left-hand commodities path is inputted to the driving motor 58, the driving motor 58 rotates clockwise. When the driving shaft 67 rotate clockwise, the first commodities receiving plate 62 fixed to the driving shaft 67 and the operation member 70 fixed thereto pivot clockwise. Therefore, the regulation portion 73*a* of the left-hand second commodities receiving plate 73A in the horizontal state rotates clockwise, with the A-claw portion 77 formed on the operation member 70 having the configuration of an inverted T-shaped cam in contact with the left-hand second commodities receiving plate 73A. As a result, a first commodity 4 is moved upward.

When the first commodity has moved to the uppermost position, the stopper portion 73*b* of the second commodities receiving plate 73 contacts the blocking member 100 positioned at the lower portion of the front end of the commodities storing path 60 of the gutter-shaped commodities storing case 56, thus pressing the sliding member 81 and preventing the movement thereof. Consequently, the second commodity is prevented from moving to the commodities feed-out port.

At this position, the first commodities receiving plate 62 pivots outside the left-hand commodities storing path 60, thus moving the first commodity 4 to the commodities transport path 6. At this time, the second commodity is prevented from moving forward and held by the second commodities receiving plate 73, because the regulation portion 73*a* of the second commodities receiving plate 73 projects upward with respect to the sliding surface. When the first commodities receiving plate 62 has been rotated 90° by the driving motor 58 through the driving motor shaft 67, the position detection switch 78 is turned on, and the driving motor 58 rotates counterclockwise. As a result, the sliding member 81 is unlocked from the blocking member 100. Then, the regulation portion 73*a* of the second commodities receiving plate 73 and the stopper portion 73*b* become horizontal, and the position detection switch 78 is turned on. As a result, the driving motor 58 stops.

At this time, the second commodity 4 is moved toward the commodities feed-out port by the spiral sliding member 81 but is prevented from dropping to the commodities transport path 6 and stopped by the first commodities receiving plate 62, because the first commodities receiving plate 62 has returned to the stand-by position.

When a signal indicating the sale of a commodity on the right-hand commodities storing path 60 is inputted to the driving motor 58, the driving motor 58 rotates counterclockwise and thus the driving shaft 67 rotates counterclockwise.

Consequently, the first commodities receiving plate 62 fixed to the driving shaft 67 and the operation member 70 fixed thereto rotate counterclockwise. Therefore, the regulation portion 73*a* of the right-hand second commodities receiving plate 73 in the horizontal state rotates counterclockwise, with the B-claw portion 79 formed on the operation member 70 having the configuration of an inverted T-shaped cam in contact with the right-hand second commodities receiving plate 73. As a result, the first commodity 4 moves upward.

When the first commodity 4 has moved to the uppermost position, the stopper portion 73*b* of the second commodities receiving plate 73 contacts the blocking member 100 positioned at the lower portion of the front end of the commodities storing path 60 of the gutter-shaped commodities storing case 56, thus pressing the sliding member 81 and preventing the movement thereof. Consequently, the second commodity is prevented from moving to the commodities feed-out port.

At this position, the first commodities receiving plate 62 pivots outside the right-hand commodities storing path 60, thus moving the first commodity 4 to the commodities transport path 6. At this time, the second commodity 4 is prevented from moving and held by the right-hand second commodities receiving plate 73, because the regulation portion 73*a* of the right-hand second commodities receiving plate 73 projects upward with respect to the sliding surface. When the first commodities receiving plate 62 has been rotated 90° by the driving motor 58 through the driving motor shaft 67, the position detection switch 78 is turned on, and the driving motor 58 rotates clockwise. As a result, the sliding member 81 is unlocked from the blocking member 100. Then, the regulation portion 73*a* of the right-hand second commodities receiving plate 73 and the stopper portion 73*b* thereof become horizontal, and the position detection switch 78 is turned on. As a result, the driving motor 58 stops.

When the commodities 4 placed on the commodities storing path 60 have been sold out, the L-shaped movable plate 84 on the generally rail-shaped runway member 80 moves toward the commodities feed-out port and the driving motor 58 stops.

Then, the operation hole 107 formed in the belt-shaped sliding member 81, which is connected with the movable plate 84 to move the commodities placed thereon by its pulling force, moves to a rear portion of the commodities storing path 60, and the operation pressing strip 109 of the sellout operation member 110 is inserted into the operation hole 107. When the pressing strip 108 moves away from the sellout detection portion 94 provided in the casing accommodating the driving motor 58, the sellout detection portion 94 detects that the commodities have been sold out, and the rotation of the driving motor 58 stops.

In storing the commodities, the commodities storing shelf 5 is pulled forward and the movable plate 84 is pressed rearward. As a result, a force of pulling the sliding member 81 from the rotary drum 104 is applied to the sliding member 81, and a plurality of teeth 112, of the flange 111, which guides the sliding member 81 to the upper and lower sides of the commodities storing path 60, rotate, thus moving the sliding member 81. When the movable plate 84 is stopped, the locking strip 113 engages with the teeth 112, thus stopping the movable plate 84 at an arbitrary position. When the commodities storing shelf 5 is set at the original position, the stopper strip 114, which disengages the locking strip 113 from the teeth 112, is brought into contact with the body of the driving motor 58, thus allowing the rotary drum 104 to rotate.

Owing to the above-described construction, the commodities storing apparatus 55 having the commodities storing shelves 57 can be made thin and simple in construction. Further, a great force is not necessary to move the commodities and, hence, the force of the spiral elastic member can be made small, thus making it possible to easily handle the commodities storing apparatus. When a commodity is being fed out, the movement of the sliding member can be blocked temporarily. Accordingly, the commodities storing apparatus is reliable because it prevents two or more commodities from being fed out simultaneously.

As described above, in the commodities storing apparatus of the vending machine of the present invention, the transparent first commodities receiving plate pivots to the left-hand commodities storing path or the right-hand commodities storing path. Further, the second commodities receiving plate positioned on the sliding surface side of each commodities storing path pivots and projects upward with respect to the sliding surface thereof due to the pivotal motion of the operation member fixed to the driving shaft. In moving the commodities, the sliding member wound around the rotary drum is moved by pulling it with the commodities placed thereon, using the spiral elastic member. Hence, the commodities storing apparatus can be allowed to be thin and simple in construction. Further, because the force of the spiral elastic member is small, the movement of the movable plate can be made smooth. Therefore, even for commodities having a great frictional resistance, the operational force of the sliding member can be allowed to be constant. Moreover, when the movable plate moves to the front end of the commodities feed-out port, the last commodity can be reliably fed out because a constant pulling force can be applied to the sliding member.

In addition, even though commodities different in size are stored on the commodities storing shelf, they can be fed to a predetermined position, utilizing the force of the spiral elastic member. Thus, neither position control nor any driving motor is necessary, making it possible to manufacture a feed-out device at a low cost.

Furthermore, when a commodity is being fed out, the movement of the sliding member can be blocked temporarily. Thus, in preventing the feed-out of a second commodity, the force of the spiral elastic member is not applied to the feed-out side. Hence, the second commodity and commodities located rearward thereof are not fed out. Further, commodities in various configurations can be prevented from falling down, and even flexible commodities can be handled without deforming them. Thus, the commodities storing apparatus can be used to store commodities of various configurations.

Furthermore, because the rotation of the rotary drum can be stopped at a desired time, the movable plate can be stopped according to the number of commodities to be stored. Hence, an operation of storing commodities on the commodities storing shelf located at an upper portion in the vending machine can be performed easily.

Fourth Embodiment

Because the fourth embodiment has a construction fundamentally similar to that of the third embodiment, the same parts of the fourth embodiment as those of the third embodiment are described below, using the same reference numerals.

Figure 33:
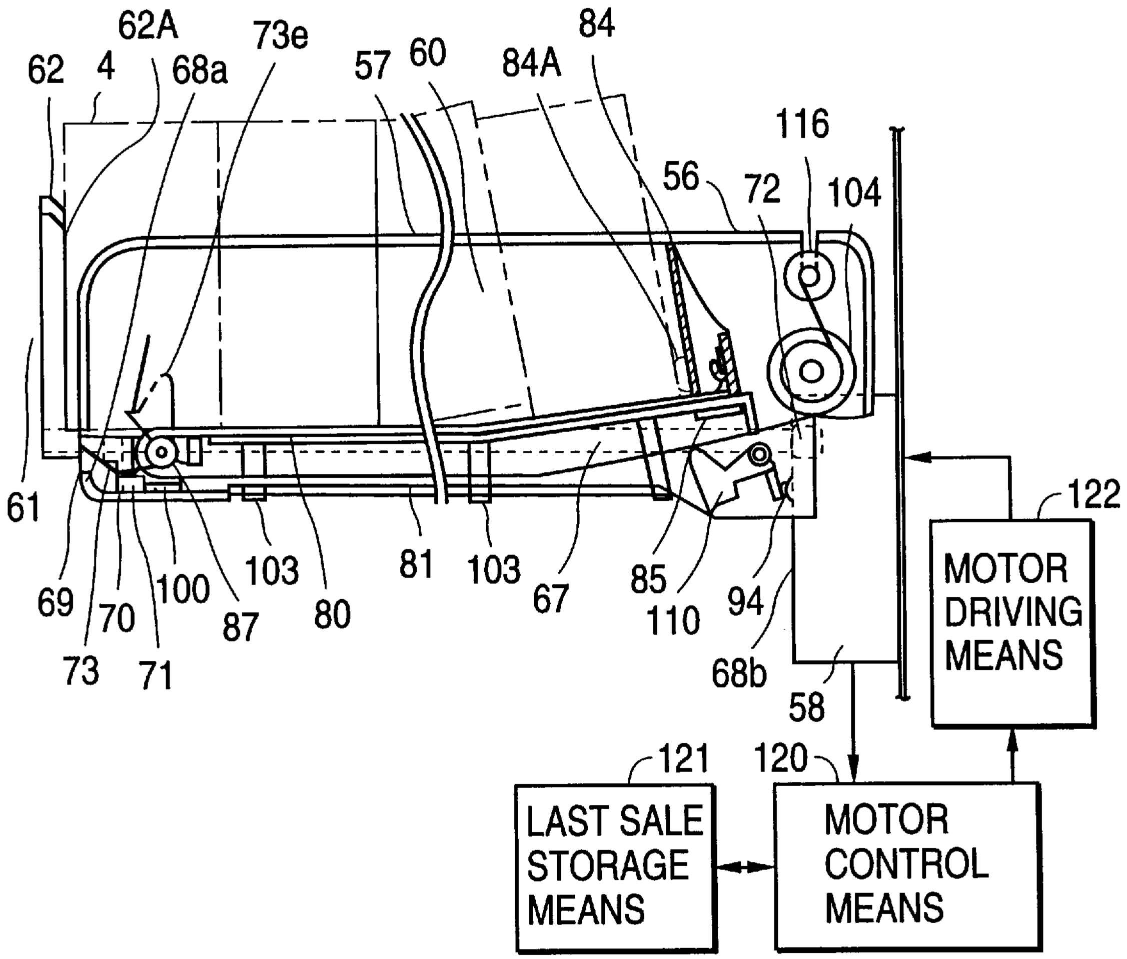
FIG. 33 is a block diagram showing a commodities storing apparatus of a vending machine according to a fourth embodiment of the present invention.
Figure 34:
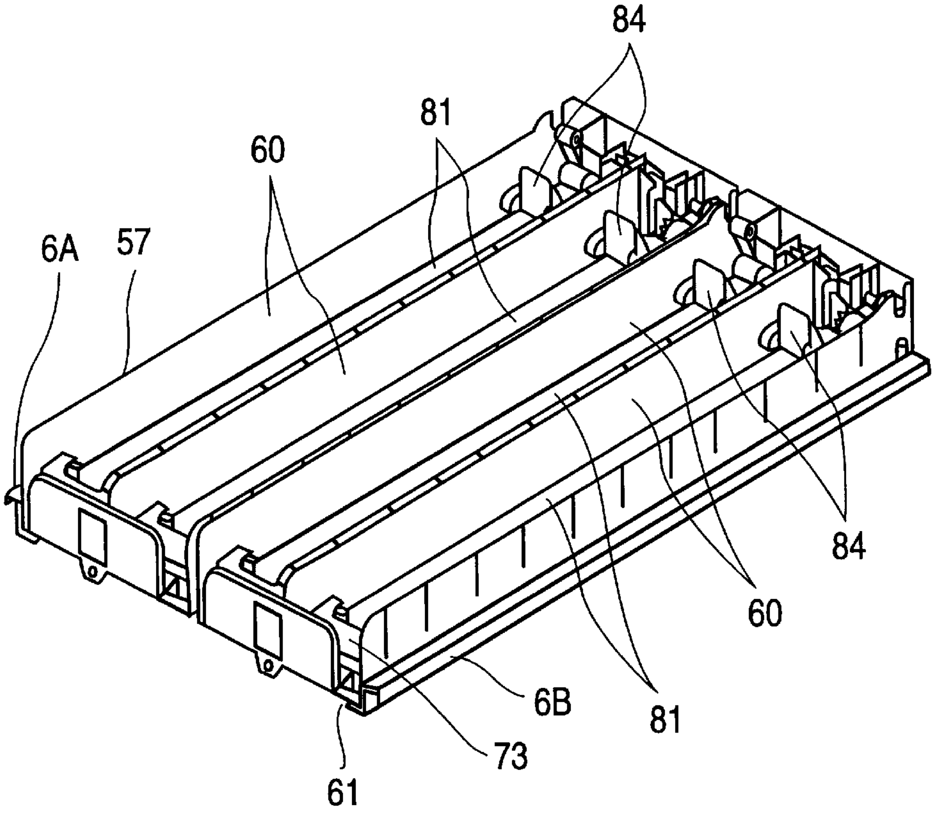
FIG. 34 is a perspective view showing the commodities storing apparatus shown in FIG. 33.
Figure 35:
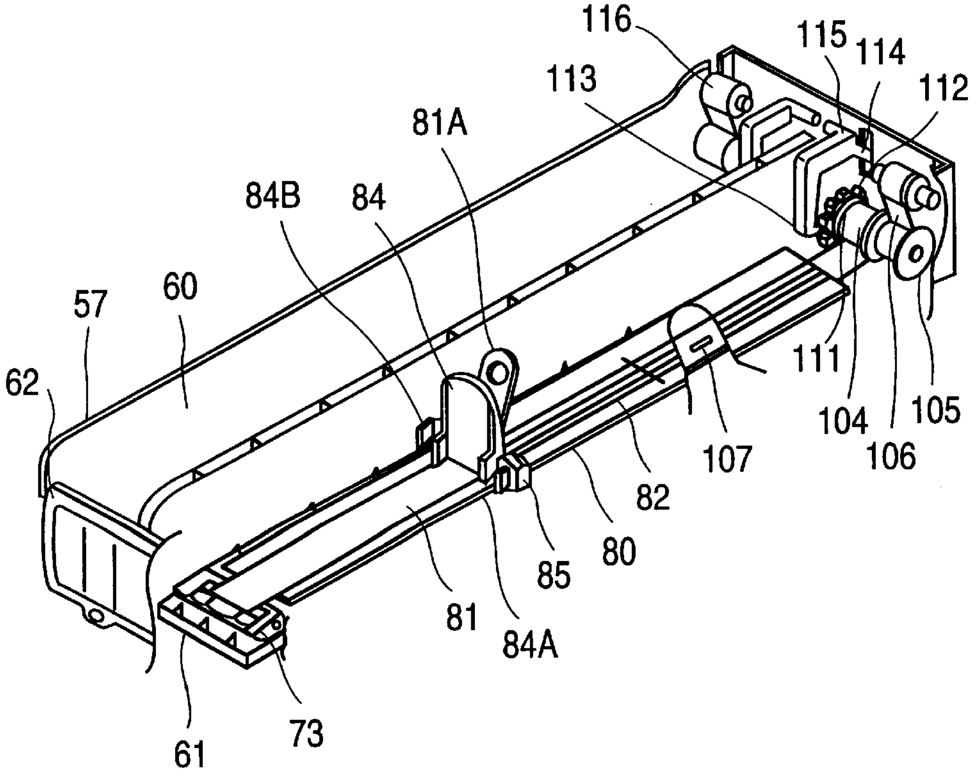
FIG. 35 is a perspective view showing a commodities storing shelf shown in FIG. 33.

As shown in FIGS. 33 through 35, reference numeral 57 denotes a commodities storing shelf. Commodities 4 such as drinks are placed with the longer side thereof being vertical.

A body 1 (as in FIG. 1) accommodates a plurality of commodities storing shelves 57 arranged vertically. Reference numerals 6A and 6B denote side rails bent in the shape of a hook and disposed on both sides of the commodities storing shelf 57 in the longitudinal direction thereof. The commodities storing shelf 57 can be pulled forward along the side rails 6A and 6B when the commodities 4 are stored thereon. Reference numeral 60 denotes a commodities storing path. A plurality of commodities storing path walls 60A partition the space between the side rails 6A and 6B at regular intervals. The width of each commodities storing path 60 is set according to the width of the commodities 4 placed thereon.

A commodities feed-out device 61 includes two gutter-shaped commodities storing paths 60 formed integrally in the form of "W" as viewed from the front.

A first commodities receiving plate 62 which is made of a transparent material and holds the commodities 4 placed on the two commodities storing paths 60 is installed at the commodities feed-out port of each commodities feed-out device 61. Ribs 62A are generally annularly formed on the face of the first commodities receiving plate 62 confronting the commodities 4.

Reference numeral 58 denotes a driving motor installed on the body 1 at the rear end of the commodities feed-out device 61 and serving as the driving force source of a commodities feed-out operation. The driving motor 58 is connected with the first commodities receiving plate 62 and an operation member 70 through a driving shaft 67 and is provided with a sellout detection portion 94 separable from the commodities feed-out device 61.

Figure 38A:
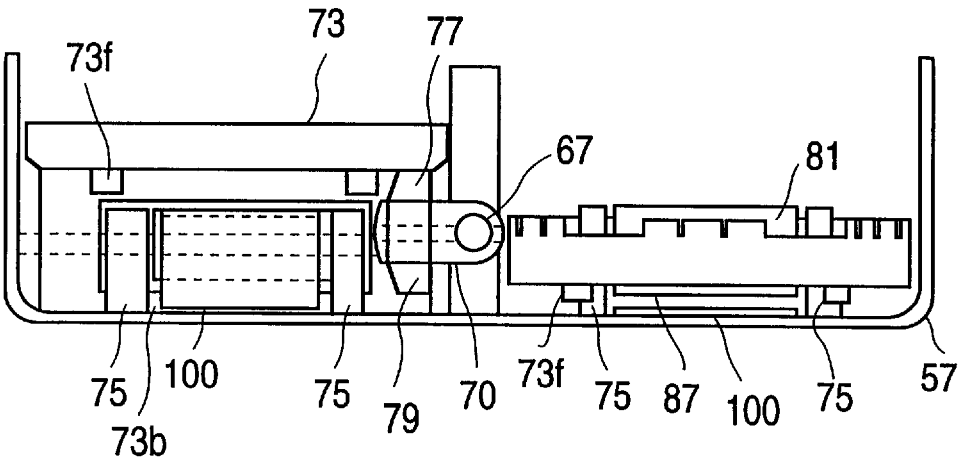
FIG. 38 (*a*) is a front view showing a state in which an operation member of the commodities storing apparatus shown in FIG. 33 has pivoted clockwise.
Figure 38B:
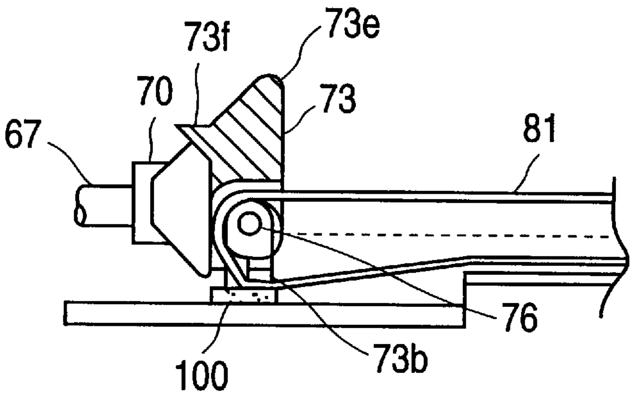
Figure 39A:
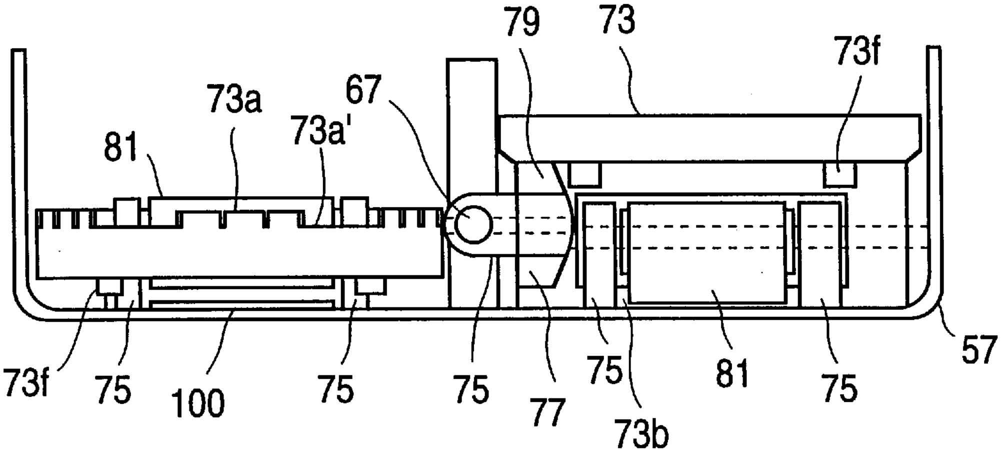
FIG. 39 (*a*) is a front view showing a state in which the operation member of the commodities storing apparatus shown in FIG. 33 has pivoted counterclockwise.
Figure 39B:
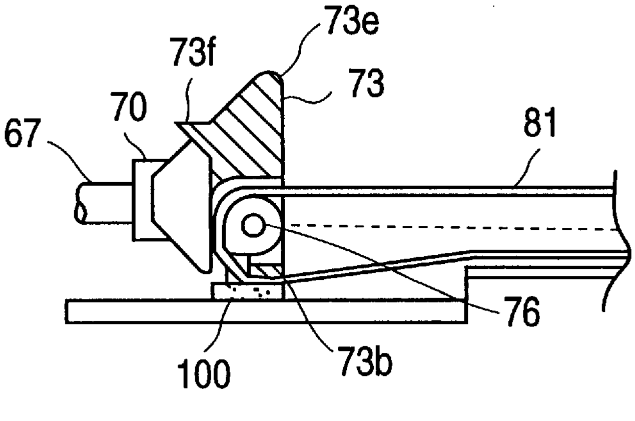

In the commodities feed-out device 61, the driving shaft 67 is inserted into a center lower portion of the first commodities receiving plate 62 such that the driving shaft 67 is perpendicular to the first commodities receiving plate 62. The driving shaft 67 positioned on the lower surface of the commodities storing path 60 extends throughout the whole length thereof in its longitudinal direction and is supported by a through-hole 69 formed on each of flanges 68*a* and 68*b* formed at the front and rear of a gutter-shaped storing case 56 so that the driving shaft 67 is rotatable clockwise and counterclockwise. The operation member 70 is mounted on the driving shaft 67 on the feed-out side of the driving shaft 67 and rearward of the first commodities receiving plate 62. As shown in FIGS. 38 and 39, the operation member 70 comprises an A-claw portion 77 and a B-claw portion 79 and has the configuration of a generally T-shaped cam. The operation member 70 is fixed to the driving shaft 67 by means of an elastic pin 71 pressed into the operation member 70 and the driving shaft 67. The driving shaft 67 has a connection member 72 flatly formed at the rear end thereof by partial pressure molding.

Figure 36:
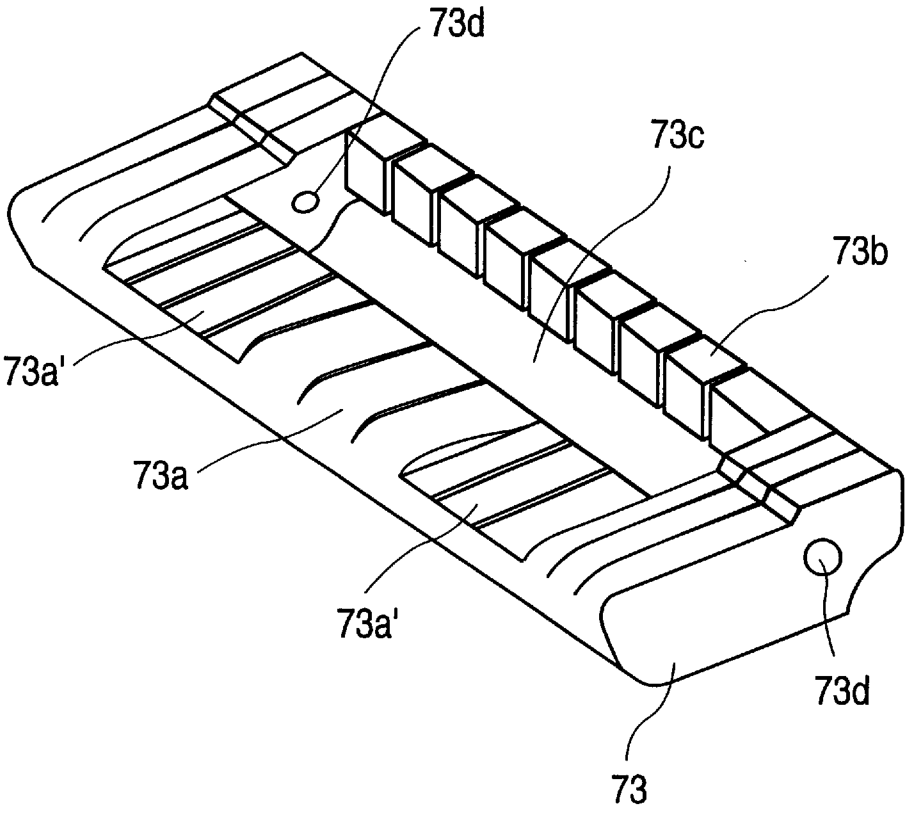
FIG. 36 is a perspective view showing a second commodities receiving plate of the commodities storing apparatus shown in FIG. 33.

Reference numeral 73 denotes a second commodities receiving plate formed on a sliding path surface and located rearward of the commodities feed-out device 61. As shown in FIG. 36, the second commodities receiving plate 73 is generally flat plate-shaped, and has a rectangular hole 73*c* defined therein at the center thereof and a pair of through-holes 73*d* defined therein on respective sides of the rectangular hole 73*c*. A shaft 76 for rotatably supporting the second commodities receiving plate 73 supported by supporting portions 75 is inserted into the pair of holes 73*d*. The second commodities receiving plate 73 comprises a regulation portion 73*a* and a stopper portion 73*b* integral with the regulation portion 73*a*.

The regulation portion 73*a* prevents the second commodity from being fed out while feeding out the first commodity 4, and is positioned on the commodities-contact side of the second commodities receiving plate 73. The stopper portion 73*b* contacts a sliding member 81 which will be described later, when the second commodities receiving plate 73 becomes vertical as a result of its pivotal motion.

Figure 37A:
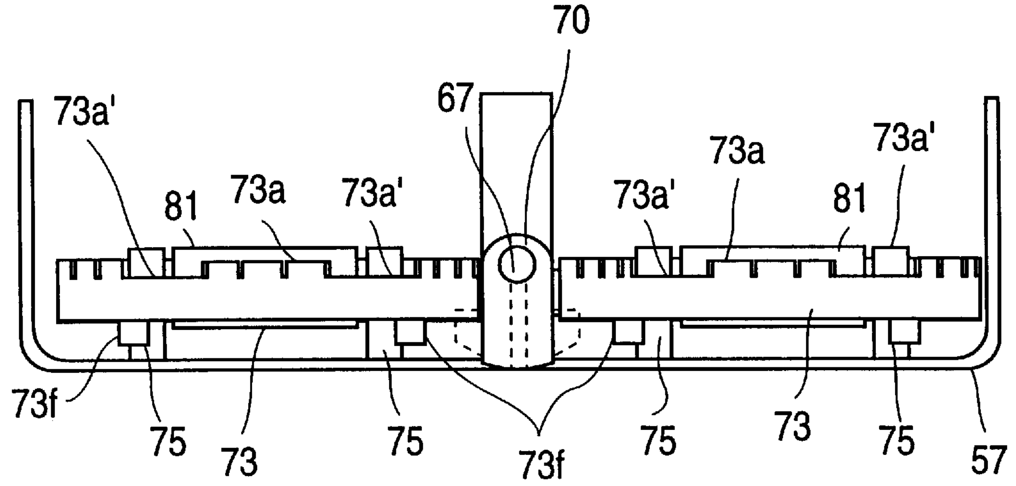
FIG. 37 (*a*) is a front view showing in detail a stand-by position of the commodities storing apparatus shown in FIG. 33.
Figure 37B:
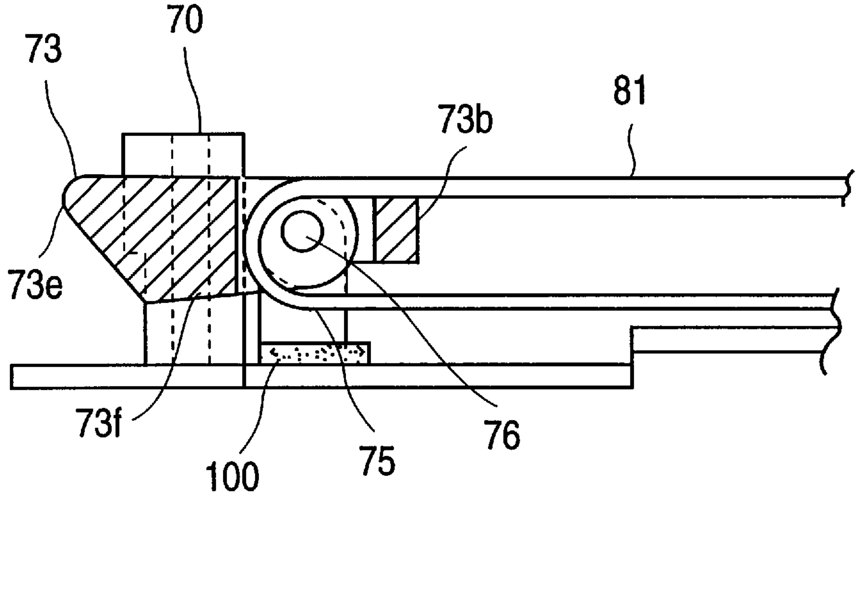

As shown in FIGS. 37(*a*) and 37(*b*), a curved surface 73*e* is formed on the second commodities receiving plate 73 on the side thereof opposed to the shaft-supporting side thereof. Reference numeral 73*a'* denotes a relief portion. A pair of relief portions 73*a'* are formed on the second commodities receiving plate 73 by recessing symmetrical portions of the regulation portion 73*a,* which is continuous with the curved surface 73*e.*

Reference numeral 73*f* denotes a pair of projections formed symmetrically on the second commodities receiving plate 73 on the side thereof opposed to the commodities-contact side thereof. An imaginary line connecting the apex of the curved surface 73*e* of the second commodities receiving plate 73 and the apex of the projection 73*f* with each other forms about 45° with respect to the horizontal surface when the second commodities receiving plate 73 become vertical as a result of its pivotal motion.

Reference numeral 100 denotes a blocking member provided on the bottom surface of the gutter-shaped commodities storing case 56 and below the second commodities receiving plate 73. The blocking member 100 prevents the movement of the sliding member 81 by sandwiching the sliding member 81 between the blocking member 100 and the stopper portion 73*b,* when the stopper portion 73*b* approaches the bottom surface of the gutter-shaped commodities storing case 56 as a result of the pivotal motion of the second commodities receiving plate 73.

Figure 40:
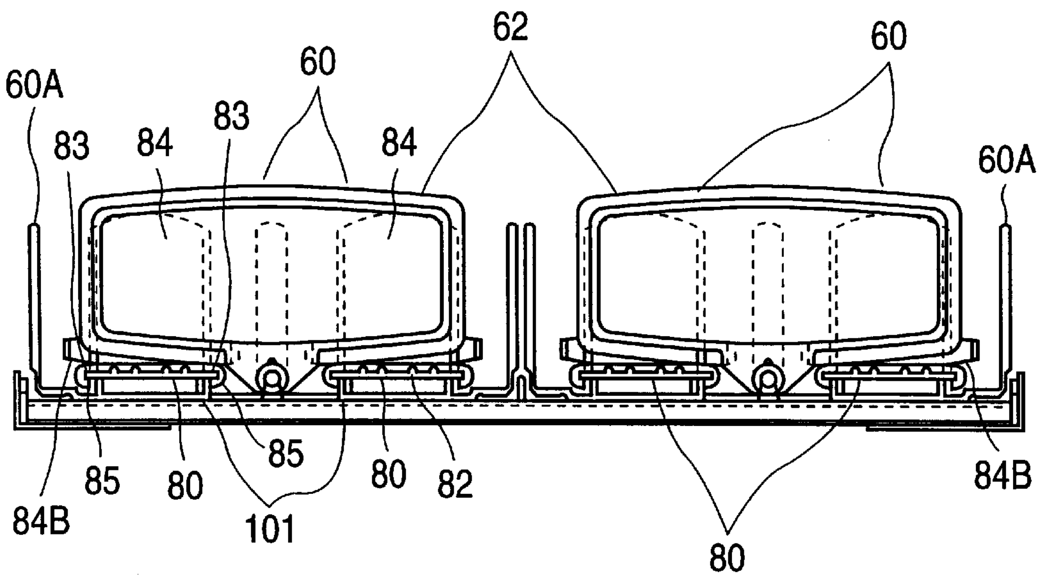
FIG. 40 is an enlarged front view showing a first commodities receiving plate of the commodities storing apparatus shown in FIG. 33.
Figure 41:
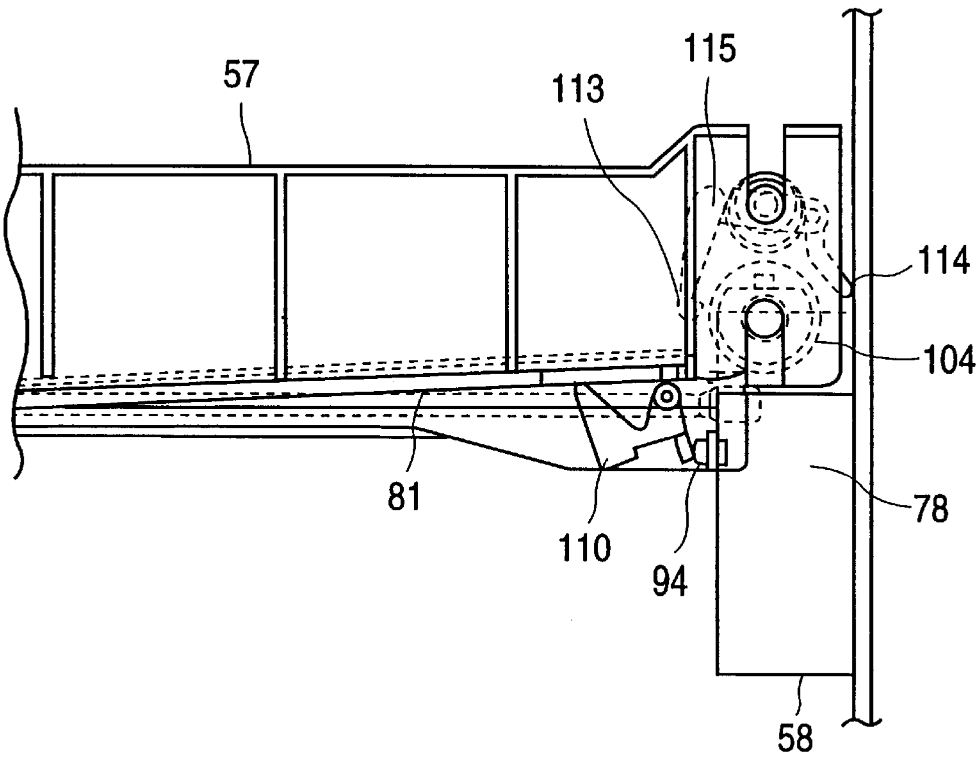
FIG. 41 depicts a main portion sectional side view showing a sellout detection portion of the commodities storing apparatus shown in FIG. 33.
Figure 42A:
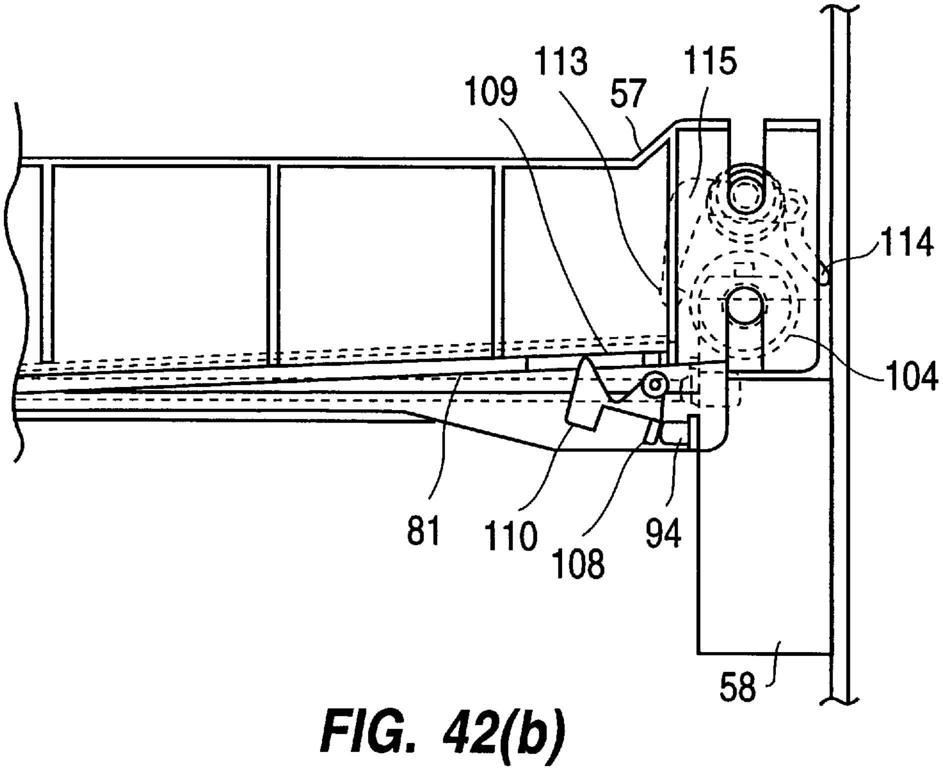
FIG. 42 (*a*) depicts a main portion sectional side view showing the sellout detection portion of the commodities storing apparatus shown in FIG. 33 when commodities have sold out.
Figure 42B:
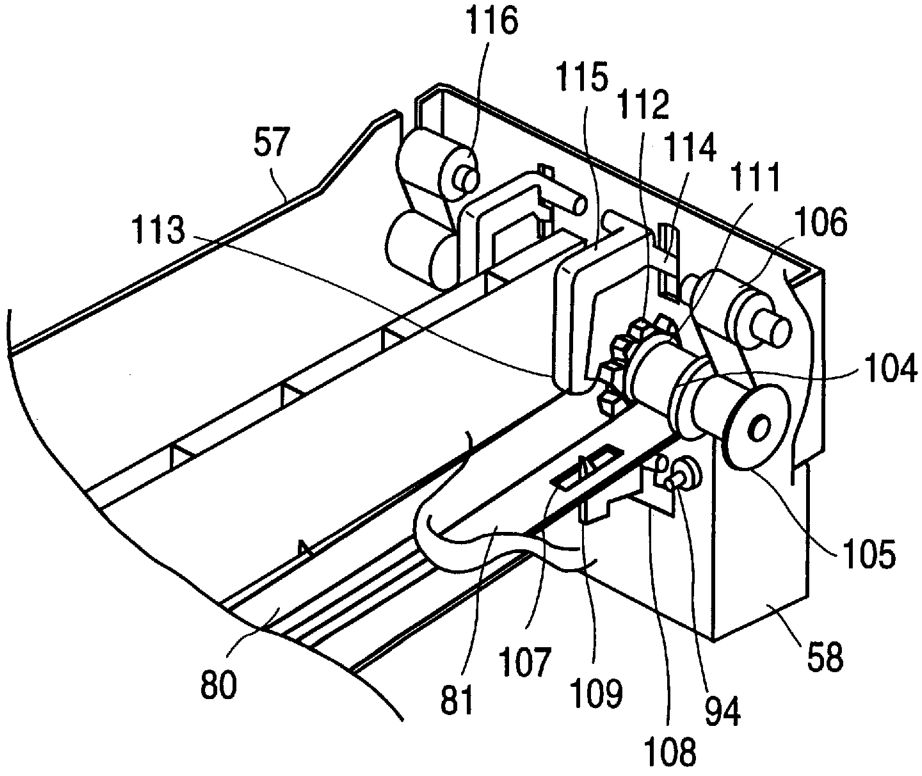

In FIGS. 40 through 42, reference numeral 78 denotes a position detection switch which is provided in a case accommodating the driving motor 58 and detects that position of the second commodities receiving plate 73 at which it becomes approximately vertical when the A-claw portion 77 of the operation member 70 or the B-claw portion 79 thereof presses the second commodities receiving plate 73 due to the rotation of the driving shaft 67. It detects the standby position of the second commodities receiving plate 73 at which it is approximately horizontal, and outputs signals to a motor control means 120, which will be described later.

Reference numeral 80 denotes a rail-shaped runway member having a favorable sliding-contact property. The rail-shaped runway member 80 is provided on the bottom of each commodities storing path 60 and is removably mounted on the commodities accommodating case 56 by means of locking claws 101. Reference numeral 82 denotes ribs formed in four rows on the runway member 80 in the longitudinal direction thereof to reduce the contact resistance between the sliding member 81 and the runway member 80. An inclined portion is formed on the runway member 80 from its center to its rear end. The height of the rear end of the runway member 80 is almost equal to that of the second commodities receiving plate 73 when the second commodities receiving plate 73 becomes vertical by its pivotal motion.

Reference numeral 84 denotes a movable plate generally L-shaped in a side elevation. The movable plate 84 has a pair of U-shaped claws 85 formed at both lower ends thereof and is slidable along the runway member 80 with the claws 85 sandwiching both ends 83 of the runway member 80 in its width direction. Reference numeral 84A denotes a first pressing strip projecting from both ends of the lower end of the front surface, of the movable plate 84, which confronts the commodities 4. The position and size of the first pressing strip 84A are set in such a manner that the first pressing strip 84A confronts the relief portion 73*a'* of the second commodities receiving plate 73 with a certain interval provided therebetween when the movable plate 84 has reached the front end of the commodities storing path 60. Reference numeral 84B denotes a second pressing strip, L-shaped in a plan view, one end of which is fixed to a side surface of the movable plate 84 and the other end of which is positioned alongside the first pressing strip 84A such that the second pressing strip 84B is located at a front portion of the movable plate 84. The size of the second pressing strip 84B is set in such a manner that the front end thereof contacts a part of the second commodities receiving plate 73 other than the relief portion 73*a'* thereof when the movable plate 84 has reached the front end of the commodities storing path 60.

Reference numeral 81 denotes a belt-shaped sliding member made of a material having a favorable sliding-contact property. It consists of polyester knitted in a net configuration and urethane resin which coats the polyester. Reference numeral 87 denotes a rotary member installed in the rectangular hole 73*c* of the second commodities receiving plate 73 by means of the shaft 76. Reference numeral 104 denotes a rotary drum rotatably installed behind the runway member 80. Reference numeral 105 denotes a first spring-installing drum coaxial and integral with the rotary drum 104. Reference numeral 116 denotes a second spring-installing drum installed above the first spring-installing drum 105. Reference numeral 106 denotes a spiral elastic member, one end of which is fixed to the first spring-installing drum 105 and the other end of which is fixed to the second spring-installing drum 116 and spanned in the shape of "S" between the first and second spring-installing drums 105 and 116.

One end of the sliding member 81 is fixed to a lower portion of the movable plate 84 and bent in the shape of a "U" around the rotary member 87, while the other end thereof is wound around the rotary drum 104. The commodities 4 are placed on the sliding member 81 on the runway member 80 and pressed by the movable plate 84. The elastic member 106 urges the sliding member 81 in the direction in which the sliding member 81 is wound around the rotary drum 104, and the movable plate 84, slidably provided on the runway member 80, is urged toward the commodities feed-out port of the commodities storing path 60 through the sliding member 81.

Figure 43:
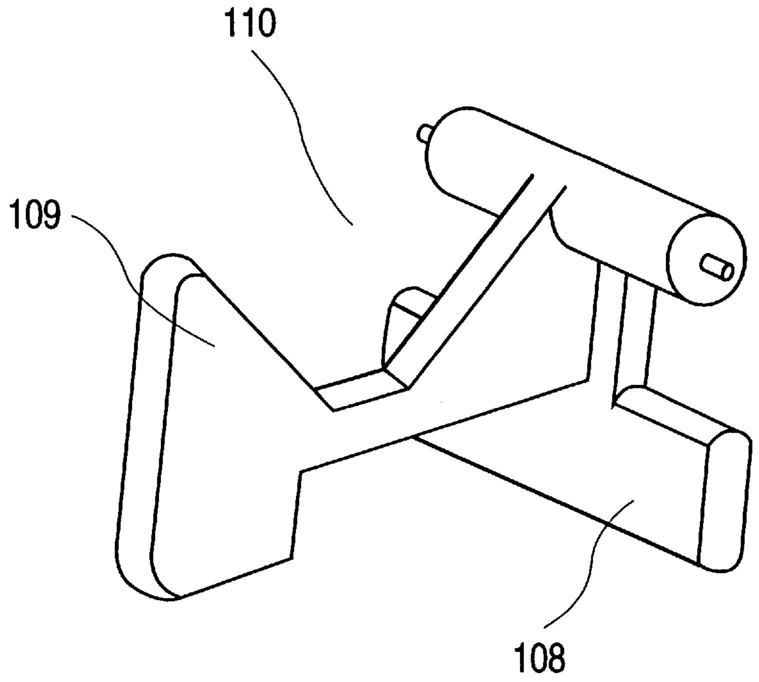
FIG. 43 is an enlarged perspective view showing a sellout operation portion of the commodities storing apparatus shown in FIG. 33.

Reference numeral 107 denotes an operation hole formed in the sliding member 81. Referring to FIG. 43, reference numeral 110 denotes a pivotally supported sellout operation member which comprises a pressing strip 108 confronting the sellout detection portion 94 and an operation pressing strip 109 which is integral with the pressing strip 108 and inserted into the operation hole 107 of the sliding member 81 when one commodity 4 is left on the commodities storing path 60.

Reference numeral 120 denotes a motor control means which receives a last sale detection signal from the sellout detection portion 94 when the sellout detection portion 94 has detected that there is one commodity 4 left on the commodities storing path 60. Reference numeral 121 denotes a last sale storage means which stores data indicating that the last commodity 4 will be sold in the next sale by setting a flag of a memory upon receipt of a signal outputted from the motor control means 120 when the motor control means 120 has received the last sale detection signal from the sellout detection portion 94. Reference numeral 122 denotes a motor driving means which outputs a driving signal to the driving motor 58 upon receipt of the signal outputted from the motor control means 120.

Reference numeral 111 denotes a flange of the rotary drum 104. A plurality of teeth 112 are circumferentially formed at one end of the rotary drum 104. Reference numeral 115 denotes a stopper member installed pivotally on the gutter-shaped commodities storing case 56 and integral with a locking strip 113 and a stopper strip 114. The locking strip 113 is movable between a position at which it engages with the teeth 112 and a position at which it disengages therefrom according to the pivotal motion of the stopper member 115. The stopper strip 114 is formed at the rear end of the stopper member 115 and inserted into an opening formed on the rear wall of the gutter-shaped commodities storing case 56. When the commodities storing shelf 57 is pulled forward, the stopper strip 114 is out of contact with the inner wall of the body 1, whereas when the commodities storing shelf 57 is pressed into the body 1, the stopper strip 114 contacts the inner wall surface of the body 1, thus pivoting the stopper member 115.

The operation of the commodities storing apparatus of the commodities storing apparatus having the above-described construction is described below with reference to drawings.

In a stand-by state, the commodities 4 are stored on the commodities storing paths 60, with the leading commodity 4 pressed against the first commodities receiving plate 62 and a plurality of commodities 4 located rearward from the leading commodity 4 pressed by the L-shaped movable plate 84.

When a signal indicating the sale of a commodity on the left-hand commodities path is inputted to the driving motor 58, the driving motor 58 rotates clockwise. When the driving shaft 67 rotates clockwise, the first commodities receiving plate 62 fixed to the driving shaft 67 and the operation member 70 fixed thereto pivot clockwise. Therefore, the regulation portion 73*a* of the left-hand second commodities receiving plate 73A in the horizontal state rotates clockwise, with the A-claw portion 77 formed on the operation member 70 having the configuration of an inverted T-shaped cam in contact with the left-hand second commodities receiving plate 73A. As a result, a first commodity 4 is moved upward.

When the first commodity has moved to the uppermost position, the stopper portion 73*b* of the second commodities receiving plate 73 contacts the blocking member 100 positioned at the lower portion of the front end of the commodities storing paths 60 of the gutter-shaped commodities storing case 56, thus pressing the sliding member 81 and preventing the movement thereof. Consequently, the second commodity is prevented from moving to the commodities feed-out port.

At this moment, because a pair of first pressing strips 84A are formed on the movable plate 84, even when the movable plate 84 is pulled toward the feed-out port by the sliding member 81 fixed to the lower portion of the movable plate 84, the first pressing strips 84A contact the lower part of the commodities 4, thus pressing it. Thus, when the movable plate 84 inclines rearward and a force is applied thereto in the direction in which the claw 85 is twisted, the pressing force offsets the claw-twisting force through the first pressing strips 84A. Therefore, the pressing force applied to the commodities 4 by the movable plate 84 can be prevented from being reduced.

At this position, the first commodities receiving plate 62 pivots outside the left-hand commodities storing path 60. Thus, the front commodity 4 does not slide down with the longer side of thereof being vertical, but can be moved to the commodities transport path 6 smoothly. This is because the pair of projections 73*f* are formed on the second commodities receiving plate 73 on the side thereof opposed to the commodities-contact side thereof such that the projections 73*f* are positioned at the lower left and right portions of the second commodities receiving plate 73. The second commodities receiving plate 73 drops the commodities to the front, with the projections 73*f* in contact with the bottom surface of the commodities 4 on the rear side thereof.

The regulation portion 73*a* of the second commodities receiving plate 73 projects upward with respect to the sliding surface, thus blocking the forward movement of the second commodity 4. The position detection switch 78 is turned on when the first commodities receiving plate 62 has been pivoted 90° by the driving motor 58 through the driving shaft 67. When the driving motor 58 pivots counterclockwise, the sliding member 81 is unlocked from the blocking member 100. Then, the regulation portion 73*a* of the second commodities receiving plate 73 and the stopper portion 73*b* become horizontal, and the position detection switch 78 is turned on. As a result, the second commodities receiving plate 73 stops.

At this time, the second commodity 4 is moved toward the commodities feed-out port by the spiral sliding member 81 but is prevented from dropping to the commodities transport path 6 and stopped by the first commodities receiving plate 62, because the first commodities receiving plate 62 has returned to the stand-by position.

When a signal indicating the sale of a commodity on the right-hand commodities storing path 60 is inputted to the driving motor 58, the driving motor 58 rotates counterclockwise and thus the driving shaft 67 rotates counterclockwise. Consequently, the first commodities receiving plate 62 fixed to the driving shaft 67 and the operation member 70 fixed thereto rotate counterclockwise. Therefore, the regulation portion 73*a* of the right-hand second commodities receiving plate 73 in the horizontal state rotates counterclockwise, with the B-claw portion 79 formed on the operation member 70 having the configuration of an inverted T-shaped cam in contact with the right-hand second commodities receiving plate 73. As a result, the first commodity 4 moves upward.

When the first commodity 4 has moved to the uppermost position, the stopper portion 73*b* of the second commodities receiving plate 73 contacts the blocking member 100 positioned at the lower portion of the front end of the commodities storing path 60 of the gutter-shaped commodities storing case 56, thus pressing the sliding member 81 and preventing the movement thereof. Consequently, the second commodity is prevented from moving to the commodities feed-out port.

At this position, the first commodities receiving plate 62 pivots outside the right-hand commodities storing path 60, thus moving the first commodity 4 to the commodities transport path 6. At this time, the second commodity 4 is prevented from moving and held by the right-hand second commodities receiving plate 73, because the regulation portion 73*a* of the right-hand second commodities receiving plate 73 projects upward with respect to the sliding surface. When the first commodities receiving plate 62 has been rotated 90° by the driving motor 58 through the driving motor shaft 67, the position detection switch 78 is turned on, and the driving motor 58 rotates clockwise. As a result, the sliding member 81 is unlocked from the blocking member 100. Then, the regulation portion 73*a* of the right-hand second commodities receiving plate 73 and the stopper portion 73*b* thereof become horizontal, and the position detection switch 78 is turned on. As a result, the right-hand second commodities receiving plate 73 stops.

As in the case of the left-hand commodities storing path 60, the first pressing strips 84A reduce the pressing force to be applied to the commodities 4 by the movable plate 84 and the projections 73*f* drop the commodities to the front when the front commodity is moved to the commodities transport path 6.

Figure 44:
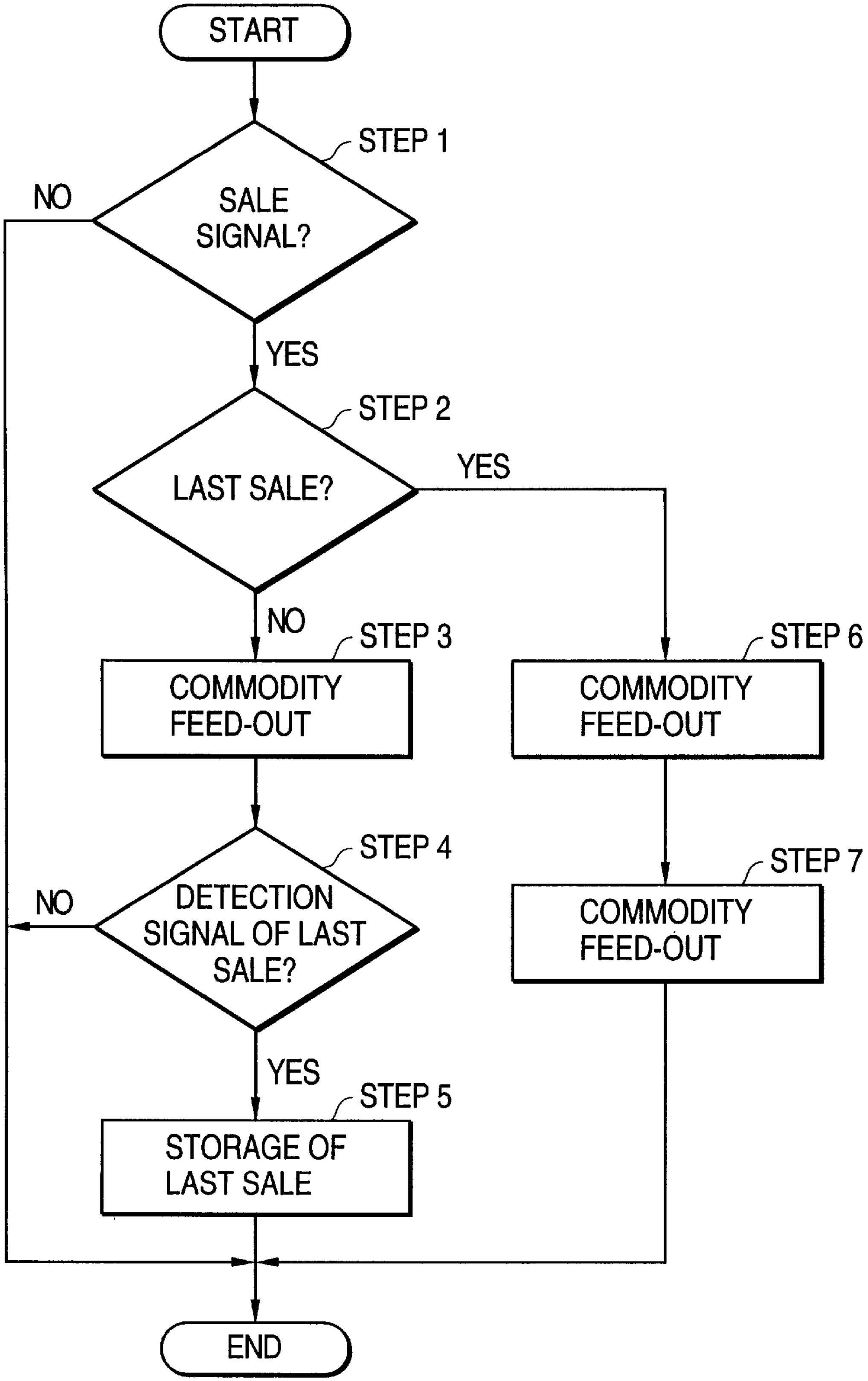
FIG. 44 is a flowchart showing the operation of the commodities storing apparatus shown in FIG. 33.

The sale of the last commodity placed on each commodities storing path 60 is described below with reference to FIG. 44.

First, when a user inserts a coin into a coin slot in the vending machine and selects commodities which have not been sold out, using a commodities selection means (not shown), the control means 120 checks whether or not a sale signal has been outputted from the sale control means (not shown) of the vending machine (step 1.) If NO, a commodities feed-out operation is not executed. If the sale signal has been outputted from the sale control means to the control means 120, the control means 120 reads data of the commodities storing path 60 corresponding to the selected commodities stored in the last sale storing means 121 to determine whether the last commodity 4 of the commodities storing path 60 is sold by a current sale (step 2.) If the last commodity 4 is not sold by the current sale, the control means 120 outputs a signal to the motor driving means 122 to drive the driving motor 58 so as to execute an operation of feeding out the commodities 4 from the commodities feed-out port of the commodities storing path 60 to the commodities transport path 6 (step 3.)

If the commodity 4 fed out is not the commodity next to the last one on the commodities storing path 60 (step 4), the control means 120 is in a stand-by state.

If the commodity 4 next to the last one on the commodities storing path 60 is sold at step 3, the movable plate 84 on the runway member 80 moves the last commodity 4 toward the commodities feed-out port and stops at the position at which the last commodity 4 is sandwiched between the first commodities receiving plate 62 and the movable plate 84.

The operation hole 107 formed in the belt-shaped sliding member 81 having the commodities 4 placed thereon moves to a rear portion of the lower side of the sliding member 80, and the operation pressing strip 109 of the sellout operation member 110 is inserted into the operation hole 107. When the pressing strip 108 is out of contact with the sellout detection portion 94, the sellout detection portion 94 provided in the casing accommodating the driving motor 58 operates, thus detecting that the last commodity 4 is sold in the next sale and outputting a signal to the control means 120 (step 4.)

The control means 120 outputs a signal to the last sale storing means 121 so that the last sale storing means 121 stores the sale state of the last commodity (step 5.)

If it is determined at step 2 that the last commodity 4 placed on the commodities storing path 60 is sold in the current sale, the control means 120 reads that the last sale storing means 121 has stored the data of the sale state of the last commodity, thus outputting a signal to the motor driving means 122 to drive the driving motor 58 so as to execute a commodities feed-out operation (step 6.) When the control means 120 has detected the termination of the commodities feed-out operation, it outputs a signal to the motor driving means 122 to drive the driving motor 58 so as to execute a commodities feed-out operation again and resets data stored in the last sale storing means 121, thus executing a sellout processing (step 7.)

When the commodities 4 are stored on the commodities storing path 60, the commodities storing shelf 57 is pulled forward and the movable plate 84 is pressed rearward. As a result, a force pulling the sliding member 81 from the rotary drum 104 acts. As a result, a plurality of teeth 112 of the flange 111 which guides the sliding member 81 to the upper and lower sides rotate. As a result, the locking strip 113 disengages from the teeth 112 and the sliding member 81 moves. When the movable plate 84 is stopped, the locking strip 113 engages with the teeth 112 and the movable plate 84 can be stopped at an arbitrary position. When the commodities storing shelf 57 is set at the original position, the stopper strip 114, which releases the teeth 112 from the locking strip 113, contacts the body of the driving motor 58, thus allowing the rotary drum 104 to rotate.

Owing to the above-described construction, the commodities storing apparatus 61 having the commodities storing shelves 57 can be made thin and simple in construction. Accordingly, a great force is not required to move the commodities. Further, because the force of the spiral elastic member 106 is small, a great force is not required to move the movable plate 84 in storing the commodities, and thus the commodities storing apparatus is easy to handle. When a commodity is fed out, the movement of the sliding member 81 can be blocked temporarily. Accordingly, two or more commodities can be prevented from being fed out simultaneously.

When the last commodity 4 on the commodities storing path 60 is sold in the ordinary sale of the commodities, the provision of the curved portion 73*e* results in formation of a gap between the front end of the second commodities receiving plate 73 and the commodity 4 to be sold in the next sale and between the front end of the second commodities receiving plate 73 and the movable plate 84. Therefore, it does not occur that a part of a commodity such as a straw attached to the bottom of the commodity 4 or to the rear surface thereof is caught between the second commodities receiving plate 73 and the commodity 4 to be sold in the next sale or between the second commodities receiving plate 73 and the movable plate 84. Thus, it does not occur that the commodities 4 cannot be fed out.

Further, the formation of the relief portion 73*a'* of the second commodities receiving plate 73 prevents the straw attached to the rear surface of the commodity 4 from being caught between the second commodities receiving plate 73 and the commodity 4 to be sold in the next sale or between the second commodities receiving plate 73 and the movable plate 84, thus allowing the commodities 4 to be fed out smoothly. In order to obtain this advantage, the relief portion 73*a'* is located on the commodities-contact side, of the second commodities receiving plate 73, at which the second commodities receiving plate 73 confronts the commodities 4.

In this embodiment, a pair of relief portions 73*a'* are formed, but if there is only one straw-attaching position on the commodities 4 or if the second commodities receiving plate 73 is used exclusively for one kind of commodities, i.e. if it is unnecessary to use the second commodities receiving plate 73 for many types of commodities, it is possible to form only one relief portion 73*a'*.

By forming the second pressing strip 84B on the movable plate 84, when the last commodity on the commodities storing path 60 is sold, the second commodities receiving plate 73 projects upward with respect to the commodities sliding surface. The front end of the second pressing strip 84B contacts a portion of the second commodities receiving plate 73 other than the relief portion 73*a'* thereof, and the movable plate 84 is pressed rearward through the second pressing strip 84B. Thus, a space is formed between the second commodities receiving plate 73 and the movable plate 84. Therefore, items such as the straw or the like attached to the bottom of the commodities 4 or the rear surface thereof can be prevented from being caught between the second commodities receiving plate 73 and the movable plate 84, and hence the commodities 4 can be reliably fed out from the vending machine.

Further, because the first pressing strip 84A is formed on the movable plate 84, the reaction force of the pressing force of the first pressing strip 84A offsets a force generated in the twisting direction of the claw 85 as a result of the inclination of the movable plate 84. Thus, the movable plate 84 is prevented from inclining rearward, and thus a reduction in the pressing force of the movable plate 84 can be prevented. Hence, unreliable feed-out of the commodities 4 can be prevented.

In this embodiment, the position and size of the first pressing strip 84A are set in such a manner that the first pressing strip 84A confronts the relief portion 73*a'* of the second commodities receiving plate 73 with a certain interval provided therebetween when the movable plate 84 has reached the front end of the commodities storing path 60. It is possible to provide a construction in which the front end of the first pressing strip 84A contacts not the straw or the like attached to the rear surface of the commodities 4, but contacts the rear surface of the body of the commodities 4 directly. In this construction, the movable plate 84 can be prevented from being twisted in the width direction of the commodities storing path 60, because the first pressing strip 84A does not contact the straw or the like attached to the rear surface of the commodities 4. Thus, the frictional force between the movable plate 84 and the runway member 80 can be prevented from being increased, and hence the pressing force of the movable plate 84 can be prevented from being reduced. This construction allows the commodities 4 to be fed out smoothly.

Further, because the projection 73*f* is formed on the side of the second commodities receiving plate 73, opposed to the commodities-contact side thereof, the commodities 4 can be prevented from dropping with the commodities 4 being erect. Thus, the commodities 4 can be prevented from being caught at the commodities feed-out port of the commodities storing path 60.

Further, when the last commodity 4 placed on the commodities storing path 60 is sold, by performing a commodities feed-out operation twice successively, the straw or the like attached to the bottom of the commodities 4 or the rear surface thereof can be prevented from being caught between the second commodities receiving plate 73 and the movable plate 84, and the commodities 4 can be fed out smoothly. In the conventional sellout detection method, a state in which the reduction in the number of the commodities 4 from one to zero is detected. Because the movement distance of the movable plate 84, namely, the sellout detection stroke in the longitudinal direction of the commodities storing path 60, is smaller than the size of the commodities 4 (in a sellout state, the movable plate 84 is incapable of moving to the position at which it contacts the first commodities receiving plate 62), the detection range is small. According to the present invention, however, a state in which the reduction in the number of the commodities 4 from two to one is detected and hence the detection stroke in the longitudinal direction of the commodities storing path 60 can be secured in a size equal to that of the commodities 4. That is, because the detection range can be widened in the present invention, the detection of the sellout can be accurately accomplished by a simple construction.

In this embodiment, in feeding out two commodities 4, two ordinary commodities feed-out operations are performed. It is, however, possible to pivot the second commodities receiving plate 73 to the commodities feed-out port by 45° with respect to the commodities sliding surface and stop it after it is erected in the first commodities feed-out operation and perform the second commodities feed-out operation. In this case, it is possible to reduce the time required in performing the commodities feed-out operation. Further, even though a commodity 4 is caught between the second commodities receiving plate 73 and the movable plate 84, and the upper portion of the commodity 4 falls down into the movement locus of the first commodities receiving plate 62, the first commodities receiving plate 62 does not return to the stand-by position. Therefore, the first commodities receiving plate 62 does not collide with the commodity 4, and the commodity 4 is not forcibly stopped thereby. Thus it does not occur that the commodities 4 cannot be fed out.

As described above, in storing the commodities on the commodities storing path, the commodities storing shelf is pulled forward and the movable plate is pressed rearward. As a result, the force of pulling the sliding member from the rotary drum is applied to the sliding member. Then, a plurality of teeth of the flange which guides the sliding member to the upper and lower sides rotates, and the locking strip disengages from the teeth, thus moving the sliding member. When the movable plate is stopped, the locking strip engages with the teeth, thus stopping the movable plate at an arbitrary position. When the commodities storing shelf is set at the original position, the stopper strip which disengages the locking strip from the teeth is brought into contact with the body of the driving motor, thus rotating the rotary drum.

Owing to the above-described construction, the commodities storing apparatus having a plurality of commodities storing shelves can be made thin and simple in its construction. Accordingly, a great force is not required to move the commodities. Further, because the force of the spiral elastic member is small, a great force is not required to move the movable plate in storing the commodities, and thus the commodities storing apparatus is easy to handle. When a commodity is fed out, the movement of the sliding member can be temporarily blocked. Accordingly, two or more commodities can be prevented from being fed out simultaneously.

When the last commodity on the commodities storing path is sold in the ordinary sale of the commodities, owing to the formation of the curved portion, there can be formed a gap between the second commodities receiving plate and the commodity to be sold in the next sale and between the second commodities receiving plate and the movable plate. Therefore, it does not occur that a part of the commodity such as a straw attached to the bottom of the commodity or to the rear surface thereof is caught between the second commodities receiving plate and the commodity to be sold in the next sale or between the second commodities receiving plate and the movable plate. Hence it does not occur that the commodities cannot be fed out.

Further, the formation of the relief portion of the second commodities receiving plate prevents the straw or the like attached to the rear surface of the commodity from being caught between the second commodities receiving plate and the commodity to be sold in the next sale or between the second commodities receiving plate and the movable plate, thus allowing the commodities to be fed out smoothly. In order to obtain this advantage, the relief portion is located on the commodities-contact side, of the second commodities receiving plate, at which the second commodities receiving plate confronts the commodities 4.

By forming the second pressing strip on the movable plate, when the last commodity on the commodities storing path is sold, the second commodities receiving plate projects upward with respect to the commodities sliding surface. The front end of the second pressing strip contacts a portion of the second commodities receiving plate other than the relief portion thereof, and the movable plate is pressed rearward through the second pressing strip. Thus, a space is formed between the second commodities receiving plate and the movable plate. Therefore, an article such as a straw or the like attached to the bottom of the commodity or to the rear surface thereof can be prevented from being caught between the second commodities receiving plate and the movable plate. Hence the commodities can be reliably fed out from the vending machine.

Further, because the first pressing strip is formed on the movable plate, the reaction force of the pressing force of the first pressing strip offsets a force generated in the twisting direction of the claw as a result of the inclination of the movable plate. The movable plate is, therefore, prevented from inclining rearward, and thus a reduction in the pressing force of the movable plate can be prevented, thus preventing unreliable feed-out of the commodities.

The position and size of the first pressing strip are set in such a manner that the front end of the first pressing strip contacts not the straw or the like attached to the rear surface of the commodities, but contacts the rear surface of the body of the commodities directly. In this construction, the movable plate can be prevented from being twisted in the width direction of the commodities storing path because the first pressing strip does not contact the straw or the like attached to the rear surface of the commodities. Thus, the frictional force between the movable plate and the runway member can be prevented from being increased, and hence the pressing force of the movable plate can be prevented from being reduced. This construction allows the commodities to be fed out smoothly.

Further, because the projection is formed on the side of the second commodities receiving plate, opposed to the commodities-contact side thereof, the commodities can be prevented from dropping the commodities in an erected position. Thus, the commodities can be prevented from being caught at the commodities feed-out port of the commodities storing path.

Also, when the last commodity placed on the commodities storing path is sold, by performing a commodities feed-out operation twice successively, the straw or the like attached to the bottom of the commodities or to the rear surface thereof can be prevented from being caught between the second commodities receiving plate and the movable plate. Thus, the commodities can be fed out smoothly. In the conventional sellout detection method, a state in which the reduction in the number of the commodities from one to zero is detected. Because the movement distance of the movable plate, namely, the sellout detection stroke in the longitudinal direction of the commodities storing path is smaller than the size of the commodities (in a sellout state, the movable plate is incapable of moving to the position at which it contacts the first commodities receiving plate), the detection range is small. According to the present invention, however, a state in which the reduction in the number of the commodities from two to one is detected and, hence, the detection stroke in the longitudinal direction of the commodities storing path can be secured in a size equal to that of the commodities. That is, because the detection range can be widened, the detection of the sellout can be accurately accomplished by a simple construction.

What is claimed is:

1. A commodities storing apparatus of a vending machine comprising:

a plurality of vertically arranged commodities storing shelves each having a plurality of commodities storing paths, said commodities storing shelves being pulled in storing commodities on the commodities storing paths;

first commodities receiving plates each provided at exits of two of the commodities storing paths for holding the commodities stored thereon;

driving shafts each for pivoting one of the first commodities receiving plates;

operation members each fixed to one of the driving shafts and interlocked with a pivotal motion of one of the first commodities receiving plates; and second commodities receiving plates each of which is provided on a sliding surface side of each commodities storing path and positioned rearward of one of the first commodities receiving plates, each of the second commodities receiving plates pivoting to feed out a first commodity to a commodities feed-out port and preventing a second commodity from moving to the commodities feed-out port, wherein each of the first commodities receiving plates and each of the second commodities receiving plates open and close the associated commodities storing path.

2. The commodities storing apparatus of the vending machine according to claim 1, further comprising elastic members each provided on the commodities storing path and having an urging force directed from a rear side of the commodities storing path toward the commodities feed-out port; a feed-out pressing plate provided on the commodities storing path and holding the elastic member thereon and moving the commodities; and an indicating portion indicating sellout of the commodities and provided on the feed-out pressing plate on a feed-out side thereof.

3. The commodities storing apparatus of the vending machine according to claim 1, wherein each of the first commodities receiving plates is made of a transparent material.

4. A commodities storing apparatus of a vending machine comprising:

a plurality of vertically arranged commodities storing shelves each having a plurality of commodities storing paths, said commodities storing shelves being pulled in storing commodities on the commodities storing paths;

first commodities receiving plates each provided on the commodities storing shelves for holding a first commodity;

second commodities receiving plates each for preventing movement of a second commodity;

commodities feed-out devices each having an operation member and a driving shaft both for pivoting the first commodities receiving plates and the second commodities receiving plates to open and close the associated commodities storing paths;

connection members each rotatable and positioned at a rear of each commodities storing path and fixed to the driving shaft; and driving motors each removable from the connection member, wherein when the commodities storing shelf is pulled forward to store commodities on the commodities storing paths, the commodities feed-out device is disconnected from the driving motor, whereas when the commodities storing shelf is pressed rearward to be accommodated in the vending machine, the commodities feed-out device is connected with the driving motor.

5. A commodities storing apparatus of a vending machine comprising:

a plurality of vertically arranged commodities storing shelves each having a plurality of commodities storing paths, said commodities storing shelves being pulled in storing commodities on the commodities storing paths;

commodities feed-out devices each comprising a first commodities receiving plate and a second commodities receiving plate to open and close the associated commodities storing path;

feed-out pressing plates for moving the commodities;

detection operation rods each of which is operated by being pressed by the feed-out pressing plate; and commodities detection switches each of which is separated from the detection operation rod when the commodities storing shelf is pulled forward to store commodities on the commodities storing paths, the commodities detection switch being connected with the detection operation rod when the commodities storing shelf is pressed rearward to be accommodated in the vending machine.

6. The commodities storing apparatus of the vending machine according to claim 5, wherein each commodities detection switch, a position detection switch for detecting an angle of a shaft of a driving motor, and the driving motor are incorporated into one unit such that the commodities detection switch and the position detection switch are separated from the driving motor when the commodities storing shelf is pulled forward to store commodities on the commodities storing paths, whereas the commodities detection switch and the position detection switch are connected with each other when the commodities storing shelf is pressed rearward to accommodate the commodities storing shelf in the vending machine.

7. A commodities storing apparatus of a vending machine comprising:

first commodities receiving plates each positioned at a commodities feed-out port located at a front end of a gutter-shaped commodities storing path for holding commodities stored on the commodities storing path;

operation members each interlocked with an operation of one of the first commodities receiving plates;

second commodities receiving plates each of which is provided on a sliding surface side of each commodities storing path and positioned rearward of one of the first commodities receiving plates, each of the second commodities receiving plates pivoting to feed out a first commodity to the commodities feed-out port and preventing a second commodity from moving to the commodities feed-out port, movable plates each provided on the sliding surface of each commodities storing path such that each movable plate is slidable on the sliding surface from a rear and thereof to the commodities feed-out port, thus preventing the commodities from falling down when the commodities are being moved;

belt-shaped spiral elastic members each of which is connected with one of the movable plates and slides to move commodities placed thereon; and runway members each mounted in the commodities storing path;

wherein one of the spiral elastic members slides on an upper surface of the runway member of each commodities storing path and is bent in a U-shape at the commodities feed-out port of the commodities storing path, said spiral elastic member being returned back and rotatably fixed to a rear end of the commodities storing path.

8. The commodities storing apparatus of the vending machine according to claim 7, wherein a belt-shaped bendable and movable member is fixed to one of the movable plates and is pulled with commodities placed thereon, said movable member being connected with one of the spiral elastic members, said spiral elastic member being rotatably fixed to the rear end of the commodities storing path.

9. The commodities storing apparatus of the vending machine according to claim 7, further comprising commodities storing shelves which can be pulled forward; sellout detection portions, each of which can be separated from the corresponding commodities storing shelf; and sellout operation portions each of which is installed on one of the elastic members such that each sellout operation portion is positioned on a lower surface of the runway member, wherein when the movable plate is located at the front end of each commodities storing path, each sellout operation portion actuates the sellout detection portion owing to movement of said elastic member.

10. The commodities storing apparatus of the vending machine according to claim 7, further comprising locking portions for locking each movable plate to a stopper portion thereof when the movable plate has been moved to the rear end of each commodities storing path, each of the spiral elastic members being slidably connected with the movable plate to pull the movable plate and rotatably supported at a location rearward of the movable plate, and also comprising rotation control members each for regulating a rotation speed of a shaft of movable plate unlocked from the locking portion when the shaft rotates at a high speed, each rotation control member not regulating the rotation speed of the shaft of each movable plate unlocked from the locking portion when the shaft rotates at a low speed.

11. The commodities storing apparatus of the vending machine according to claim 7, wherein a material of a gutter-shaped commodities storing case body differs from a material of the runway member which slides each movable plate provided on the sliding surface of each commodities storing path in such a manner that the movable plate is slidable on the sliding surface from the rear end thereof to the commodities feed-out port, thus preventing the commodities from falling down during movement of the commodities, and wherein a material having a high sliding property is fixed to the runway member to thereby make smooth the sliding movement of the movable plate and the spiral elastic member.

12. A commodities storing apparatus of a vending machine having commodities storing shelves comprising:

gutter-shaped commodities storing paths, two of which are formed into a W configuration as one unit by molding;

first commodities receiving plates each positioned at a commodities feed-out port in front of a front end of each gutter-shaped commodities storing path for holding commodities stored on the commodities storing path;

operation members each positioned at the commodities feed-out port in front of the front end of the commodities storing paths and interlocked with a pivotal motion of the first commodities receiving plates;

second commodities receiving plates each of which is provided on a sliding surface side of each commodities storing path and positioned rearward of one of the first commodities receiving plates, each of the second commodities receiving plates pivoting to feed out a first commodity to a commodities feed-out port and preventing a second commodity from moving to the commodities feed-out port;

sellout detection portions; and driving motors each for driving the first and second commodities receiving plates and the sellout detection portions, said driving motors being removable from the associated commodities storing shelves.

13. A commodities storing apparatus of a vending machine comprising:

first commodities receiving plates each positioned at a commodities feed-out port in front of a front end of gutter-shaped commodities storing paths for holding commodities stored on the commodities storing paths, the first commodities receiving plate having an inclined surface formed entirely or partially on a peripheral portion thereof, said inclined surface inclining in a direction from a front surface of the first commodities receiving plate toward a rear surface thereof holding the commodities;

second commodities receiving plates each of which is provided on a sliding surface side of each commodities storing path and positioned rearward of one of the first commodities receiving plates, each of the second commodities receiving plates pivoting to feed out a first commodity to a commodities feed-out port and preventing a second commodity from moving to the commodities feed-out port; and driving shafts each connected to one of the first commodities receiving plates for pivoting the one of the first commodities receiving plate.

14. The commodities storing apparatus of the vending machine according to claim 13, wherein each first commodities receiving plate positioned at the commodities feed-out port in front of the front end of the gutter-shaped commodities storing paths for holding the commodities is transparent and has projecting ribs formed thereon to prevent the commodities from contacting the entire surface thereof.

15. A commodities storing apparatus of a vending machine comprising:

first commodities receiving plates each positioned at a commodities feed-out port in front of a front end of a gutter-shaped commodities storing path for holding commodities stored on the commodities storing paths;

operation members each interlocked with a pivotal motion of the first commodities receiving plate;

second commodities receiving plates each for preventing a second commodity from being moved to the commodities feed-out port;

movable plates each provided on a sliding surface of the commodities storing path such that the movable plate is slidable on the sliding surface from a rear end thereof to the commodities feed-out port;

belt-shaped sliding members each of which has a rotary member rotating at the commodities feed-out port and is pulled with commodities placed thereon, said sliding member being connected with the movable plate, with one end of the sliding member held by the rotary member by bending the sliding member in a U-shape at the rotary member;

rotary drums on each of which the other end of the sliding member is wound; and spiral elastic members each connected with the rotary drum and positioned in proximity to the rotary drum, wherein each sliding member moves along the commodities storing path by the urging force of the elastic member so that the sliding member moves along an upper surface of the commodities storing path and a lower surface thereof.

16. A commodities storing apparatus of a vending machine comprising:

first commodities receiving plates positioned at a commodities feed-out port in front of a front end of a commodities storing path for holding commodities stored on the gutter-shaped commodities storing path;

movable plates each provided on a sliding surface of the commodities storing path such that the movable plate is slidable on the sliding surface from a rear end thereof to the commodities feed-out port;

belt-shaped sliding members each of which is connected with the movable plate and is pulled with commodities placed thereon by being urged toward a feed-out side; and second commodities receiving plates each provided on the sliding surface and comprising a regulation portion, positioned at one end thereof, for preventing a movement of a second commodity to a commodities feed-out port and a stopper portion which is positioned at the other end thereof and pivotally supported on a shaft, said stopper portion contacting the sliding member by a pivotal motion of the second commodities receiving plate, wherein a movement of the sliding member is locked by the pivotal motion of the second commodities receiving plate.

17. A commodities storing apparatus of a vending machine comprising:

second commodities receiving plates each provided on a sliding surface and comprising a regulation portion, positioned at one end thereof, for preventing a movement of a second commodity to a commodities feed-out port and a stopper portion which is positioned at the other end thereof and pivotally supported on a shaft, said stopper portion contacting a sliding member by a pivotal motion of the second commodities receiving plate; and blocking members, each provided at a lower portion of a front end of each gutter-shaped commodities storing case, for reducing the degree of sliding property of the sliding member, wherein a movement of the sliding member is locked between the stopper portion and the blocking member by the pivotal motion of each second commodities receiving plate.

18. A commodities storing apparatus of a vending machine comprising:

commodities storing shelves which can be pulled forward;

sellout detection portions each of which can be separated from the corresponding commodities storing shelf;

movable plates each provided on a sliding surface of each commodities storing path such that each movable plate is slidable on the sliding surface from a rear end thereof to a commodities feed-out port of the commodities storing path;

belt-shaped sliding members each of which is connected with one of the movable plates and can be pulled with commodities placed thereon by being urged toward a feed-out side;

operation holes each formed in the sliding member; and sellout operation members each pivotally supported on a shaft and having a pressing strip which contacts the sellout detection portion at a rear portion of the commodities storing path and an operation pressing strip which is inserted into the operation hole, wherein the sellout detection portion is operated when the operation pressing strip is inserted into the operation hole with the movable plate located at the commodities feed-out port.

19. A commodities storing apparatus of a vending machine comprising:

movable plates each provided on a sliding surface of each commodities storing path such that each movable plate is slidable on the sliding surface from a rear end thereof to a commodities feed-out port of each commodities storing path;

sliding members each connected with one of the movable plates;

rotary drums on each of which one of the sliding members is spirally wound;

tooth portions each formed circumferentially on the rotary drums; and pivotal stopper members each comprising a locking strip which engages with the tooth portions to prevent a rotation of the rotary drum and a stopper strip which is integral with the locking strip and engages the locking strip with the tooth portions when the commodities storing shelf is pulled forward and disengages the locking strip from the tooth portions when the commodities storing shelf is pressed rearward, wherein when the commodities storing shelf is pulled forward, the movable plate is fixed at an arbitrary position, whereas when the commodities storing shelf is pressed rearward, a locked state of the movable plate is released to allow the movable plate to move forward.

20. A commodities storing apparatus of a vending machine comprising:

runway members each for sliding a movable plate provided on a sliding surface of a gutter-shaped commodities storing path such that the movable plate is slidable on the sliding surface from a rear end thereof to a commodities feed-out port and prevents commodities from falling down when the commodities are being moved; and locking claws for removably mounting on the runway member a material having a superior sliding-contact property.

21. A commodities storing apparatus of a vending machine comprising:

second commodities receiving plates each provided on a sliding surface of a gutter-shaped commodities storing path for preventing a second commodity from moving to a commodities feed-out port; and runway members each for sliding a movable plate provided on the sliding surface of the gutter-shaped commodities storing path such that the movable plate is slidable on the sliding surface from a rear end thereof to a commodities feed-out port and prevents commodities from falling down when the commodities are being moved, wherein the runway member inclines from a predetermined position thereof toward a rear end thereof such that the height of the rear end of the runway member is set to be equal to or lower than that of the second commodities receiving plate for preventing the second commodity from moving to the commodities feed-out port when the second commodities receiving plate at a highest position thereof as a result of pivotal motion thereof.

22. A commodities storing apparatus of a vending machine having commodities storing shelves mounted therein, a commodities transport path vertically provided in front of the commodities storing shelves, gutter-shaped commodities storing cases constituting the commodities storing shelves, commodities feed-out devices, and commodities storing paths formed inside each of the commodities storing cases, wherein each of the commodities feed-out devices comprises:

first commodities receiving plates each provided at a front end of the commodities storing path to open and close the front end of the commodities storing path;

second commodities receiving plates each provided on a bottom surface of the commodities storing path to open and close the commodities storing path;

operation members each interlocked with the first commodities receiving plate and contacting the second commodities receiving plates to drive the second commodities receiving plate;

movable plates each slidable on the bottom surface of the commodities storing path;

rotary drums each rotatably provided at a rear end of the commodities storing path;

belt-shaped sliding members each having one end fixed to a lower portion of the movable plate and the other end fixed to the rotary drum, said sliding member being bent in the form of a figure "U" at a front portion of the commodities storing path;

first spring-installing drums each positioned at a rear end of the commodities storing path and being coaxial and integral with the rotary drum;

second spring-installing drums each juxtaposed with the first spring-installing drum; and spiral elastic members each provided between the first spring-installing drum and the second spring-installing drum and urging the sliding member in a direction in which the sliding member is wound around the rotary drum, wherein a curved portion is formed on the second commodities receiving plate at a position thereof corresponding to an upper end thereof when the second commodities receiving plate projects above the commodities storing path.

23. The commodities storing apparatus of a vending machine according to claim 22, wherein a relief portion is formed on the second commodities receiving plate by recessing a portion of the second commodities receiving plate on a side thereof confronting the commodities, said portion being continuous with the curved portion.

24. The commodities storing apparatus of a vending machine according to claim 23, wherein a pair of relief portions are formed on the second commodities receiving plate.

25. The commodities storing apparatus of a vending machine according to claim 24, wherein a second pressing strip is provided, with one end thereof fixed to a side surface of the movable plate and the other end thereof positioned at a front portion of the movable plate such that a front end of the second pressing strip contacts a part of the second commodities receiving plate other than the relief portions when the movable plate has reached the front end of the commodities storing path.

26. A commodities storing apparatus of a vending machine having commodities storing shelves mounted therein, a commodities transport path vertically provided in front of the commodities storing shelves, gutter-shaped commodities storing cases constituting the commodities storing shelves, commodities feed-out devices, and commodities storing paths formed inside each of the commodities storing cases, wherein each of the commodities feed-out devices comprises:

first commodities receiving plates each provided at a front end of the commodities storing path to open and close the front end of the commodities storing path;

second commodities receiving plates each provided on a bottom surface of the commodities storing path to open and close the commodities storing path;

operation members each interlocked with the first commodities receiving plate and contacting the second commodities receiving plates to drive the second commodities receiving plates;

movable plates each slidable on the bottom surface of the commodities storing path;

rotary drums each rotatably provided at a rear end of the commodities storing path;

belt-shaped sliding members each having one end fixed to a lower portion of the movable plate and the other end fixed to the rotary drum, said sliding member being bent in the form of a figure "U" at a front portion of the commodities storing path;

first spring-installing drums each positioned at a rear end of the commodities storing path and being coaxial and integral with the rotary drum;

second spring-installing drums each juxtaposed with the first spring-installing drum; and spiral elastic members each provided between the first spring-installing drum and the second spring-installing drum and urging the sliding member in a direction in which the sliding member is wound around the rotary drum, wherein the second commodities receiving plate has a projection formed on a side opposite to a side thereof contacting the commodities.

27. A commodities storing apparatus of a vending machine having commodities storing shelves mounted therein, a commodities transport path vertically provided in front of the commodities storing shelves, gutter-shaped commodities storing cases constituting the commodities storing shelves, commodities feed-out devices, and commodities storing paths formed inside each of the commodities storing cases, wherein each of the commodities feed-out devices comprises:

first commodities receiving plates each provided at a front end of the commodities storing path to open and close the front end of the commodities storing path;

second commodities receiving plates each provided on a bottom surface of the commodities storing path to open and close the commodities storing path;

operation members each interlocked with the first commodities receiving plate and contacting the second commodities receiving plates to drive the second commodities receiving plate;

movable plates each slidable on the bottom surface of the commodities storing path;

rotary drums each rotatably provided at a rear end of the commodities storing path;

belt-shaped sliding members each having one end fixed to a lower portion of the movable plate and the other end fixed to the rotary drum, said sliding member being bent in the form of a figure "U" at a front portion of the commodities storing path;

first spring-installing drums each positioned at a rear end of the commodities storing path and being coaxial and integral with the rotary drum;

second spring-installing drums each juxtaposed with the first spring-installing drum; and spiral elastic members each provided between the first spring-installing drum and the second spring-installing drum and urging the sliding member in a direction in which the sliding member is wound around the rotary drum, wherein the movable plate has a first pressing strip projecting from a lower portion of a front surface thereof.

28. The commodities storing apparatus of the vending machine according to claim 27, wherein the commodities stored on the commodities storing path comprise a body and a straw or the like attached to a rear surface of the body such that a front end of the first pressing strip contacts the rear surface of the body.

29. The commodities storing apparatus of the vending machine according to claim 27, wherein a second pressing strip is provided at a front portion of the movable plate, with one end thereof fixed to a side surface of the movable plate and the other end thereof positioned alongside the first pressing strip, wherein a gap is formed between the second commodities receiving plate and the first pressing strip when a front end of the second pressing strip contacts the second commodities receiving plate as a result of the arrival of the movable plate at the front end of the commodities storing path.

30. A commodities storing apparatus of a vending machine having commodities storing shelves mounted therein, a commodities transport path vertically provided in front of the commodities storing shelves, gutter-shaped commodities storing cases constituting the commodities storing shelves, commodities feed-out devices, and commodities storing paths formed inside each of the commodities storing cases, wherein each of the commodities feed-out devices comprises, first commodities receiving plates each provided at a front end of at least one of the commodities storing paths to open and close the front end of the commodities storing paths;

second commodities receiving plates each provided on a bottom surface of one of the commodities storing paths to open and close the commodities storing paths;

operation members each interlocked with one of the first commodities receiving plates and contacting the second commodities receiving plates;

driving motors each driving one of the first commodities receiving plates and the operation member;

movable plates each slidable on the bottom surface of one of the commodities storing paths;

rotary drums each rotatably provided at a rear end of one of the commodities storing paths;

belt-shaped sliding members each having one end fixed to a lower portion of the movable plate and the other end fixed to the rotary drum, each of said sliding members being bent in the form of a figure "U" at the front portion of the commodities storing paths;

first spring-installing drums each positioned at a rear end of one of the commodities storing paths and being coaxial and integral with the rotary drum;

second spring-installing drums each juxtaposed with the first spring-installing drums;

spiral elastic members each provided between one of the first spring-installing drums and one of the second spring-installing drums and urging the sliding member in a direction in which the sliding members are wound around the rotary drums;

sellout detection portions each detecting that there is one commodity left on a respective one of the commodities storing paths and that all commodities have been sold out;

last sale storage means storing data indicating that the last commodity is sold in a next sale;

motor driving means for driving the driving motor;

motor control means outputting a driving signal to the motor driving means when a commodity is sold and receiving a last sale detection signal from the sellout detection portion, said motor control means outputting a signal to the last sale storage means, wherein in selling commodities, the motor control means reads data stored in the last sale storage means, outputs a signal to the motor driving means only when the last commodity is sold, and drives the first commodities receiving plate and the operation member so as to perform a commodities feed-out operation twice successively.

31. The commodities storing apparatus of the vending machine according to claim 30, wherein before a first commodities feed-out operation terminates completely, a second commodities feed-out operation starts.

* * * * *